United States Patent [19]
Sengoku

[11] Patent Number: 5,875,321
[45] Date of Patent: Feb. 23, 1999

[54] METHOD AND APPARATUS FOR CONTROLLING CLOCK SIGNAL PERIOD

[75] Inventor: Shoichiro Sengoku, Tokyo, Japan

[73] Assignee: NEC Corporation, Tokyo, Japan

[21] Appl. No.: 912,409

[22] Filed: Aug. 18, 1997

[30] Foreign Application Priority Data

Aug. 28, 1996 [JP] Japan ................................. 8-226300

[51] Int. Cl.$^6$ .................................................. G06F 1/08
[52] U.S. Cl. ........................................................ 395/556
[58] Field of Search ................................... 395/555, 556, 395/559, 557, 750.04, 878, 881

[56] References Cited

U.S. PATENT DOCUMENTS 5,146,601 9/1992 Hosaka et al. ........................... 395/556
5,461,266 10/1995 Koreeda et al. ................ 395/750.04 X

FOREIGN PATENT DOCUMENTS 0 589 117 3/1994 European Pat. Off. .
5-227147 9/1993 Japan .

OTHER PUBLICATIONS

"Variable Duration Microprocessor Clock Generation", pp. 116–123, IBM Technical Disclosure Bulletin, vol. 31, Nov. 12, May 1989.

Primary Examiner—Thomas M. Heckler
Attorney, Agent, or Firm—Young & Thompson

[57] ABSTRACT

In a clock signal generating apparatus, an internal clock signal generating circuit generates an internal clock signal. An adjustment data storing section stores an adjusted period designating data and an adjustment content designating data. In this case, the adjusted period designating data indicates ones of N periods (N is an integer larger than 1) of a desired clock signal for adjustment to be performed to obtain the desired clock signal, and adjustment content designating data indicates a content of the adjustment. One period of the desired clock signal is composed of a plurality of periods of the internal clock signal. An adjustment requesting section selectively issues an adjustment request based on the adjusted period designating data and the adjustment content designating data in response to input of desired clock signal. A desired clock signal generating section performs the adjustment in response to the adjustment request while counting pulses of the internal clock signal. As a result, each of specific periods of the N periods designated by the adjusted period designating data is extended or shortened by at least one period of the internal clock signal based on adjustment content designating data. Then, the desired clock signal generating section generates desired clock signal based on the adjustment result.

24 Claims, 12 Drawing Sheets

METHOD AND APPARATUS FOR CONTROLLING CLOCK SIGNAL PERIOD

BACKGROUND OF THE INVENTION

1. Field of the Invention

The present invention generally relates to a method and apparatus for controlling a period of a second clock signal generated by counting the number of periods of a first clock signal.

2. Description of the Related Art

An IC card equipped with external terminals is called "a card". The IC card has substantially the same size as a credit card or the like, and internally contains an integrated circuit (IC), and also can transfer data via the external terminals formed on a card surface from or to an external device. In general, this IC card equipped with the external terminals is called a smart card. A memory, a microcomputer, and other various control circuits are built in this IC card. This type of IC card is widely utilized. For instance, an IC card equipped with external terminals and containing only a memory is used as an auxiliary and easily detachable storage apparatus for another apparatus. Another type of IC card equipped with external terminals and containing a microcomputer is used as a master of an external apparatus, or as an apparatus which operates independent from an external apparatus, and can transfer data from or to the external apparatus, if required.

The interfaces for a type of IC card equipped with external terminals and another type of IC card equipped functioning as an external apparatus, and the transfer protocol for them and a read/write interface apparatus are defined by ISO/IEC 7816-3 (and also JIS X 6304). The data transfer is performed in accordance with the transfer protocol using serial data transfer.

Now, this definition on "IC card equipped with external terminals: Electric signals and Transfer protocol" will be described.

As an IC card equipped with external terminals, there are two types of IC cards. Namely, there are an external clock signal IC card to which a clock signal is externally supplied, and an internal clock signal IC card containing a clock signal generator therein and not necessitating that any clock signal is supplied from an external device. When a unit time required to transfer 1-bit data is represented by an element time unit (etu), the data transfer rate between an IC card equipped with external terminals and an interface apparatus is defined as follows. That is, a reciprocal of the transfer rate, namely, one (etu) in an initial response of the internal clock signal IC card is defined as 1/9600 seconds. 1 (etu) in an initial response of an external clock signal IC card is equal to 372 times longer than a time period of a clock signal externally supplied to the IC card. Also, in an initial response, 1 character must be composed of a start bit of 1 bit, data bits of 8 bits subsequent to this start bit, a parity bit of 1 bit, and further a protection period of 2 bits at its minimum.

Also, the interface apparatus executes a parity check within this protection period. Then, the interface apparatus must output this parity check result to the IC card equipped with the external terminals within a time period of 1 (etu) at a minimum to 2 (etu) at a maximum after 0.5 (etu) has passed from start of the protection period. The length of 1 character is equal to 12 (etu) at a minimum. In order to correctly transmit/receive data, the interface apparatus must execute the sampling operations as follows. The first bit of the data must be sampled within a range of (1.5±0.2) etu from start of a start bit. The second bit of the data must be sampled within a range of (2.5±0.2) etu from the start of the start bit. In this manner, the range within each of the subsequent bits must be sampled is successively increased by 1 etu. The eighth bit of the data must be sampled within a range of (8.5±0.2) etu from the start of the start bit. The parity bit must be sampled within a range of (9.5±0.2) etu from the start of the start bit. On the other hand, in such a case that the parity check result informed from the interface apparatus indicates an error, the IC card equipped with the external terminals must immediately send the character again.

In the initial response, the characters selected from among 7 characters at a minimum to 33 characters at a maximum are transmitted/received. The IC card equipped with the external terminals may designate various parameters subsequent to the initial response such as a data transfer mode, a transfer rate, a ratio of data transfer clock signal period to card operation clock signal period when the IC card is an external clock signal IC card and the like to the interface apparatus based on these transmitted/received data.

For the data transmission/reception subsequent to the initial response, 83 different kinds of ratios of data transfer clock signal period to card operation clock signal period are allowed, specifically, in case of the external clock signal IC card. Therefore, in order that the interface apparatus transmits/receives data to/from all types of the IC cards equipped with external terminals generated based on the above standard ISO/IEC 7816-3, the interface apparatus must generate clock signals for 83 different kinds of

TABLE 1

| SERIAL NO. | PERIOD RATIO [RAT] | UNIQUE FACTORIZATION OF PERIOD RATIO |
|---|---|---|
| 1 | 11.62500 | $3 \times 31 \div 2^3$ |
| 2 | 16.00000 | $2^4$ |
| 3 | 17.43750 | $3^2 \times 31 \div 2^4$ |
| 4 | 18.60000 | $3 \times 31 \div 5$ |
| 5 | 23.25000 | $3 \times 31 \div 2^2$ |
| 6 | 24.00000 | $2^3 \times 3$ |
| 7 | 25.60000 | $2^7 \div 5$ |
| 8 | 27.90000 | $3^2 \times 31 \div 2 \div 5$ |
| 9 | 31.00000 | 31 |
| 10 | 32.00000 | $2^5$ |
| 11 | 34.87500 | $3^2 \times 31 \div 2^3$ |
| 12 | 37.20000 | $2 \times 3 \times 31 \div 5$ |
| 13 | 38.40000 | $2^5 \times 3 \div 5$ |
| 14 | 42.66667 | $2^7 \div 3$ |
| 15 | 46.50000 | $3 \times 31 \div 2$ |
| 16 | 48.00000 | $2^4 \times 3$ |
| 17 | 51.20000 | $2^8 \div 5$ |
| 18 | 55.80000 | $3^2 \times 31 \div 5$ |
| 19 | 58.12500 | $3 \times 5 \times 31 \div 2^3$ |
| 20 | 62.00000 | $2 \times 31$ |
| 21 | 64.00000 | $2^6$ |
| 22 | 69.75000 | $3^2 \times 31 \div 2^2$ |
| 23 | 74.40000 | $2^2 \times 3 \times 31 \div 5$ |
| 24 | 76.80000 | $2^7 \times 3 \div 5$ |
| 25 | 85.33333 | $2^8 \div 3$ |
| 26 | 93.00000 | $3 \times 31$ |
| 27 | 96.00000 | $2^5 \times 3$ |
| 28 | 102.40000 | $2^9 \div 5$ |
| 29 | 116.25000 | $3 \times 5 \times 31 \div 2^2$ |
| 30 | 124.00000 | $2^2 \times 31$ |
| 31 | 128.00000 | $2^7$ |
| 32 | 139.50000 | $3^2 \times 31 \div 2$ |
| 33 | 155.00000 | $5 \times 31$ |
| 34 | 170.66667 | $2^9 \div 3$ |
| 35 | 186.00000 | $2 \times 3 \times 31$ |
| 36 | 192.00000 | $2^6 \times 3$ |

TABLE 1-continued

| SERIAL NO. | PERIOD RATIO [RAT] | UNIQUE FACTOR-IZATION OF PERIOD RATIO |
|---|---|---|
| 37 | 232.50000 | $3 \times 5 \times 31 \div 2$ |
| 38 | 256.00000 | $2^8$ |
| 39 | 279.00000 | $3^2 \times 31$ |
| 40 | 372.00000 | $2^2 \times 3 \times 31$ |
| 41 | 384.00000 | $2^7 \times 3$ |
| 42 | 465.00000 | $3 \times 5 \times 31$ |
| 43 | 512.00000 | $2^9$ |
| 44 | 558.00000 | $2 \times 3^2 \times 31$ |
| 45 | 744.00000 | $2^3 \times 3 \times 31$ |
| 46 | 768.00000 | $2^8 \times 3$ |
| 47 | 930.00000 | $2 \times 3 \times 5 \times 31$ |
| 48 | 1024.00000 | $1^{10}$ |
| 49 | 1116.00000 | $2^2 \times 3^2 \times 31$ |
| 50 | 1488.00000 | $2^4 \times 3 \times 31$ |
| 51 | 1536.00000 | $2^9 \times 3$ |
| 52 | 1860.000000 | $2^2 \times 3 \times 5 \times 31$ |
| 53 | 2048.00000 | $2^{11}$ |
| 54 | 2232.00000 | $2^3 \times 3^2 \times 31$ |
| 55 | 2976.00000 | $2^5 \times 3 \times 31$ |
| 56 | 3072.00000 | $2^{10} \times 3$ |
| 57 | 3720.00000 | $2^3 \times 3 \times 5 \times 31$ |
| 58 | 4096.00000 | $2^{12}$ |
| 59 | 4464.00000 | $2^4$ |
| 60 | 5952.00000 | $2^5 \times 3 \times 31$ |
| 61 | 6144.00000 | $2^{11} \times 3$ |
| 62 | 7440.00000 | $2^4 \times 3 \times 5 \times 31$ |
| 63 | 8192.00000 | $2^{13}$ |
| 64 | 8928.00000 | $2^5 \times 3^2 \times 31$ |
| 65 | 11904.00000 | $2^7 \times 3 \times 31$ |
| 66 | 12288.00000 | $2^{12} \times 3$ |
| 67 | 14880.00000 | $2^5 \times 3 \times 5 \times 31$ |
| 68 | 16384.00000 | $2^{14}$ |
| 69 | 17856.00000 | $2^8 \times 3^2 \times 31$ |
| 70 | 23808.00000 | $2^8 \times 3 \times 31$ |
| 71 | 24576.00000 | $2^{13} \times 31$ |
| 72 | 29760.00000 | $2^5 \times 3 \times 5 \times 31$ |
| 73 | 32768.00000 | $2^{15}$ |
| 74 | 35712.00000 | $2^7 \times 3^2 \times 31$ |
| 75 | 47616.00000 | $2^9 \times 3 \times 31$ |
| 76 | 49152.00000 | $2^{14} \times 3$ |
| 77 | 59520.00000 | $2^7 \times 3 \times 5 \times 31$ |
| 78 | 65536.00000 | $2^{16}$ |
| 79 | 71424.00000 | $2^8 \times 3^2 \times 31$ |
| 80 | 95232.00000 | $2^{10} \times 3 \times 31$ |
| 81 | 98304.00000 | $2^{15} \times 3$ |
| 82 | 119040.00000 | $2^8 \times 3 \times 5 \times 31$ |
| 83 | 131072.00000 | $2^{17}$ | transfer rates as the card operation clock signal.

The 83 different kinds of ratios of data transfer clock signal period to card operation clock signal period are represented in the above Table 1. It should be noted that the ratio of data transfer clock signal period to the card operation clock signal period is equal to a value of (1 etu)/(1 card operation clock signal period).

In general, conventionally, interface apparatuses are provided which are exclusively used for IC cards equipped with external terminals for specific purposes. For example, there is a combination of an interface apparatus and an IC card equipped with external terminals for an automatic cash dispenser of a financial institution. Also, there is another combination of a mobile telephone functioning as an interface apparatus and an IC card equipped with external terminals functioning as an ID (identification) card. In these combination cases, the IC card equipped with external terminals is normally provided to be fitted with a function of an interface apparatus. Accordingly, this interface apparatus need not be designed to accept all of the above-described 83 different kinds of ratios of data transfer rate clock signal period to card operation clock signal period.

However, application fields of IC cards equipped with external terminals have been expanded. For example, when an IC card equipped with external terminals is utilized as one of peripheral devices of a personal computer system, a general-purpose interface apparatus is necessarily required such that data can be transmitted and/or received to/from any kind of available IC cards.

In order to realize such a general-purpose interface apparatus satisfying the above requirement, the system of utilizing the universal asynchronous receiver/transmitter (UART) shown in FIG. 1 is disclosed in Japanese Laid Open Patent Disclosure (JP-A-Heisei 5-227147).

FIG. 1 is a schematic block diagram of a circuit arrangement of an interface apparatus disclosed in Japanese Laid Open Patent Disclosure (Heisei JP-A-5-227147). The interface apparatus can perform a data transfer operation with an IC card 50 equipped with external terminals by using the UART 102. In this circuit arrangement, the interface apparatus is composed of a control unit 106 such as a central processing unit (CPU), a host bus 107, a clock signal generating circuit 101 for generating an operation clock signal 105 for the UART 102 from a source clock signal 103, a programmable frequency dividing circuit 100 for generating a card operation clock signal 104 from the source clock signal 103, and the IC card 50 equipped with external terminals. The control unit 106 sets proper values for the programmable frequency dividing circuit 100 and the clock signal generating circuit 101 via the host bus 107. Then, the control unit 100 transfer data via the UART 102 to the IC card 50 equipped with external terminals.

Now, the operations when data is written from and to the control unit 106 to and from the IC card 50 equipped with the external terminals will be described below.

The control unit 106 writes the 1-byte (8 bits) transfer data in a parallel form via the host bus 107 to the UART 102. The UART 102 converts the 1-byte data from in the parallel form to in a serial form, and then sends out this transfer data in the serial form to the IC card 50 equipped with the external terminals.

When data is read from the IC card 50 equipped with the external terminals, the UART 102 converts a serial transfer data received from the IC card 50 equipped with the external terminals into a parallel transfer data. Then, the control unit 106 reads this parallel transfer data via the host bus 107.

In the previously listed Table 1 of the ratios of data transfer clock signal period to card operation clock signal period, necessary frequency division is carried out by the programmable frequency dividing circuit 100 as to ratios having a prime factor of 3 or 5 in a numerator. On the other hand, necessary frequency division is carried out in either a programmable frequency dividing circuit 101a or a programmable frequency dividing circuit 101d as to ratios having a prime factor of 3, 5, or 31 in a denominator. It should be understood that it is defined that the frequency of the operation clock signal of the UART must be a frequency (16×n) times (n is a positive integer) higher than frequency in the data transfer rate of the serial transfer data. In other words, the transfer rate becomes $\frac{1}{16}$ or less of the input operation clock signal 105 of the UART 102. Therefore, the operation clock signal generating circuit 101 for the UART 102 includes a ¼ frequency dividing section composed of a phase & frequency comparing circuit 101b, a voltage controlled oscillator (VCO) 101c, and a ¼ frequency dividing circuit 101e, and prevents the transfer rate from being decreased.

Next, the method for calculating a desirable ratio of data transfer clock signal period to card operation clock signal period in the system shown in FIG. 1 will now be described with reference to an example.

For example, in the case where the ratio of data transfer clock signal period to card operation clock signal period of 18.6 (=3×31÷5) is to be realized, the control unit 106 sets a frequency division ratio of 20 (=$2^2$×5) through the host bus 107 to the programmable frequency dividing circuit 100, another frequency division ratio of 93 (=3×31) to the programmable frequency dividing circuit 101$a$, and another frequency division ratio of 1 to the programmable frequency dividing circuit 101$d$. As a result, a clock signal generated by dividing the frequency of the basic clock signal by (3×31÷$2^2$) is outputted as the UART operation clock signal 105. Thus, the time required to transfer 1 bit data, namely "one etu" is equal to the time obtained by multiplying the time period of the operation clock signal 105 by at least 16. That is, this 1 etu becomes multiplication of (3×31÷$2^2$×16=3×31×$2^2$). Accordingly, as the ratio of data transfer clock signal period to card operation clock signal period, (3×31÷$2^2$)/($2^2$×5), namely (3×31÷5)=18.6 can be obtained.

As described above, it is possible to realize the general-purpose interface apparatus. However, to this end, there is a problem in that it is rather difficult to generate the necessary high-speed basic clock signal. Moreover, there is another problem in that power consumption is increased and also electromagnetic interference is increased.

In other words, in view of the specification of the UART, the frequency of the operation clock signal for the UART must be made 16 times, or more higher than the transfer rate. For this reason, for instance, when it is assumed that the ratio of data transfer clock signal period to card operation clock signal period after the initial response of the external clock signal IC card is equal to 11.625 (=3×31÷$2^3$), if the card operation clock signal frequency is selected to be 1, the transfer rate capable of realizing this ratio becomes ($2^3$÷(3×31)) times higher than this card operation clock signal frequency. Accordingly, the operation clock signal supplied to the UART must have the frequency of 16 times of the transfer rate, namely, $2^7$÷(3×31)=128/93 time the card operation clock signal frequency. However, in the above-described conventional circuit containing the 4-multiplication phase synchronization loop (PLL) circuit, it is not possible to generate a clock signal having a frequency higher than $2^2$÷(3×31). Therefore, the operation clock signal for the UART must be generated by frequency-dividing the card operation clock signal by $2^5$, namely 32. In other words, the basic clock signal should has the frequency at least 32 times higher than that of the card operation clock signal. For example, in order to transfer data to an IC card with external terminals operating with a clock signal having a frequency of 5 MHz, the basic clock signal having a frequency of 160 MHz at least is required. This requirement would cause the following problems. That is, for instance, in a system such as a battery-operated type portable computer, not only the power consumption is increased, but also the electromagnetic interference to external devices is increased. Also, it is rather difficult to generate such a basic clock signal having a properly selected high frequency.

In the above-described conventional technique as described in the Japanese Laid open Patent Disclosure, the PLL circuit required for the clock signal generating circuit is constituted by the analog voltage controlled oscillator (VCO) and the analog phase comparator. Therefore, there is a problem in that the space required for these analog circuits becomes several thousands to tens of thousands times larger than the space required for a digital circuit made of the digital transistors elements. Also, there is another problem in that the power consumption caused by stationarily flowing currents is large.

SUMMARY OF THE INVENTION

The present invention has been accomplished to solve the above-described problems. Therefore, an object of the present invention is to provide a method and apparatus for generating a clock signal in which the period of the clock signal is controlled.

Another object of the present invention is to provide a method and apparatus for generating a clock signal, in which a frequency of a basic clock signal can be reduced so that an interface apparatus can be compactly produced, resulting in low power consumption.

Still another object of the present invention is to provide a method and apparatus for generating a clock signal, in which a data transfer clock signal can be generated to satisfy each of all the ratios of data transfer clock signal period to an IC card with external terminals to a card operation clock signal period for the IC card, which are defined in the standards.

In order to achieve an aspect of the present invention, a clock signal generating apparatus includes an internal clock signal generating circuit for generating an internal clock signal, an adjustment data storing section for storing an adjusted period designating data and an adjustment content designating data, wherein the adjusted period designating data indicates ones of N periods (N is an integer larger than 1) of a desired clock signal for adjustment to be performed to obtain the desired clock signal, and the adjustment content designating data indicates a content of the adjustment, wherein one period of the desired clock signal is composed of a plurality of periods of the internal clock signal, an adjustment requesting section for selectively issuing an adjustment request based on the adjusted period designating data and the adjustment content designating data in response to input of the desired clock signal, and a desired clock signal generating section for performing the adjustment in response to the adjustment request while counting pulses of the internal clock signal, such that each of specific periods of the N periods designated by the adjusted period designating data is extended or shortened by at least one period of the internal clock signal based on the adjustment content designating data, and for generating the desired clock signal based on the adjustment result.

The adjusted period designating data may be composed of N bits corresponding to the N periods of the desired clock signal, and each of the N bits indicates whether the adjustment should be performed in the corresponding period. In this case, the adjustment requesting section may includes a shift register for shifting the adjusted period designating data in units of bits in response to each period of the desired clock signal to generate an adjustment position signal, and a section for issuing the adjustment request to the desired clock signal generating section based on the adjustment content designating data in response to the adjustment position signal.

Alternatively, the adjustment data storing section may includes an address register in which an address is externally set, and a table for storing a plurality of sets of the adjusted period designating data and the adjustment content designating data, and for outputting one of the plurality of sets in response to the address.

The desired clock signal generating section may includes a half period counter for counting periods of the internal clock signal for a half of each period of the desired clock signal, a reset section for omitting the last one of the periods of the internal clock signal for a half of each period of the desired clock signal when the adjustment request is received, and for resetting the half period counter to produce a pre-stage clock signal, and for counting the last one of the periods of the internal clock signal for a half of each period of the desired clock signal when the adjustment request is not received, and for resetting the half period counter to produce the pre-stage clock signal, and a desired signal counter for counting the pre-stage clock signal to generate the desired clock signal.

Alternatively, the desired clock signal generating section may includes a half period counter for counting periods of the internal clock signal for a half of each period of the desired clock signal, a reset section for counting a further one period of the internal clock signal after counting the periods of the internal clock signal for a half of each period of the desired clock signal when the adjustment request is received, and for resetting the half period counter to produce a pre-stage clock signal, and for counting the periods of the internal clock signal for a half of each period of the desired clock signal when the adjustment request is not received, and for resetting the half period counter to produce the pre-stage clock signal, and a desired signal counter for counting the pre-stage clock signal to generate the desired clock signal.

The desired clock signal generating section may perform the adjustment in response to the adjustment request such that the extension or shortening is performed in a first half of each of specific periods of the N periods designated by the adjusted period designating data. Also, the adjusted period designating data may be determined based on a difference between a target clock signal and the desired clock signal. Further, the desired clock signal generating section may include a half period counter for counting a predetermined number of periods of the internal clock signal for a half of each of the N periods of the desired clock signal. In this case, the adjustment content designating data is determined based on the predetermined number of periods of the internal clock signal.

In order to achieve another aspect of the present invention, a method for adjusting a period of a data transfer clock signal used for communication with an external unit, includes the steps of:

generating an internal clock;

generating a data transfer clock signal by counting periods of the internal clock signal, wherein one period of the data transfer clock signal is composed of a plurality of periods of the internal clock signal;

selectively issuing an adjustment request based on an adjusted period designating data and an adjustment content designating data in response to input of the data transfer clock signal, wherein the adjusted period designating data indicates to which periods of a data transfer clock signal of N periods (N is an integer larger than 1) adjustment should be performed, and the adjustment content designating data which indicates a content of the adjustment; and performing the adjustment in response to the adjustment request such that each of specific periods of the N periods designated by the adjusted period designating data is extended or shortened by at lease one period of the internal clock signal based on the adjustment content designating data.

In order to achieve still another aspect of the present invention, an interface apparatus between a control unit and an external unit, includes an internal clock signal generating circuit for generating an internal clock, an adjustment data storing section for storing an adjusted period designating data which indicates to which periods of a data transfer clock signal adjustment should be performed, and an adjustment content designating data which indicates a content of the adjustment, wherein the data transfer clock signal is used for communication between the control unit and the External unit, is composed of 12 periods including a start bit period, one period of the data transfer clock signal is composed of M periods (M is an integer larger than N) of the internal clock signal, an adjustment requesting section for selectively issuing an adjustment request based on the adjusted period designating data and the adjustment content designating data in response to input of the data transfer clock signal, a data transfer clock signal generating section for generating the data transfer clock signal by counting pulses of the internal clock signal, wherein the data transfer clock signal generating section performs the adjustment in response to the adjustment request such that each of specific periods of the N periods designated by the adjusted period designating data is extended or shortened by at lease one period of the internal clock signal based on the adjustment content designating data, and a serial/parallel converter for converting a parallel communication data from the control unit into a serial form to output to the external unit using the data transfer clock signal, and for converting a serial communication data from the External unit into a parallel form to output to the control unit using the data transfer clock signal.

BRIEF DESCRIPTION OF THE DRAWINGS

A more complete understanding of the teachings of the present invention may be acquired by referring to the accompanying drawings, in which like reference numbers indicate like features and wherein.

DETAILED DESCRIPTION OF THE PREFERRED EMBODIMENTS

An interface apparatus of the present invention will be described below in detail with reference to the accompanying drawings.

Figure 1:
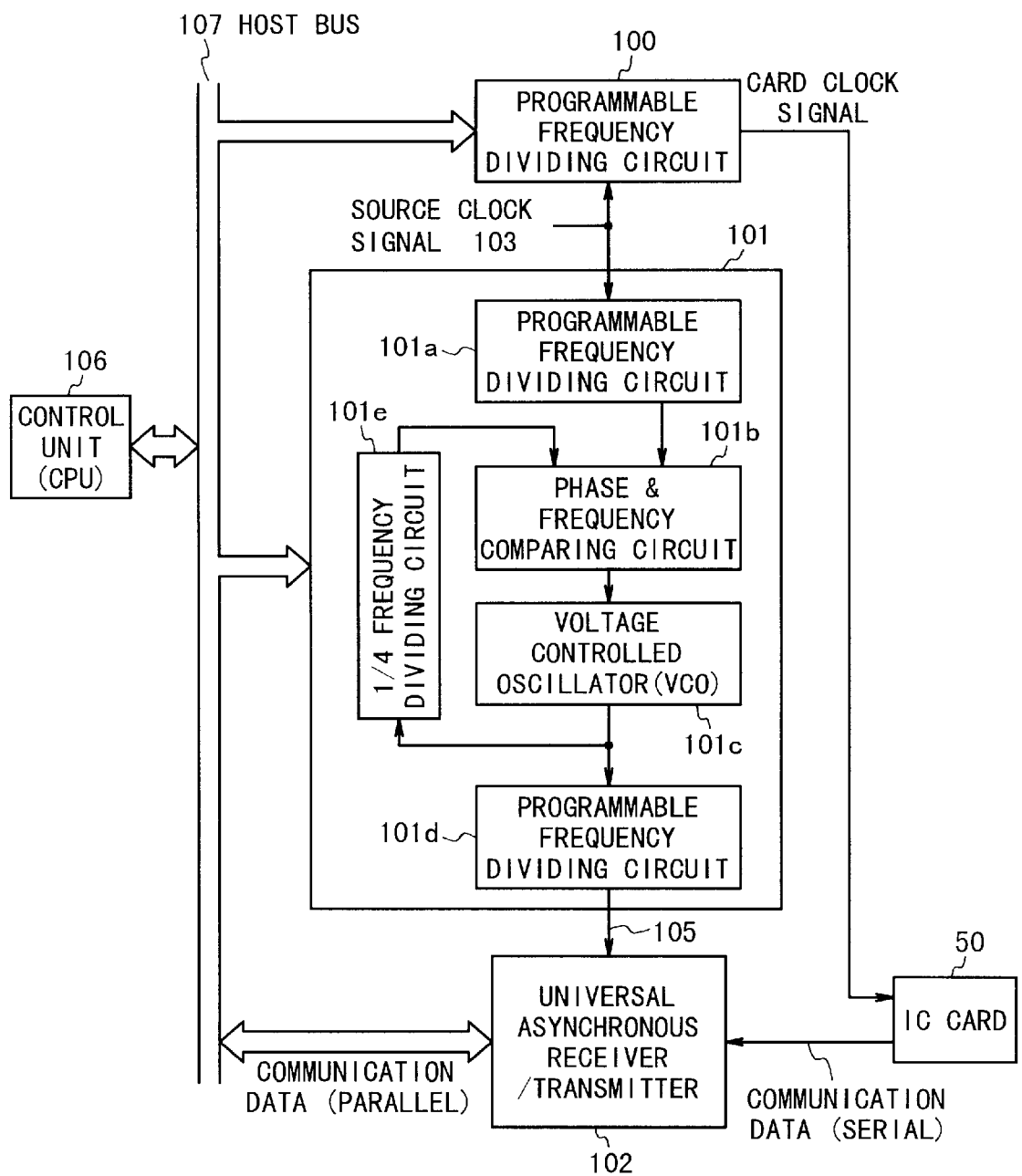
FIG. 1 is a schematic block diagram illustrating the structure of a conventional example of an interface apparatus.
Figure 2:
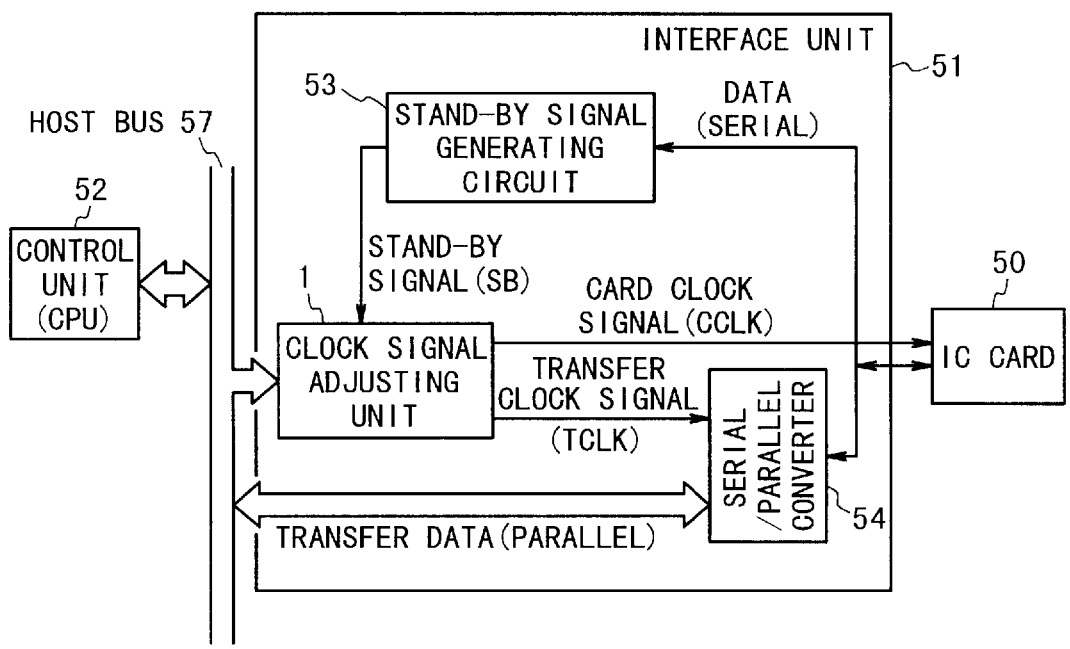
FIG. 2 is a schematic block diagram illustrating the structure of an interface apparatus according to a first embodiment of the present invention.

FIG. 2 is a schematic block diagram illustrating the structure of an interface apparatus according to a first embodiment of the present invention. Referring to FIG. 2, the interface apparatus 51 according to the first embodiment is connected to a control unit (CPU) 52 via a host bus 57 and to an IC card 50 with external terminals. The interface apparatus 51 is composed of a clock signal adjusting unit 1, a stand-by signal generating circuit 53, and a serial/parallel converter 54. The serial/parallel converter 54 converts a transfer data transmitted/received between the control unit 52 and the IC card 50 via the host bus 57 from a serial form into a parallel form or from the parallel form into the serial form. The stand-by signal generating circuit 53 inputs therein the serial transfer data outputted from the serial/parallel converter 54 to the IC card 50 and detects start/end timing of the data transfer operation to thereby generate the stand-by signal SB. The clock signal adjusting unit 1 inputs therein the stand-by signal SB under control of the control unit 52 and generates a card operation clock signal CCLK and a data transfer clock signal TCLK from the source clock signal based on the stand-by signal SB. This card operation clock signal CCLK is supplied to the IC card 50, whereas the data transfer clock signal TCLK is supplied to the serial/parallel converter 54.

Figure 3:
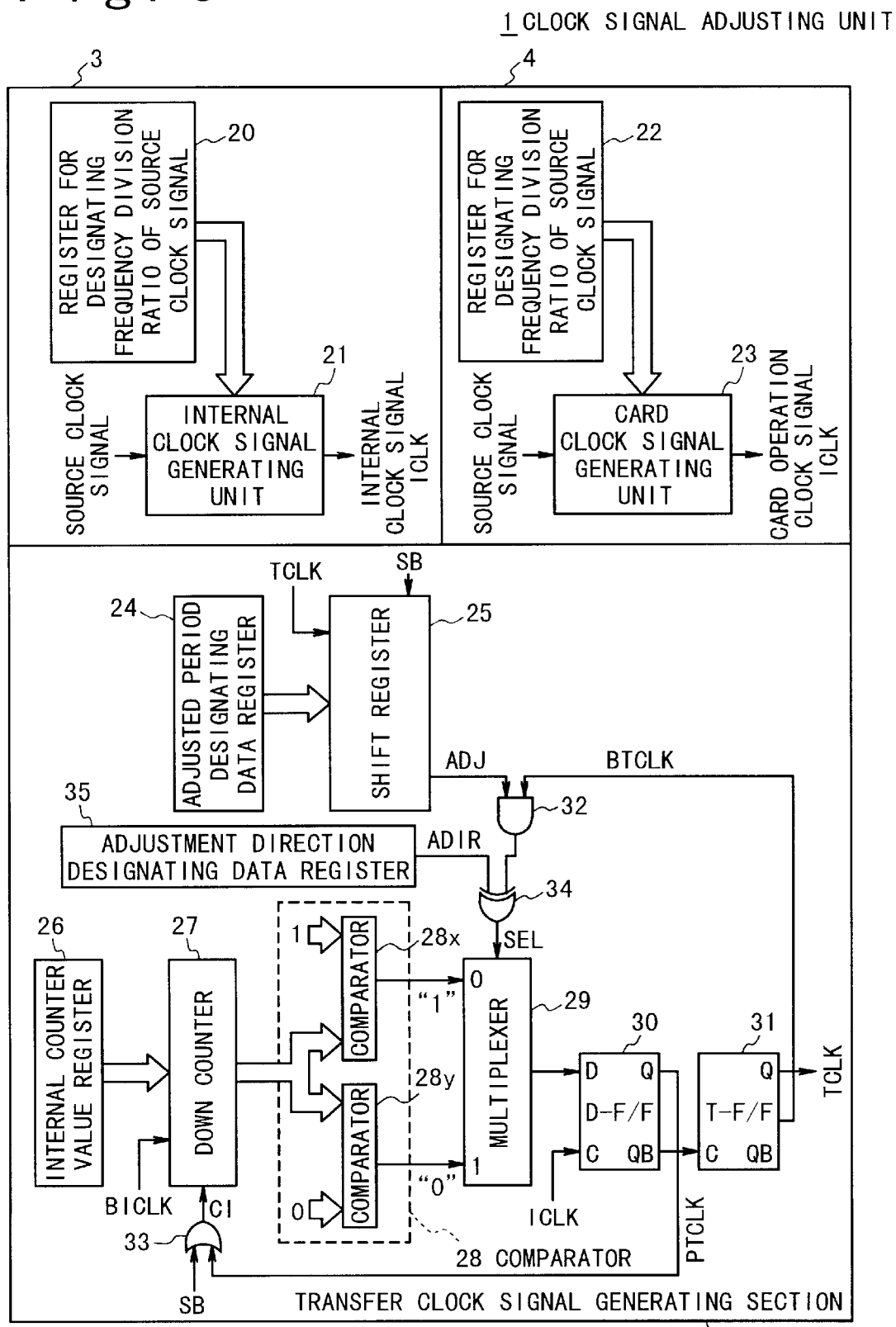
FIG. 3 is a schematic block diagram illustrating the structure of a clock signal adjusting unit in the interface apparatus according to the first embodiment of the present invention.

FIG. 3 is a schematic block diagram illustrating the structure of the clock signal adjusting unit 1 of the interface apparatus according to the first embodiment of the present invention.

Referring to FIG. 3, the clock signal adjusting unit 1 according to the first embodiment is composed of an internal clock signal generating section 3, a card operation clock signal generating section 4, and a data transfer clock signal generating section 2.

The internal clock signal generating section 3 is a programmable frequency dividing circuit. The internal clock signal generating section 3 is composed of a register 20 for storing data for designating a frequency division ratio and an internal clock signal generating unit 21 for generating an internal clock signal ICLK for the interface apparatus based on the frequency division ratio designating data.

The card operation clock signal generating section 4 is a programmable frequency dividing circuit and is composed of a register 22 for storing data for designating a frequency division ratio and a card operation clock signal generating unit 23 for generating the card operation clock signal CCLK for the IC card 50 at an instructed frequency division ratio, based on the frequency division ratio designating data.

The data transfer clock signal generating section 2 generates the data transfer clock signal TCLK from the internal clock signal ICLK generated by the internal clock signal generating unit 21 in accordance with the predetermined frequency division ratio. The data transfer clock signal generating section 2 controls the generation timing of the data transfer clock signal TCLK to supply the controlled data transfer clock signal TCLK to the serial/parallel converter 54. The data transfer clock signal TCLK generating section 2 is composed of an adjusted period designating data register 24, a shift register 25, an internal counter value register 26, a down counter 27, a comparator 28, a multiplexer 29, a D-type flip-flop (D-F/F) 30, a T-type flip-flop (T-F/F) 31, an AND gate 32, an OR gate 33, and an exclusive OR gate 34.

The D-type flip-flop (D-F/F) 30 inputs the internal clock signal ICLK at a clock terminal C and an output of the multiplexer 29 at a data terminal D. Also, the D-type flip-flop 30 outputs a previous stage data transfer clock signal PTCLK divided in frequency in accordance with a predetermined frequency division ratio, and having periods controlled based on the output of the multiplexer 29. The T-type flip-flop (T-F/F) 31 inputs the inverted output of the previous stage data transfer clock signal PTCLK from the D-type flip-flop 30 at the clock terminal C. The T-type flip-flop (T-F/F) 31 divides the inverted previous stage data transfer clock signal by 2 in frequency in a toggled manner to thereby generate the data transfer clock signal TCLK. The inverted signal BTCLK of the data transfer signal TCLK is supplied to the AND gate 32.

The down counter 27 inputs a predetermined internal counter value from the register 26 and counts down the internal counter value in response to an inverted signal BICLK of the internal clock signal ICLK. The predetermined internal counter value is a value indicative of a half of one period of the data transfer clock signal TCLK. The down counter 27 outputs the count value to the comparator 28. The OR gate 33 inputs the stand-by signal SB and the previous stage data transfer clock signal PTCLK to generate a counter initialize signal CI. The down counter 27 is reset in response to the counter initialize signal CI from the OR gate 33.

The shift register 25 is activated in response to the stand-by signal SB. In the active state, the shift register 25 inputs an adjusted period designating data ADJ of 12 bits from the register 24 and shifts the adjusted period designating data APD one bit by one bit in response to the data transfer clock signal TCLK. Each bit of the adjusted period designating data APD corresponds to one of the 12 periods of the data transfer clock signal TCLK, and indicates whether adjustment of period length should be performed in the corresponding period. Then, the shift register 25 outputs the shifted value as a period adjustment designation bit signal ADJ for the data transfer clock signal TCLK within one character. A logical product of the period adjustment designation bit signal ADJ and the inverted data transfer clock signal BTCLK is calculated by the AND gate 32.

An adjustment direction designating data ADIR indicating whether each of periods of the data transfer clock signal TCLK is to be extended or shortened is set in the adjustment direction designating register 35. The exclusive OR gate 34 inputs the output of the AND gate 32 and the adjustment direction designating data ADIR from the register 24 and calculates a logical exclusive sum to output the calculating result as a selection signal SEL.

The comparator 28 outputs either an internal signal "1" or "0" in response to the output of the down counter 27. The multiplexer 29 enters therein the output signals from the comparator 28 at the terminals "0" and "1". Then, the multiplexer 29 outputs the internal signal of either "1" or "0" to the D-type flip-flop 30 based on the selection signal SEL from the exclusive OR gate 34.

It should be noted that in FIG. 3, there is shown the comparator 28 arranged by a first comparator 28x and a second comparator 28y. The first comparator 28x outputs the internal signal of "1" when the count value outputted from the 16-bit down counter 27 is "1", and the second comparator 28y outputs the internal signal of "0" when the count value outputted from the down counter 27 is "0". Alternatively, this comparator 28 may be formed a single comparator.

Figure 4:
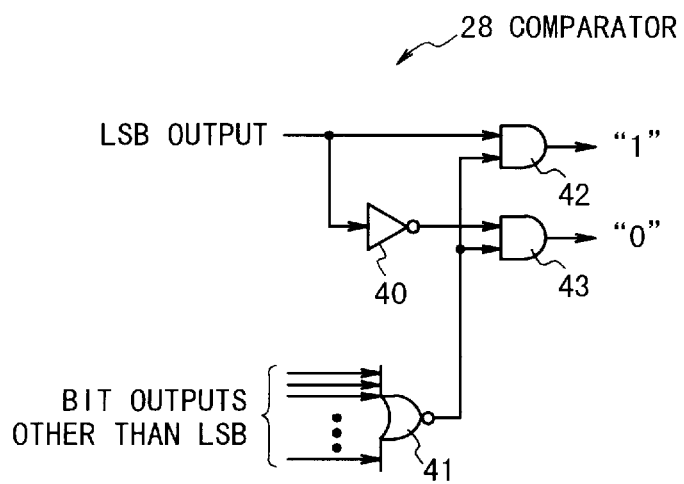
FIG. 4 is a circuit arrangement of a comparator 28 of the clock signal adjusting unit in the interface apparatus according to the first embodiment shown in FIG. 3.

FIG. 4 is an example of the comparator 28. This comparator 28 is composed of a NOR gate 41, an inverter 40, and AND gates 42 and 43. The NOR gate 41 outputs an inverted logical sum of all bits of the counter output except for the least significant bit (LSB). The inverter 40 inverts the least significant bit of the counter output to output the inverted LSB signal. The AND gate 42 calculates a logical product of the least significant bit of the counter output and the output of the NOR gate 41 to output the internal signal of "1". The AND gate 43 calculates a logical product of the output of the inverter 40 and the output of the NOR gate 41 to output the internal signal of "0". That is, the comparator 28 outputs the internal signal of "1" or "0" based on the LSB of the internal counter value from the register 26 when the last bit of a half of each period of the data transfer clock signal TCLK is counted down.

Figure 5:
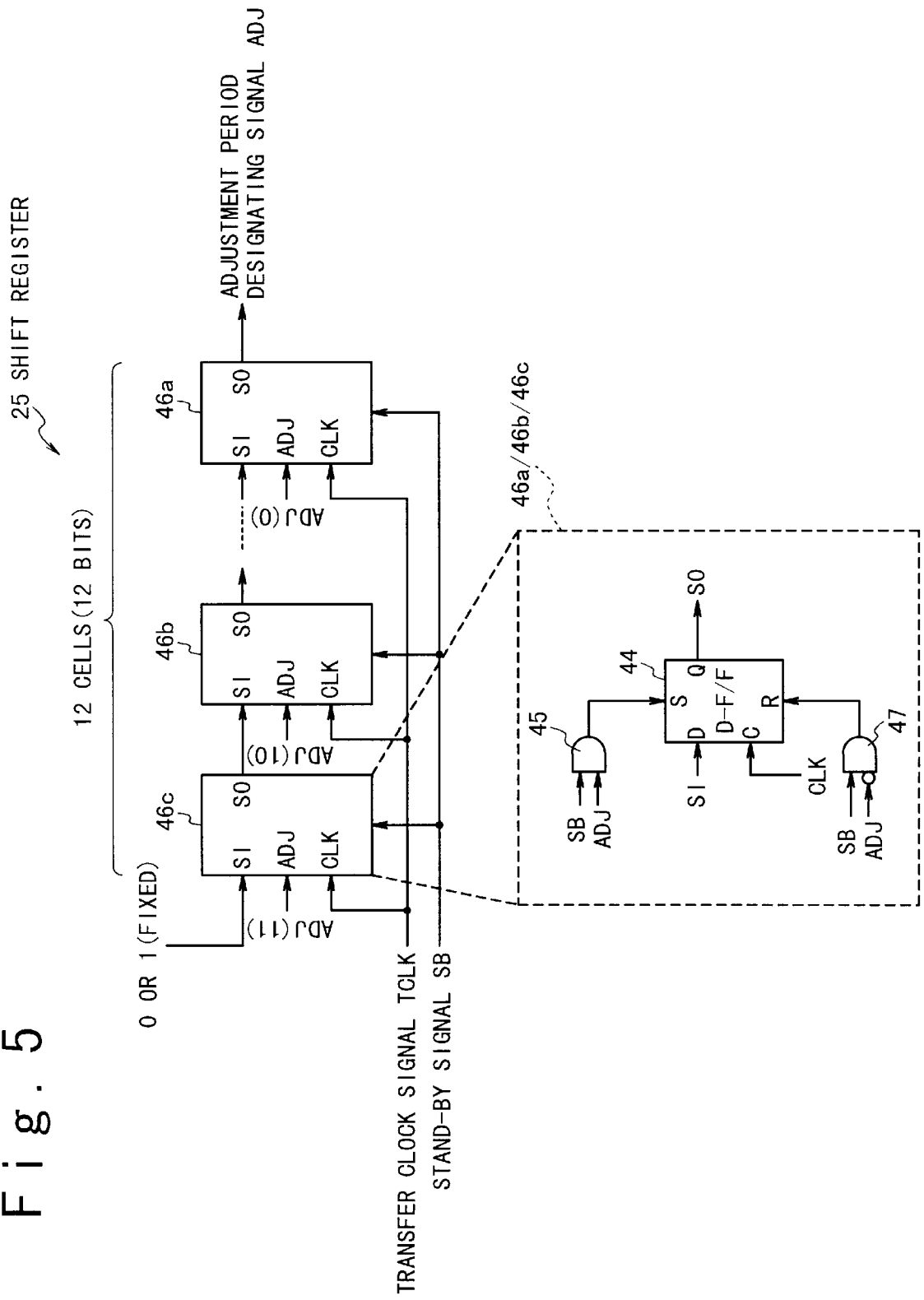
FIG. 5 is a circuit arrangement illustrating the structure of a 12-bit shift register 25 of the clock signal adjusting unit in the interface apparatus according to the first embodiment shown in FIG. 3.

Also, FIG. 5 shows an example of the 12-bit shift register 25. The shift register 25 is composed of 12 register cells 46 (46a, 46b, 46c, . . . ). In each of these register cells 46, an output of a previous stage register cell as an SI signal is inputted to an SI input terminal. The stand-by signal SB is inputted to a stand-by input terminal and the data transfer clock signal TCLK is inputted to a CLK input terminal. The period adjustment designation bit signals ADJi (i is an integer in a range of 0 to 11) are inputted from the 12-bit shift register 24. An SO output terminal outputs data to the next stage register cell.

Furthermore, each of these register cells 46 is composed of a D-type flip-flop 44 having both a set function and a reset function, and AND gates 45 and 47. In this D-type flip-flop 44, the SI signal is supplied to a data terminal D. The data transfer clock signal TCLK is inputted into a clock terminal C. The output derived from the AND gate 45 for calculating a logical product of the stand-by signal SB and the ADJi signal is entered into a set terminal S. The output derived from the AND gate 47 for calculating a logical product of the stand-by signal SB and the inverted ADJi signal is supplied to a reset terminal R. In other words, the register cells 46 constitutes a 1-bit shift register. The register cell operates in such a manner that the output SO of the D-type flip-flop 44 is initialized to have the value of the ADJi signal when the stand-by signal SB becomes "1". Also, the register cell operates to shift the SI signal input to the SO signal output at a rising edge of the data transfer clock signal TCLK signal when the stand-by signal SB becomes "0".

Figure 6:
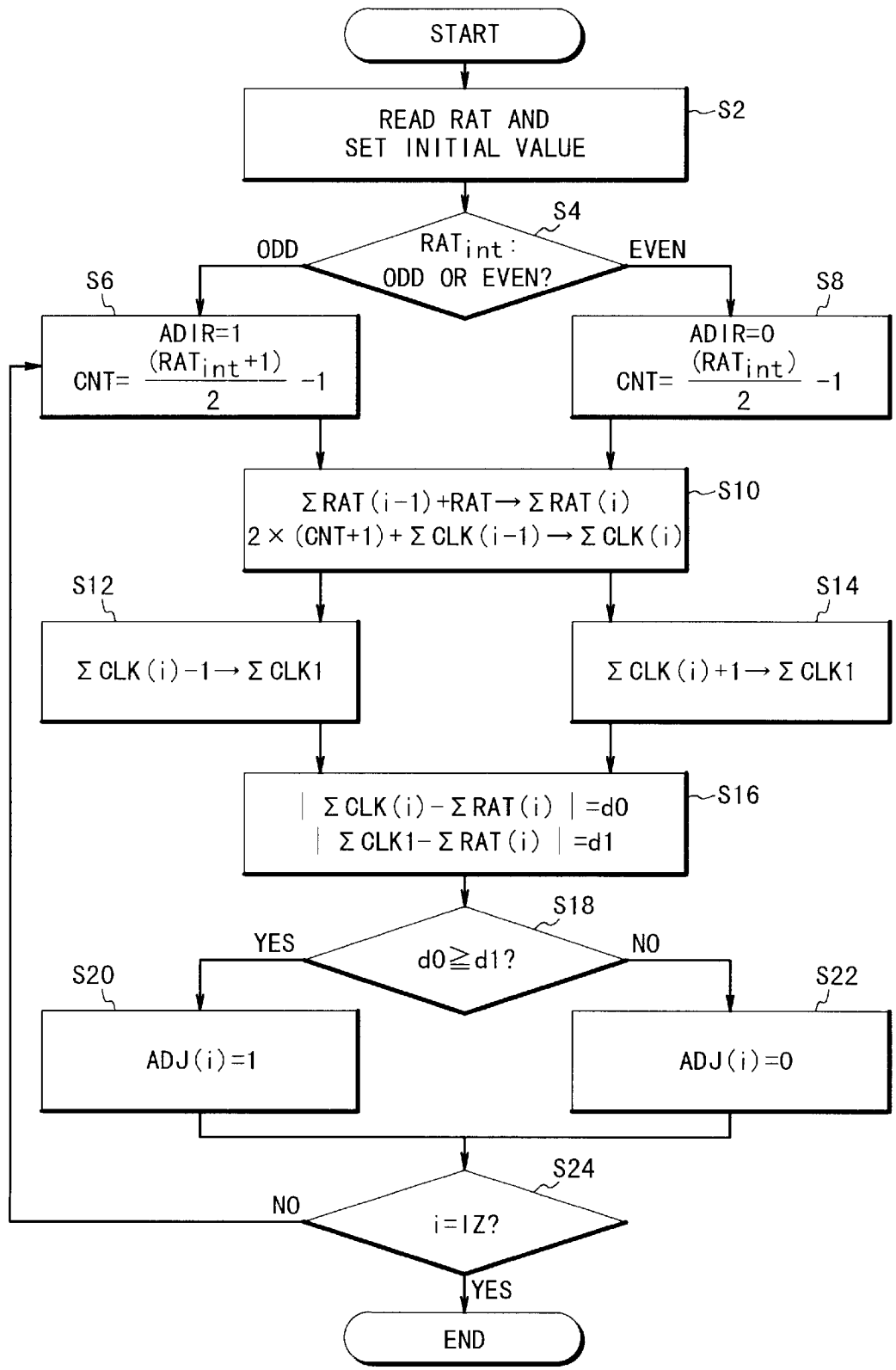
FIG. 6 is a flow chart for describing a calculation operation of a parameter.

Various kinds of values set in the clock signal adjusting unit 1 may be calculated in the below-mentioned methods. These values are the period adjustment designating data (APD) to be set in the shift register 25, a 1-bit adjustment direction designating data (ADIR) indicative of an increase/decrease direction of the period adjustment, and an initial counter value (CNT) to be set in the down counter 27. FIG. 6 is a flow chart illustrating the methods. The above values are determined in correspondence with the ratio (RAT) of data transfer clock signal period to card operation clock signal period for every serial number in the above Table 1.

First, the 1-bit adjustment direction designating data ADIR and the 16-bit internal counter value CNT are calculated as follows:

In a step S2, one of the ratios RATs is read from the above Table 1 and initial values are set.

In a step S4, it is determined whether an integer portion (RATint) of the ratio RAT except for a fractional portion is an odd number or an even number. When the integer portion (RATint) is an even number, a step S8 is executed, whereas when the integer portion (RATint) is an odd number, a step S6 is executed.

In the step S6, it is set that ADIR=1 and CNT=(RATint+1)/2−1. On the other hand, in the step S8, it is set that ADIR=0 and CNT=(RATint)/2−1.

Next, in the following steps, the 12-bit period adjustment designating data APD will be successively calculated from the least significant bit (LSB) one bit by one bit. In the following description, the bit values ADJ of the period adjustment designating data APD are expressed as ADJ(i) (note i=0 to 11), and a summation of ratio RAT up to ith-bit is expressed as $\Sigma RAT(i)$ in the description. Also, a summation of counted values of the internal clock signal ICLK up to ith-bit is expressed as $\Sigma CLK(i)$ in the description.

First, in a step S10, a summation of $\Sigma RAT(i-1)$ and the ratio RAT is calculated as $\Sigma RAT(i)$, and $\Sigma CLK(i)$ is recognized as a summation of $(CNT+1)\times 2$ and $\Sigma CLK(i-1)$. In the case of the least significant ADJ(0), the ratio RAT is substituted for $\Sigma RAT(0)$, and $\Sigma CLK(0)$ is recognized as $(CNT+1)\times 2$.

Next, in a step S12, if the adjustment direction data ADIR is equal to 1, then $\Sigma CLK1=\Sigma CLK(i)+1$. On the other hand, in a step S14, if the adjustment direction data ADIR is equal to 0, then $\Sigma CLK1=\Sigma CLK(i)-1$.

Thereafter, in a step S16, $\Sigma CLK1$ and $\Sigma CLK(i)$ are compared with $\Sigma RAT(i)$ to calculate absolute values d0 and d1 of the differences, respectively.

Next, in a step S18, a selection is made whether $\Sigma CLK1$ and $\Sigma CLK(i)$ is closer to $\Sigma RAT(i)$.

Next, in a step S20, if $\Sigma CLK(i)$ is selected, then ADJ(i)=0. If $\Sigma CLK1$ is selected, then ADJ(i)=1 in a step S22.

Next, in a step S24, whether the processing is completed to all the 12 bits is determined. If the processing not completed, the processing of the step S6 or S8 is executed again.

In this manner, as explained above, the period adjustment designating data APD, the 1-bit adjustment direction designating data (ADIR), and the internal counter values (CNT) are calculated for each of the ratios RAT from the serial number 1 to the serial number 83 listed in the table 1. These calculated values are listed in the following Table 2 to Table 84.

TABLE 2

1 IN CASE OF CLOCK PERIOD RATIO (RAT) OF 11.62500
ADIR = 1, CNT = 5(0005h), ADJ = 001001010010b(252h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 12.0000 | 11.6250 | 0.3750 | 0.0323 |
| 2 | 1 | 23.0000 | 23.2500 | −0.2500 | −0.0215 |
| 3 | 0 | 35.0000 | 34.8750 | 0.1250 | 0.0108 |
| 4 | 0 | 47.0000 | 46.5000 | 0.5000 | 0.0430 |
| 5 | 1 | 58.0000 | 58.1250 | −0.1250 | −0.0108 |
| 6 | 0 | 70.0000 | 69.7500 | 0.2500 | 0.0215 |
| 7 | 1 | 81.0000 | 81.3750 | −0.3750 | −0.0323 |
| 8 | 0 | 93.0000 | 93.0000 | 0.0000 | 0.0000 |
| 9 | 0 | 105.0000 | 104.6250 | 0.3750 | 0.0323 |
| 10 | 1 | 116.0000 | 116.2500 | −0.2500 | −0.0215 |
| 11 | 0 | 128.0000 | 127.8750 | 0.1250 | 0.0108 |
| 12 | 0 | 140.0000 | 139.5000 | 0.5000 | 0.0430 |

TABLE 3

2 IN CASE OF CLOCK PERIOD RATIO (RAT) OF 16.0000
ADIR = 0, CNT = 7(0007h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 16.0000 | 16.0000 | 0.0000 | 0.0000 |
| 2 | 0 | 32.0000 | 32.0000 | 0.0000 | 0.0000 |
| 3 | 0 | 48.0000 | 48.0000 | 0.0000 | 0.0000 |
| 4 | 0 | 64.0000 | 64.0000 | 0.0000 | 0.0000 |
| 5 | 0 | 80.0000 | 80.0000 | 0.0000 | 0.0000 |
| 6 | 0 | 96.0000 | 96.0000 | 0.0000 | 0.0000 |
| 7 | 0 | 112.0000 | 112.0000 | 0.0000 | 0.0000 |
| 8 | 0 | 128.0000 | 128.0000 | 0.0000 | 0.0000 |
| 9 | 0 | 144.0000 | 144.0000 | 0.0000 | 0.0000 |
| 10 | 0 | 160.0000 | 160.0000 | 0.0000 | 0.0000 |
| 11 | 0 | 176.0000 | 176.0000 | 0.0000 | 0.0000 |
| 12 | 0 | 192.0000 | 192.0000 | 0.0000 | 0.0000 |

TABLE 4

3 IN CASE OF CLOCK PERIOD RATIO (RAT) OF 17.43750
ADIR = 1, CNT = 8(0008h), ADJ = 101101010101b(B55h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 1 | 17.0000 | 17.4375 | −0.4375 | −0.0251 |
| 2 | 0 | 35.0000 | 34.8750 | 0.1250 | 0.0072 |
| 3 | 1 | 52.0000 | 52.3125 | −0.3125 | −0.0179 |
| 4 | 0 | 70.0000 | 69.7500 | 0.2500 | 0.0143 |
| 5 | 1 | 87.0000 | 87.1875 | −0.1875 | −0.0108 |
| 6 | 0 | 105.0000 | 104.6250 | 0.3750 | 0.0215 |
| 7 | 1 | 122.0000 | 122.0625 | −0.0625 | −0.0036 |
| 8 | 0 | 140.0000 | 139.5000 | 0.5000 | 0.0287 |
| 9 | 1 | 157.0000 | 156.9375 | 0.0625 | 0.0036 |
| 10 | 1 | 174.0000 | 174.3750 | −0.3750 | −0.0215 |
| 11 | 0 | 192.0000 | 191.8125 | 0.1875 | 0.0108 |
| 12 | 1 | 209.0000 | 209.2500 | −0.2500 | −0.0143 |

TABLE 5

4 IN CASE OF CLOCK PERIOD RATIO (RAT) OF 18.60000
ADIR = 0, CNT = 8(0008h), ADJ = 011010110101b(6B5h)

| BIT NO. | ADJ | COUNT OF INTERNAL CLOCK ($\Sigma CLK(i)$) | SUMMATION OF TRANSFER RATE/etu ($\Sigma RAT(i)$) | DEVIATION ($\Sigma CLK(i) - \Sigma RAT(i)$) | ERROR/etu |
|---|---|---|---|---|---|
| 1 | 1 | 19.0000 | 18.6000 | 0.4000 | 0.0215 |
| 2 | 0 | 37.0000 | 37.2000 | −0.2000 | −0.0108 |
| 3 | 1 | 56.0000 | 55.8000 | 0.2000 | 0.0108 |
| 4 | 0 | 74.0000 | 74.4000 | −0.4000 | −0.0215 |
| 5 | 1 | 93.0000 | 93.0000 | 0.0000 | 0.0000 |
| 6 | 1 | 112.0000 | 111.6000 | 0.4000 | 0.0215 |
| 7 | 0 | 130.0000 | 130.2000 | −0.2000 | −0.0108 |
| 8 | 1 | 149.0000 | 148.8000 | 0.2000 | 0.0108 |
| 9 | 0 | 167.0000 | 167.4000 | −0.4000 | −0.0215 |
| 10 | 1 | 186.0000 | 186.0000 | 0.0000 | 0.0000 |
| 11 | 1 | 205.0000 | 204.6000 | 0.4000 | 0.0215 |
| 12 | 0 | 223.0000 | 223.2000 | −0.2000 | −0.0108 |

TABLE 6

5 IN CASE OF CLOCK PERIOD RATIO (RAT) OF 23.25000
ADIR = 1, CNT = 11(000Bh), ADJ = 110111011101b(DDDh)

| BIT NO. | ADJ | COUNT OF INTERNAL CLOCK ($\Sigma CLK(i)$) | SUMMATION OF TRANSFER RATE/etu ($\Sigma RAT(i)$) | DEVIATION ($\Sigma CLK(i) - \Sigma RAT(i)$) | ERROR/etu |
|---|---|---|---|---|---|
| 1 | 1 | 23.0000 | 23.2500 | −0.2500 | −0.0108 |
| 2 | 0 | 47.0000 | 46.5000 | 0.5000 | 0.0215 |
| 3 | 1 | 70.0000 | 69.7500 | 0.2500 | 0.0108 |
| 4 | 1 | 93.0000 | 93.0000 | 0.0000 | 0.0000 |
| 5 | 1 | 116.0000 | 116.2500 | −0.2500 | −0.0108 |
| 6 | 0 | 140.0000 | 139.5000 | 0.5000 | 0.0215 |
| 7 | i | 163.0000 | 162.7500 | 0.2500 | 0.0108 |
| 8 | 1 | 186.0000 | 186.0000 | 0.0000 | 0.0000 |
| 9 | 1 | 209.0000 | 209.2500 | −0.2500 | −0.0108 |
| 10 | 0 | 233.0000 | 232.5000 | 0.5000 | 0.0215 |
| 11 | 1 | 256.0000 | 255.7500 | 0.2500 | 0.0108 |
| 12 | 1 | 279.0000 | 279.0000 | 0.0000 | 0.0000 |

TABLE 7

6 IN CASE OF CLOCK PERIOD RATIO (RAT) OF 24.00000
ADIR = 0, CNT = 11(000Bh), ADJ = 000000000000(000h)

| BIT NO. | ADJ | COUNT OF INTERNAL CLOCK ($\Sigma CLK(i)$) | SUMMATION OF TRANSFER RATE/etu ($\Sigma RAT(i)$) | DEVIATION ($\Sigma CLK(i) - \Sigma RAT(i)$) | ERROR/etu |
|---|---|---|---|---|---|
| 1 | 0 | 24.0000 | 24.0000 | 0.0000 | 0.0000 |
| 2 | 0 | 48.0000 | 48.0000 | 0.0000 | 0.0000 |
| 3 | 0 | 72.0000 | 72.0000 | 0.0000 | 0.0000 |
| 4 | 0 | 96.0000 | 96.0000 | 0.0000 | 0.0000 |
| 5 | 0 | 120.0000 | 120.0000 | 0.0000 | 0.0000 |
| 6 | 0 | 144.0000 | 144.0000 | 0.0000 | 0.0000 |
| 7 | 0 | 168.0000 | 168.0000 | 0.0000 | 0.0000 |
| 8 | 0 | 192.0000 | 192.0000 | 0.0000 | 0.0000 |
| 9 | 0 | 216.0000 | 216.0000 | 0.0000 | 0.0000 |
| 10 | 0 | 240.0000 | 240.0000 | 0.0000 | 0.0000 |
| 11 | 0 | 264.0000 | 264.0000 | 0.0000 | 0.0000 |
| 12 | 0 | 288.0000 | 288.0000 | 0.0000 | 0.0000 |

TABLE 8

7 IN CASE OF CLOCK PERIOD RATIO (RAT) OF 25.60000
ADIR = 1, CNT = 12(000Ch), ADJ = 100101001010b(94Ah)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i)−$\Sigma$RAT(i)) | ERROR/etu |
|---|---|---|---|---|---|
| 1 | 0 | 26.0000 | 25.6000 | 0.4000 | 0.0156 |
| 2 | 1 | 51.0000 | 51.2000 | −0.2000 | −0.0078 |
| 3 | 0 | 77.0000 | 76.8000 | 0.2000 | 0.0078 |
| 4 | 1 | 102.0000 | 102.4000 | −0.4000 | −0.0156 |
| 5 | 0 | 128.0000 | 128.0000 | 0.0000 | 0.0000 |
| 6 | 0 | 154.0000 | 153.6000 | 0.4000 | 0.0156 |
| 7 | 1 | 179.0000 | 179.2000 | −0.2000 | −0.0078 |
| 8 | 0 | 205.0000 | 204.8000 | 0.2000 | 0.0078 |
| 9 | 1 | 230.0000 | 230.4000 | −0.4000 | −0.0156 |
| 10 | 0 | 256.0000 | 256.0000 | 0.0000 | 0.0000 |
| 11 | 0 | 282.0000 | 281.6000 | 0.4000 | 0.0156 |
| 12 | 1 | 307.0000 | 307.2000 | −0.2000 | −0.0078 |

TABLE 9

8 IN CASE OF CLOCK PERIOD RATIO (RAT) OF 27.90000
ADIR = 1, CNT = 13(000Dh), ADJ = 000000100000b(020h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i)−$\Sigma$RAT(i)) | ERROR/etu |
|---|---|---|---|---|---|
| 1 | 0 | 28.0000 | 27.9000 | 0.1000 | 0.0036 |
| 2 | 0 | 56.0000 | 55.8000 | 0.2000 | 0.0072 |
| 3 | 0 | 84.0000 | 83.7000 | 0.3000 | 0.0108 |
| 4 | 0 | 112.0000 | 111.6000 | 0.4000 | 0.0143 |
| 5 | 0 | 140.0000 | 139.5000 | 0.5000 | 0.0179 |
| 6 | 1 | 167.0000 | 167.4000 | −0.4000 | −0.0143 |
| 7 | 0 | 195.0000 | 195.3000 | −0.3000 | −0.0108 |
| 8 | 0 | 223.0000 | 223.2000 | −0.2000 | −0.0072 |
| 9 | 0 | 251.0000 | 251.1000 | −0.1000 | −0.0036 |
| 10 | 0 | 279.0000 | 279.0000 | 0.0000 | 0.0000 |
| 11 | 0 | 307.0000 | 306.9000 | 0.1000 | 0.0036 |
| 12 | 0 | 335.0000 | 334.8000 | 0.2000 | 0.0072 |

TABLE 10

9 IN CASE OF CLOCK PERIOD (RAT) OF 31.00000
ADIR = 1, CNT = 15(000Fh), ADJ = 111111111111b(FFFh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i)−$\Sigma$RAT(i)) | ERROR/etu |
|---|---|---|---|---|---|
| 1 | 1 | 31.0000 | 31.0000 | 0.0000 | 0.0000 |
| 2 | 1 | 62.0000 | 62.0000 | 0.0000 | 0.0000 |
| 3 | 1 | 93.0000 | 93.0000 | 0.0000 | 0.0000 |
| 4 | 1 | 124.0000 | 124.0000 | 0.0000 | 0.0000 |
| 5 | 1 | 155.0000 | 155.0000 | 0.0000 | 0.0000 |
| 6 | 1 | 186.0000 | 186.0000 | 0.0000 | 0.0000 |
| 7 | 1 | 217.0000 | 217.0000 | 0.0000 | 0.0000 |
| 8 | 1 | 248.0000 | 248.0000 | 0.0000 | 0.0000 |
| 9 | 1 | 279.0000 | 279.0000 | 0.0000 | 0.0000 |
| 10 | 1 | 310.0006 | 310.0000 | 0.0000 | 0.0000 |
| 11 | 1 | 341.0000 | 341.0000 | 0.0000 | 0.0000 |
| 12 | 1 | 372.0000 | 372.0000 | 0.0000 | 0.0000 |

TABLE 11

10 IN CASE OF CLOCK PERIOD RATIO (RAT) OF 32.00000
ADIR = 0, CNT = 15(000Fh), ADJ = 000000000000b(000h)

| BIT NO. | ADJ | COUNT OF INTERNAL CLOCK (ΣCLK(i)) | SUMMATION OF TRANSFER RATE/etu (ΣRAT(i)) | DEVIATION (ΣCLK(i)− ΣRAT(i)) | ERROR/etu |
|---|---|---|---|---|---|
| 1 | 0 | 32.0000 | 32.0000 | 0.0000 | 0.0000 |
| 2 | 0 | 64.0000 | 64.0000 | 0.0000 | 0.0000 |
| 3 | 0 | 96.0000 | 96.0000 | 0.0000 | 0.0000 |
| 4 | 0 | 128.0000 | 128.0000 | 0.0000 | 0.0000 |
| 5 | 0 | 160.0000 | 160.0000 | 0.0000 | 0.0000 |
| 6 | 0 | 192.0000 | 192.0000 | 0.0000 | 0.0000 |
| 7 | 0 | 224.0000 | 224.0000 | 0.0000 | 0.0000 |
| 8 | 0 | 256.0000 | 256.0000 | 0.0000 | 0.0000 |
| 9 | 0 | 288.0000 | 288.0000 | 0.0000 | 0.0000 |
| 10 | 0 | 320.0000 | 320.0000 | 0.0000 | 0.0000 |
| 11 | 0 | 352.0000 | 352.0000 | 0.0000 | 0.0000 |
| 12 | 0 | 384.0000 | 384.0000 | 0.0000 | 0.0000 |

TABLE 12

11 IN CASE OF CLOCK PERIOD RATIO (RAT) OF 34.87500
ADIR = 0, CNT = 16(0010h), ADJ = 011111110111b(7F7h)

| BIT NO. | ADJ | COUNT OF INTERNAL CLOCK (ΣCLK(i)) | SUMMATION OF TRANSFER RATE/etu (ΣRAT(i)) | DEVIATION (ΣCLK(i)− ΣRAT(i)) | ERROR/etu |
|---|---|---|---|---|---|
| 1 | 1 | 35.0000 | 34.8750 | 0.1250 | 0.0036 |
| 2 | 1 | 70.0000 | 69.7500 | 0.2500 | 0.0072 |
| 3 | 1 | 105.0000 | 104.6250 | 0.3750 | 0.0108 |
| 4 | 0 | 139.0000 | 139.5000 | −0.5000 | −0.0143 |
| 5 | 1 | 174.0000 | 174.3750 | −0.3750 | −0.0108 |
| 6 | 1 | 209.0000 | 209.2500 | −0.2500 | −0.0072 |
| 7 | 1 | 244.0000 | 244.1250 | −0.1250 | −0.0036 |
| 8 | 1 | 279.0000 | 279.0000 | 0.0000 | 0.0000 |
| 9 | 1 | 314.0000 | 313.8750 | 0.1250 | 0.0036 |
| 10 | 1 | 349.0000 | 348.7500 | 0.2500 | 0.0072 |
| 11 | 1 | 384.0000 | 383.6250 | 0.3750 | 0.0108 |
| 12 | 0 | 418.0000 | 418.5000 | −0.5000 | −0.0143 |

TABLE 13

12 IN CASE OF CLOCK PERIOD RATIO (RAT) OF 37.20000
ADIR = 1, CNT = 18(0012h), ADJ = 111101111011b(F7Bh)

| BIT NO. | ADJ | COUNT OF INTERNAL CLOCK (ΣCLK(i)) | SUMMATION OF TRANSFER RATE/etu (ΣRAT(i)) | DEVIATION (ΣCLK(i) − ΣRAT(i)) | ERROR/etu |
|---|---|---|---|---|---|
| 1 | 1 | 37.0000 | 37.2000 | −0.2000 | −0.0054 |
| 2 | 1 | 74.0000 | 74.4000 | −0.4000 | −0.0108 |
| 3 | 0 | 112.0000 | 111.6000 | 0.4000 | 0.0108 |
| 4 | 1 | 149.0000 | 148.8000 | 0.2000 | 0.0054 |
| 5 | 1 | 186.0000 | 186.0000 | 0.0000 | 0.0000 |
| 6 | 1 | 223.0000 | 223.2000 | −0.2000 | −0.0054 |
| 7 | 1 | 260.0000 | 260.4000 | −0.4000 | −0.0108 |
| 8 | 0 | 298.0000 | 297.6000 | 0.4000 | 0.0108 |
| 9 | 1 | 335.0000 | 334.8000 | 0.2000 | 0.0054 |
| 10 | 1 | 372.0000 | 372.0000 | 0.0000 | 0.0000 |
| 11 | 1 | 409.0000 | 409.2000 | −0.2000 | −0.0054 |
| 12 | 1 | 446.0000 | 446.4000 | −0.4000 | −0.0108 |

TABLE 14

13 IN CASE OF CLOCK PERIOD RATIO (RAT) OF 38.40000
ADIR = 0, CNT = 18(0012h), ADJ = 100101001010b(94Ah)

| BIT NO. | ADJ | COUNT OF INTERNAL CLOCK (ΣCLK(i)) | SUMMATION OF TRANSFER RATE/etu (ΣRAT(i)) | DEVIATION (ΣCLK(i) − ΣRAT(i)) | ERROR/etu |
|---|---|---|---|---|---|
| 1 | 0 | 38.0000 | 38.4000 | −0.4000 | −0.0104 |
| 2 | 1 | 77.0000 | 76.8000 | 0.2000 | 0.0052 |
| 3 | 0 | 115.0000 | 115.2000 | −0.2000 | −0.0052 |
| 4 | 1 | 154.0000 | 153.6000 | 0.4000 | 0.0104 |
| 5 | 0 | 192.0000 | 192.0000 | 0.0000 | 0.0000 |
| 6 | 0 | 230.0000 | 230.4000 | −0.4000 | −0.0104 |
| 7 | 1 | 269.0000 | 268.8000 | 0.2000 | 0.0052 |
| 8 | 0 | 307.0000 | 307.2000 | −0.2000 | −0.0052 |
| 9 | 1 | 346.0000 | 345.6000 | 0.4000 | 0.0104 |
| 10 | 0 | 384.0000 | 384.0000 | 0.0000 | 0.0000 |
| 11 | 0 | 422.0000 | 422.4000 | −0.4000 | −0.0104 |
| 12 | 1 | 461.0000 | 460.8000 | 0.2000 | 0.0052 |

TABLE 15

14 IN CASE OF CLOCK PERIOD RATIO (RAT) OF 42.66667
ADIR = 0, CNT = 20(0014h), ADJ = 101101101101b(B6Dh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 1 | 43.0000 | 42.6667 | 0.3333 | 0.0078 |
| 2 | 0 | 85.0000 | 85.3333 | –0.3333 | –0.0078 |
| 3 | 1 | 128.0000 | 128.0000 | 0.0000 | 0.0000 |
| 4 | 1 | 171.0000 | 170.6667 | 0.3333 | 0.0078 |
| 5 | 0 | 213.0000 | 213.3333 | –0.3333 | –0.0078 |
| 6 | 1 | 256.0000 | 256.0000 | 0.0000 | 0.0000 |
| 7 | 1 | 299.0000 | 298.6667 | 0.3333 | 0.0078 |
| 8 | 0 | 341.0000 | 341.3333 | –0.3333 | –0.0078 |
| 9 | 1 | 384.0000 | 384.0000 | 0.0000 | 0.0000 |
| 10 | 1 | 427.0000 | 426.6667 | 0.3333 | 0.0078 |
| 11 | 0 | 469.0000 | 469.3333 | –0.3333 | –0.0078 |
| 12 | 1 | 512.0000 | 512.0000 | 0.0000 | 0.0000 |

TABLE 16

15 IN CASE OF CLOCK PERIOD RATIO (RAT) OF 46.50000
ADIR = 0, CNT = 22(0016h), ADJ = 101010101010b(AAAh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 0 | 46.0000 | 46.5000 | –0.5000 | –0.0108 |
| 2 | 1 | 93.0000 | 93.0000 | 0.0000 | 0.0000 |
| 3 | 0 | 139.0000 | 139.5000 | –0.5000 | –0.0108 |
| 4 | 1 | 186.0000 | 186.0000 | 0.0000 | 0.0000 |
| 5 | 0 | 232.0000 | 232.5000 | –0.5000 | –0.0108 |
| 6 | 1 | 279.0000 | 279.0000 | 0.0000 | 0.0000 |
| 7 | 0 | 325.0000 | 325.5000 | –0.5000 | –0.0108 |
| 8 | 1 | 372.0000 | 372.0000 | 0.0000 | 0.0000 |
| 9 | 0 | 418.0000 | 418.5000 | –0.5000 | –0.0108 |
| 10 | 1 | 465.0000 | 465.0000 | 0.0000 | 0.0000 |
| 11 | 0 | 511.0000 | 511.5000 | –0.5000 | –0.0108 |
| 12 | 1 | 558.0000 | 558.0000 | 0.0000 | 0.0000 |

TABLE 17

16 IN CASE OF CLOCK PERIOD RATIO (RAT) OF 48.00000
ADIR = 0, CNT = 23(0017h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 0 | 48.0000 | 48.0000 | 0.0000 | 0.0000 |
| 2 | 0 | 96.0000 | 96.0000 | 0.0000 | 0.0000 |
| 3 | 0 | 144.0000 | 144.0000 | 0.0000 | 0.0000 |
| 4 | 0 | 192.0000 | 192.0000 | 0.0000 | 0.0000 |
| 5 | 0 | 240.0000 | 240.0000 | 0.0000 | 0.0000 |
| 6 | 0 | 288.0000 | 288.0000 | 0.0000 | 0.0000 |
| 7 | 0 | 336.0000 | 336.0000 | 0.0000 | 0.0000 |
| 8 | 0 | 384.0000 | 384.0000 | 0.0000 | 0.0000 |
| 9 | 0 | 432.0000 | 432.0000 | 0.0000 | 0.0000 |
| 10 | 0 | 480.0000 | 480.0000 | 0.0000 | 0.0000 |
| 11 | 0 | 528.0000 | 528.0000 | 0.0000 | 0.0000 |
| 12 | 0 | 576.0000 | 576.0000 | 0.0000 | 0.0000 |

TABLE 18

17 IN CASE OF CLOCK PERIOD RATIO (RAT) OF 51.20000
ADIR = 1, CNT = 25(0019h), ADJ = 111101111011b(F7Bh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 1 | 51.0000 | 51.2000 | –0.2000 | –0.0039 |
| 2 | 1 | 102.0000 | 102.4000 | –0.4000 | –0.0078 |
| 3 | 0 | 154.0000 | 153.6000 | 0.4000 | 0.0078 |
| 4 | 1 | 205.0000 | 204.8000 | 0.2000 | 0.0039 |
| 5 | 1 | 256.0000 | 256.0000 | 0.0000 | 0.0000 |
| 6 | 1 | 307.0000 | 307.2000 | –0.2000 | –0.0039 |
| 7 | 1 | 358.0000 | 358.4000 | –0.4000 | –0.0078 |
| 8 | 0 | 410.0000 | 409.6000 | 0.4000 | 0.0078 |
| 9 | 1 | 461.0000 | 460.8000 | 0.2000 | 0.0039 |
| 10 | 1 | 512.0000 | 512.0000 | 0.0000 | 0.0000 |
| 11 | 1 | 563.0000 | 563.2000 | –0.2000 | –0.0039 |
| 12 | 1 | 614.0000 | 614.4000 | –0.4000 | –0.0078 |

TABLE 19

18 IN CASE OF CLOCK PERIOD RATIO (RAT) OF 55.80000
ADIR = 1, CNT = 27(001Bh), ADJ = 000010000100b(084h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 0 | 56.0000 | 55.8000 | 0.2000 | 0.0036 |
| 2 | 0 | 112.0000 | 111.6000 | 0.4000 | 0.0072 |
| 3 | 1 | 167.0000 | 167.4000 | –0.4000 | –0.0072 |
| 4 | 0 | 223.0000 | 223.2000 | –0.2000 | –0.0036 |
| 5 | 0 | 279.0000 | 279.0000 | 0.0000 | 0.0000 |
| 6 | 0 | 335.0000 | 334.8000 | 0.2000 | 0.0036 |
| 7 | 0 | 391.0000 | 390.6000 | 0.4000 | 0.0072 |
| 8 | 1 | 446.0000 | 446.4000 | –0.4000 | –0.0072 |
| 9 | 0 | 502.0000 | 502.2000 | –0.2000 | –0.0036 |
| 10 | 0 | 558.0000 | 558.0000 | 0.0000 | 0.0000 |
| 11 | 0 | 614.0000 | 613.8000 | 0.2000 | 0.0036 |
| 12 | 0 | 670.0000 | 669.6000 | 0.4000 | 0.0072 |

TABLE 20

19 IN CASE OF CLOCK PERIOD RATIO (RAT) OF 58.12500
ADIR = 0, CNT = 28(001Ch), ADJ = 000000010000b(010h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) – $\Sigma$RAT(i)) | ERROR/ etu |
|---|---|---|---|---|---|
| 1 | 0 | 58.0000 | 58.1250 | –0.1250 | –0.0022 |
| 2 | 0 | 116.0000 | 116.2500 | –0.2500 | –0.0043 |
| 3 | 0 | 174.0000 | 174.3750 | –0.3750 | –0.0065 |
| 4 | 0 | 232.0000 | 232.5000 | –0.5000 | –0.0086 |
| 5 | 1 | 291.0000 | 290.6250 | 0.3750 | 0.0065 |
| 6 | 0 | 349.0000 | 348.7500 | 0.2500 | 0.0043 |
| 7 | 0 | 407.0000 | 406.8750 | 0.1250 | 0.0022 |
| 8 | 0 | 465.0000 | 465.0000 | 0.0000 | 0.0000 |
| 9 | 0 | 523.0000 | 523.1250 | –0.1250 | –0.0022 |
| 10 | 0 | 581.0000 | 581.2500 | –0.2500 | –0.0043 |
| 11 | 0 | 639.0000 | 639.3750 | –0.3750 | –0.0065 |
| 12 | 0 | 697.0000 | 697.5000 | –0.5000 | –0.0086 |

TABLE 21

20 IN CASE OF CLOCK PERIOD RATIO (RAT) OF 62.00000
ADIR = 0, CNT = 30(001Eh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 62.0000 | 62.0000 | 0.0000 | 0.0000 |
| 2 | 0 | 124.0000 | 124.0000 | 0.0000 | 0.0000 |
| 3 | 0 | 186.0000 | 186.0000 | 0.0000 | 0.0000 |
| 4 | 0 | 248.0000 | 248.0000 | 0.0000 | 0.0000 |
| 5 | 0 | 310.0000 | 310.0000 | 0.0000 | 0.0000 |
| 6 | 0 | 372.0000 | 372.0000 | 0.0000 | 0.0000 |
| 7 | 0 | 434.0000 | 434.0000 | 0.0000 | 0.0000 |
| 8 | 0 | 496.0000 | 496.0000 | 0.0000 | 0.0000 |
| 9 | 0 | 558.0000 | 558.0000 | 0.0000 | 0.0000 |
| 10 | 0 | 620.0000 | 620.0000 | 0.0000 | 0.0000 |
| 11 | 0 | 682.0000 | 682.0000 | 0.0000 | 0.0000 |
| 12 | 0 | 744.0000 | 744.0000 | 0.0000 | 0.0000 |

TABLE 22

21 IN CASE OF CLOCK PERIOD RATIO (RAT) OF 64.00000
ADIR = 0, CNT = 31(001Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 64.0000 | 64.0000 | 0.0000 | 0.0000 |
| 2 | 0 | 128.0000 | 128.0000 | 0.0000 | 0.0000 |
| 3 | 0 | 192.0000 | 192.0000 | 0.0000 | 0.0000 |
| 4 | 0 | 256.0000 | 256.0000 | 0.0000 | 0.0000 |
| 5 | 0 | 320.0000 | 320.0000 | 0.0000 | 0.0000 |
| 6 | 0 | 384.0000 | 384.0000 | 0.0000 | 0.0000 |
| 7 | 0 | 448.0000 | 448.0000 | 0.0000 | 0.0000 |
| 8 | 0 | 512.0000 | 512.0000 | 0.0000 | 0.0000 |
| 9 | 0 | 576.0000 | 576.0000 | 0.0000 | 0.0000 |
| 10 | 0 | 640.0000 | 640.0000 | 0.0000 | 0.0000 |
| 11 | 0 | 704.0000 | 704.0000 | 0.0000 | 0.0000 |
| 12 | 0 | 768.0000 | 768.0000 | 0.0000 | 0.0000 |

TABLE 23

22 IN CASE OF CLOCK PERIOD RATIO (RAT) OF 69.75000
ADIR = 1, CNT = 34(0022h), ADJ = 010001000100b(444h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 70.0000 | 69.7500 | 0.2500 | 0.0036 |
| 2 | 0 | 140.0000 | 139.5000 | 0.5000 | 0.0072 |
| 3 | 1 | 209.0000 | 209.2500 | −0.2500 | −0.0036 |
| 4 | 0 | 279.0000 | 279.0000 | 0.0000 | 0.0000 |
| 5 | 0 | 349.0000 | 348.7500 | 0.2500 | 0.0036 |
| 6 | 0 | 419.0000 | 418.5000 | 0.5000 | 0.0072 |
| 7 | 1 | 488.0000 | 488.2500 | −0.2500 | −0.0036 |
| 8 | 0 | 558.0000 | 558.0000 | 0.0000 | 0.0000 |
| 9 | 0 | 628.0000 | 627.7500 | 0.2500 | 0.0036 |
| 10 | 0 | 698.0000 | 697.5000 | 0.5000 | 0.0072 |
| 11 | 1 | 767.0000 | 767.2500 | −0.2500 | −0.0036 |
| 12 | 0 | 837.0000 | 837.0000 | 0.0000 | 0.0000 |

TABLE 24

23 IN CASE OF CLOCK PERIOD RATIO (RAT) OF 74.40000
ADIR = 0, CNT = 36(0024h), ADJ = 100101001010b(94Ah)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 74.0000 | 74.4000 | −0.4000 | −0.0054 |
| 2 | 1 | 149.0000 | 148.8000 | 0.2000 | 0.0027 |
| 3 | 0 | 223.0000 | 223.2000 | −0.2000 | −0.0027 |
| 4 | 1 | 298.0000 | 297.6000 | 0.4000 | 0.0054 |
| 5 | 0 | 372.0000 | 372.0000 | 0.0000 | 0.0000 |
| 6 | 0 | 446.0000 | 446.4000 | −0.4000 | −0.0054 |
| 7 | 1 | 521.0000 | 520.8000 | 0.2000 | 0.0027 |
| 8 | 0 | 595.0000 | 595.2000 | −0.2000 | −0.0027 |
| 9 | 1 | 670.0000 | 669.6000 | 0.4000 | 0.0054 |
| 10 | 0 | 744.0000 | 744.0000 | 0.0000 | 0.0000 |
| 11 | 0 | 818.0000 | 818.4000 | −0.4000 | −0.0054 |
| 12 | 1 | 893.0000 | 892.8000 | 0.2000 | 0.0027 |

TABLE 25

24 IN CASE OF CLOCK PERIOD RATIO (RAT) OF 76.80000
ADIR = 0, CNT = 37(0025h), ADJ = 111101111011b(F7Bh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 1 | 77.0000 | 76.8000 | 0.2000 | 0.0026 |
| 2 | 1 | 154.0000 | 153.6000 | 0.4000 | 0.0052 |
| 3 | 0 | 230.0000 | 230.4000 | −0.4000 | −0.0052 |
| 4 | 1 | 307.0000 | 307.2000 | −0.2000 | −0.0026 |
| 5 | 1 | 384.0000 | 384.0000 | 0.0000 | 0.0000 |
| 6 | 1 | 461.0000 | 460.8000 | 0.2000 | 0.0026 |
| 7 | 1 | 538.0000 | 537.6000 | 0.4000 | 0.0052 |
| 8 | 0 | 614.0000 | 614.4000 | −0.4000 | −0.0052 |
| 9 | 1 | 691.0000 | 691.2000 | −0.2000 | −0.0026 |
| 10 | 1 | 768.0000 | 768.0000 | 0.0000 | 0.0000 |
| 11 | 1 | 845.0000 | 844.8000 | 0.2000 | 0.0026 |
| 12 | 1 | 922.0000 | 921.6000 | 0.4000 | 0.0052 |

TABLE 26

25 IN CASE OF CLOCK PERIOD RATIO (RAT) OF 85.33333
ADIR = 1, CNT = 42(002Ah), ADJ = 101101101101b(B6Dh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 1 | 85.0000 | 85.3333 | −0.3333 | −0.0039 |
| 2 | 0 | 171.0000 | 170.6667 | 0.3333 | 0.0039 |
| 3 | 1 | 256.0000 | 256.0000 | 0.0000 | 0.0000 |
| 4 | 1 | 341.0000 | 341.3333 | −0.3333 | −0.0039 |
| 5 | 0 | 427.0000 | 426.6667 | 0.3333 | 0.0039 |
| 6 | 1 | 512.0000 | 512.0000 | 0.0000 | 0.0000 |
| 7 | 1 | 597.0000 | 597.3333 | −0.3333 | −0.0039 |
| 8 | 0 | 683.0000 | 682.6667 | 0.3333 | 0.0039 |
| 9 | 1 | 768.0000 | 768.0000 | 0.0000 | 0.0000 |
| 10 | 1 | 853.0000 | 853.3333 | −0.3333 | −0.0039 |
| 11 | 0 | 939.0000 | 938.6667 | 0.3333 | 0.0039 |
| 12 | 1 | 1024.0000 | 1024.0000 | 0.0000 | 0.0000 |

TABLE 27

26 IN CASE OF CLOCK PERIOD RATIO (RAT) OF 93.00000
ADIR = 1, CNT = 46(002Eh), ADJ = 111111111111b(FFFh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 1 | 93.0000 | 93.0000 | 0.0000 | 0.0000 |
| 2 | 1 | 186.0000 | 186.0000 | 0.0000 | 0.0000 |
| 3 | 1 | 279.0000 | 279.0000 | 0.0000 | 0.0000 |
| 4 | 1 | 372.0000 | 372.0000 | 0.0000 | 0.0000 |
| 5 | 1 | 465.0000 | 465.0000 | 0.0000 | 0.0000 |
| 6 | 1 | 558.0000 | 558.0000 | 0.0000 | 0.0000 |
| 7 | 1 | 651.0000 | 651.0000 | 0.0000 | 0.0000 |
| 8 | 1 | 744.0000 | 744.0000 | 0.0000 | 0.0000 |
| 9 | 1 | 837.0000 | 837.0000 | 0.0000 | 0.0000 |
| 10 | 1 | 930.0000 | 930.0000 | 0.0000 | 0.0000 |
| 11 | 1 | 1023.0000 | 1023.0000 | 0.0000 | 0.0000 |
| 12 | 1 | 1116.0000 | 1116.0000 | 0.0000 | 0.0000 |

TABLE 28

27 IN CASE OF CLOCK PERIOD RATIO (RAT) OF 96.00000
ADIR = 0, CNT = 47(002Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 96.0000 | 96.0000 | 0.0000 | 0.0000 |
| 2 | 0 | 192.0000 | 192.0000 | 0.0000 | 0.0000 |
| 3 | 0 | 288.0000 | 288.0000 | 0.0000 | 0.0000 |
| 4 | 0 | 384.0000 | 384.0000 | 0.0000 | 0.0000 |
| 5 | 0 | 480.0000 | 480.0000 | 0.0000 | 0.0000 |
| 6 | 0 | 576.0000 | 576.0000 | 0.0000 | 0.0000 |
| 7 | 0 | 672.0000 | 672.0000 | 0.0000 | 0.0000 |
| 8 | 0 | 768.0000 | 768.0000 | 0.0000 | 0.0000 |
| 9 | 0 | 864.0000 | 864.0000 | 0.0000 | 0.0000 |
| 10 | 0 | 960.0000 | 960.0000 | 0.0000 | 0.0000 |
| 11 | 0 | 1056.0000 | 1056.0000 | 0.0000 | 0.0000 |
| 12 | 0 | 1152.0000 | 1152.0000 | 0.0000 | 0.0000 |

TABLE 29

28 IN CASE OF CLOCK PERIOD RATIO (RAT) OF 102.40000
ADIR = 0, CNT = 50(0032h), ADJ = 100101001010b(94Ah)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 102.0000 | 102.4000 | −0.4000 | −0.0039 |
| 2 | 1 | 205.0000 | 204.8000 | 0.2000 | 0.0020 |
| 3 | 0 | 307.0000 | 307.2000 | −0.2000 | −0.0020 |
| 4 | 1 | 410.0000 | 409.6000 | 0.4000 | 0.0039 |
| 5 | 0 | 512.0000 | 512.0000 | 0.0000 | 0.0000 |
| 6 | 0 | 614.0000 | 614.4000 | −0.4000 | −0.0039 |
| 7 | 1 | 717.0000 | 716.8000 | 0.2000 | 0.0020 |
| 8 | 0 | 819.0000 | 819.2000 | −0.2000 | −0.0020 |
| 9 | 1 | 922.0000 | 921.6000 | 0.4000 | 0.0039 |
| 10 | 0 | 1024.0000 | 1024.0000 | 0.0000 | 0.0000 |
| 11 | 0 | 1126.0000 | 1126.4000 | −0.4000 | −0.0039 |
| 12 | 1 | 1229.0000 | 1228.8000 | 0.2000 | 0.0020 |

TABLE 30

29 IN CASE OF CLOCK PERIOD RATIO (RAT) OF 116.25000
ADIR = 0, CNT = 57(0039h), ADJ = 010001000100b(444h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 116.0000 | 116.2500 | −0.2500 | −0.0022 |
| 2 | 0 | 232.0000 | 232.5000 | −0.5000 | −0.0043 |
| 3 | 1 | 349.0000 | 348.7500 | 0.2500 | 0.0022 |
| 4 | 0 | 465.0000 | 465.0000 | 0.0000 | 0.0000 |
| 5 | 0 | 581.0000 | 581.2500 | −0.2500 | −0.0022 |
| 6 | 0 | 697.0000 | 697.5000 | −0.5000 | −0.0043 |
| 7 | 1 | 814.0000 | 813.7500 | 0.2500 | 0.0022 |
| 8 | 0 | 930.0000 | 930.0000 | 0.0000 | 0.0000 |
| 9 | 0 | 1046.0000 | 1046.2500 | −0.2500 | −0.0022 |
| 10 | 0 | 1162.0000 | 1162.5000 | −0.5000 | −0.0043 |
| 11 | 1 | 1279.0000 | 1278.7500 | 0.2500 | 0.0022 |
| 12 | 0 | 1395.0000 | 1395.0000 | 0.0000 | 0.0000 |

TABLE 31

30 IN CASE OF CLOCK PERIOD RATIO (RAT) OF 124.00000
ADIR = 0, CNT = 61(003Dh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 124.0000 | 124.0000 | 0.0000 | 0.0000 |
| 2 | 0 | 248.0000 | 248.0000 | 0.0000 | 0.0000 |
| 3 | 0 | 372.0000 | 372.0000 | 0.0000 | 0.0000 |
| 4 | 0 | 496.0000 | 496.0000 | 0.0000 | 0.0000 |
| 5 | 0 | 620.0000 | 620.0000 | 0.0000 | 0.0000 |
| 6 | 0 | 744.0000 | 744.0000 | 0.0000 | 0.0000 |
| 7 | 0 | 868.0000 | 868.0000 | 0.0000 | 0.0000 |
| 8 | 0 | 992.0000 | 992.0000 | 0.0000 | 0.0000 |
| 9 | 0 | 1116.0000 | 1116.0000 | 0.0000 | 0.0000 |
| 10 | 0 | 1240.0000 | 1240.0000 | 0.0000 | 0.0000 |
| 11 | 0 | 1364.0000 | 1364.0000 | 0.0000 | 0.0000 |
| 12 | 0 | 1488.0000 | 1488.0000 | 0.0000 | 0.0000 |

TABLE 32

31 IN CASE OF CLOCK PERIOD RATIO (RAT) OF 128.00000
ADIR = 0, CNT = 63(003Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 128.0000 | 128.0000 | 0.0000 | 0.0000 |
| 2 | 0 | 256.0000 | 256.0000 | 0.0000 | 0.0000 |
| 3 | 0 | 384.0000 | 384.0000 | 0.0000 | 0.0000 |
| 4 | 0 | 512.0000 | 512.0000 | 0.0000 | 0.0000 |
| 5 | 0 | 640.0000 | 640.0000 | 0.0000 | 0.0000 |
| 6 | 0 | 768.0000 | 768.0000 | 0.0000 | 0.0000 |
| 7 | 0 | 896.0000 | 896.0000 | 0.0000 | 0.0000 |
| 8 | 0 | 1024.0000 | 1024.0000 | 0.0000 | 0.0000 |
| 9 | 0 | 1152.0000 | 1152.0000 | 0.0000 | 0.0000 |
| 10 | 0 | 1280.0000 | 1280.0000 | 0.0000 | 0.0000 |
| 11 | 0 | 1408.0000 | 1408.0000 | 0.0000 | 0.0000 |
| 12 | 0 | 1536.0000 | 1536.0000 | 0.0000 | 0.0000 |

TABLE 33

32 IN CASE OF CLOCK PERIOD RATIO (RAT) OF 139.50000
ADIR = 1, CNT = 69(0045h), ADJ = 101010101010b(AAAh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 140.0000 | 139.5000 | 0.5000 | 0.0036 |
| 2 | 1 | 279.0000 | 279.0000 | 0.0000 | 0.0000 |
| 3 | 0 | 419.0000 | 418.5000 | 0.5000 | 0.0036 |
| 4 | 1 | 558.0000 | 558.0000 | 0.0000 | 0.0000 |
| 5 | 0 | 698.0000 | 697.5000 | 0.5000 | 0.0036 |
| 6 | 1 | 837.0000 | 837.0000 | 0.0000 | 0.0000 |
| 7 | 0 | 977.0000 | 976.5000 | 0.5000 | 0.0036 |
| 8 | 1 | 1116.0000 | 1116.0000 | 0.0000 | 0.0000 |
| 9 | 0 | 1256.0000 | 1255.5000 | 0.5000 | 0.0036 |
| 10 | 1 | 1395.0000 | 1395.0000 | 0.0000 | 0.0000 |
| 11 | 0 | 1535.0000 | 1534.5000 | 0.5000 | 0.0036 |
| 12 | 1 | 1674.0000 | 1674.0000 | 0.0000 | 0.0000 |

TABLE 34

33 IN CASE OF CLOCK PERIOD RATIO (RAT) OF 155.00000
ADIR = 1, CNT = 77(004Dh), ADJ = 111111111111b(FFFh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 1 | 155.0000 | 155.0000 | 0.0000 | 0.0000 |
| 2 | 1 | 310.0000 | 310.0000 | 0.0000 | 0.0000 |
| 3 | 1 | 465.0000 | 465.0000 | 0.0000 | 0.0000 |
| 4 | 1 | 620.0000 | 620.0000 | 0.0000 | 0.0000 |
| 5 | 1 | 775.0000 | 775.0000 | 0.0000 | 0.0000 |
| 6 | 1 | 930.0000 | 930.0000 | 0.0000 | 0.0000 |
| 7 | 1 | 1085.0000 | 1085.0000 | 0.0000 | 0.0000 |
| 8 | 1 | 1240.0000 | 1240.0000 | 0.0000 | 0.0000 |
| 9 | 1 | 1395.0000 | 1395.0000 | 0.0000 | 0.0000 |
| 10 | 1 | 1550.0000 | 1550.0000 | 0.0000 | 0.0000 |
| 11 | 1 | 1705.0000 | 1705.0000 | 0.0000 | 0.0000 |
| 12 | 1 | 1860.0000 | 1860.0000 | 0.0000 | 0.0000 |

TABLE 35

34 IN CASE OF CLOCK PERIOD RATIO (RAT) OF 170.66667
ADIR = 0, CNT = 84(0054h), ADJ = 101101101101b(B6Dh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 1 | 171.0000 | 170.6667 | 0.3333 | 0.0020 |
| 2 | 0 | 341.0000 | 341.3333 | −0.3333 | −0.0020 |
| 3 | 1 | 512.0000 | 512.0000 | 0.0000 | 0.0000 |
| 4 | 1 | 683.0000 | 682.6667 | 0.3333 | 0.0020 |
| 5 | 0 | 853.0000 | 853.3333 | −0.3333 | −0.0020 |
| 6 | 1 | 1024.0000 | 1024.0000 | 0.0000 | 0.0000 |
| 7 | 1 | 1195.0000 | 1194.6667 | 0.3333 | 0.0020 |
| 8 | 0 | 1365.0000 | 1365.3333 | −0.3333 | −0.0020 |
| 9 | 1 | 1536.0000 | 1536.0000 | 0.0000 | 0.0000 |
| 10 | 1 | 1707.0000 | 1706.6667 | 0.3333 | 0.0020 |
| 11 | 0 | 1877.0000 | 1877.3333 | −0.3333 | −0.0020 |
| 12 | 1 | 2048.0000 | 2048.0000 | 0.0000 | 0.0000 |

TABLE 36

35 IN CASE OF CLOCK PERIOD RATIO (RAT) OF 186.00000
ADIR = 0, CNT = 92(005Ch), ADJ = 000000000000b(000h)

| BIT NO. | ADJ | COUNT OF INTERNAL CLOCK ($\Sigma$CLKi) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 186.0000 | 186.0000 | 0.0000 | 0.0000 |
| 2 | 0 | 372.0000 | 372.0000 | 0.0000 | 0.0000 |
| 3 | 0 | 558.0000 | 558.0000 | 0.0000 | 0.0000 |
| 4 | 0 | 744.0000 | 744.0000 | 0.0000 | 0.0000 |
| 5 | 0 | 930.0000 | 930.0000 | 0.0000 | 0.0000 |
| 6 | 0 | 1116.0000 | 1116.0000 | 0.0000 | 0.0000 |
| 7 | 0 | 1302.0000 | 1302.0000 | 0.0000 | 0.0000 |
| 8 | 0 | 1488.0000 | 1488.0000 | 0.0000 | 0.0000 |
| 9 | 0 | 1674.0000 | 1674.0000 | 0.0000 | 0.0000 |
| 10 | 0 | 1860.0000 | 1860.0000 | 0.0000 | 0.0000 |
| 11 | 0 | 2046.0000 | 2046.0000 | 0.0000 | 0.0000 |
| 12 | 0 | 2232.0000 | 2232.0000 | 0.0000 | 0.0000 |

TABLE 37

36 IN CASE OF CLOCK PERIOD RATIO (RAT) OF 192.00000
ADIR = 0, CNT = 95(005Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 192.0000 | 192.0000 | 0.0000 | 0.0000 |
| 2 | 0 | 384.0000 | 384.0000 | 0.0000 | 0.0000 |
| 3 | 0 | 576.0000 | 576.0000 | 0.0000 | 0.0000 |
| 4 | 0 | 768.0000 | 768.0000 | 0.0000 | 0.0000 |
| 5 | 0 | 960.0000 | 960.0000 | 0.0000 | 0.0000 |
| 6 | 0 | 1152.0000 | 1152.0000 | 0.0000 | 0.0000 |
| 7 | 0 | 1344.0000 | 1344.0000 | 0.0000 | 0.0000 |
| 8 | 0 | 1536.0000 | 1536.0000 | 0.0000 | 0.0000 |
| 9 | 0 | 1728.0000 | 1728.0000 | 0.0000 | 0.0000 |
| 10 | 0 | 1920.0000 | 1920.0000 | 0.0000 | 0.0000 |
| 11 | 0 | 2112.0000 | 2112.0000 | 0.0000 | 0.0000 |
| 12 | 0 | 2304.0000 | 2304.0000 | 0.0000 | 0.0000 |

TABLE 38

37 IN CASE OF CLOCK PERIOD RATIO (RAT) OF 232.50000
ADIR = 0, CNT = 115(0073h), ADJ = 101010101010b(AAAh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 232.0000 | 232.5000 | −0.5000 | −0.0022 |
| 2 | 1 | 465.0000 | 465.0000 | 0.0000 | 0.0000 |
| 3 | 0 | 697.0000 | 697.5000 | −0.5000 | −0.0022 |
| 4 | 1 | 930.0000 | 930.0000 | 0.0000 | 0.0000 |
| 5 | 0 | 1162.0000 | 1162.5000 | −0.5000 | −0.0022 |
| 6 | 1 | 1395.0000 | 1395.0000 | 0.0000 | 0.0000 |
| 7 | 0 | 1627.0000 | 1627.5000 | −0.5000 | −0.0022 |
| 8 | 1 | 1860.0000 | 1860.0000 | 0.0000 | 0.0000 |
| 9 | 0 | 2092.0000 | 2092.5000 | −0.5000 | −0.0022 |
| 10 | 1 | 2325.0000 | 2325.0000 | 0.0000 | 0.0000 |
| 11 | 0 | 2557.0000 | 2557.5000 | −0.5000 | −0.0022 |
| 12 | 1 | 2790.0000 | 2790.0000 | 0.0000 | 0.0000 |

TABLE 39

38 IN CASE OF CLOCK PERIOD RATIO (RAT) OF 256.00000
ADIR = 0, CNT = 127(007Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 256.0000  | 256.0000  | 0.0000 | 0.0000 |
| 2  | 0 | 512.0000  | 512.0000  | 0.0000 | 0.0000 |
| 3  | 0 | 768.0000  | 768.0000  | 0.0000 | 0.0000 |
| 4  | 0 | 1024.0000 | 1024.0000 | 0.0000 | 0.0000 |
| 5  | 0 | 1280.0000 | 1280.0000 | 0.0000 | 0.0000 |
| 6  | 0 | 1536.0000 | 1536.0000 | 0.0000 | 0.0000 |
| 7  | 0 | 1792.0000 | 1792.0000 | 0.0000 | 0.0000 |
| 8  | 0 | 2048.0000 | 2048.0000 | 0.0000 | 0.0000 |
| 9  | 0 | 2304.0000 | 2304.0000 | 0.0000 | 0.0000 |
| 10 | 0 | 2560.0000 | 2560.0000 | 0.0000 | 0.0000 |
| 11 | 0 | 2816.0000 | 2816.0000 | 0.0000 | 0.0000 |
| 12 | 0 | 3072.0000 | 3072.0000 | 0.0000 | 0.0000 |

TABLE 40

39 IN CASE OF CLOCK PERIOD RATIO (RAT) OF 279.00000
ADIR = 1, CNT = 139(008Bh), ADJ = 111111111111b(FFFh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 1 | 279.0000  | 279.0000  | 0.0000 | 0.0000 |
| 2  | 1 | 558.0000  | 558.0000  | 0.0000 | 0.0000 |
| 3  | 1 | 837.0000  | 837.0000  | 0.0000 | 0.0000 |
| 4  | 1 | 1116.0000 | 1116.0000 | 0.0000 | 0.0000 |
| 5  | 1 | 1395.0000 | 1395.0000 | 0.0000 | 0.0000 |
| 6  | 1 | 1674.0000 | 1674.0000 | 0.0000 | 0.0000 |
| 7  | 1 | 1953.0000 | 1953.0000 | 0.0000 | 0.0000 |
| 8  | 1 | 2232.0000 | 2232.0000 | 0.0000 | 0.0000 |
| 9  | 1 | 2511.0000 | 2511.0000 | 0.0000 | 0.0000 |
| 10 | 1 | 2790.0000 | 2790.0000 | 0.0000 | 0.0000 |
| 11 | 1 | 3069.0000 | 3069.0000 | 0.0000 | 0.0000 |
| 12 | 1 | 3348.0000 | 3348.0000 | 0.0000 | 0.0000 |

TABLE 41

40 IN CASE OF CLOCK PERIOD RATIO (RAT) OF 372.00000
ADIR = 0, CNT = 185(00B9h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 372.0000  | 372.0000  | 0.0000 | 0.0000 |
| 2  | 0 | 744.0000  | 744.0000  | 0.0000 | 0.0000 |
| 3  | 0 | 1116.0000 | 1116.0000 | 0.0000 | 0.0000 |
| 4  | 0 | 1488.0000 | 1488.0000 | 0.0000 | 0.0000 |
| 5  | 0 | 1860.0000 | 1860.0000 | 0.0000 | 0.0000 |
| 6  | 0 | 2232.0000 | 2232.0000 | 0.0000 | 0.0000 |
| 7  | 0 | 2604.0000 | 2604.0000 | 0.0000 | 0.0000 |
| 8  | 0 | 2976.0000 | 2976.0000 | 0.0000 | 0.0000 |
| 9  | 0 | 3348.0000 | 3348.0000 | 0.0000 | 0.0000 |
| 10 | 0 | 3720.0000 | 3720.0000 | 0.0000 | 0.0000 |
| 11 | 0 | 4092.0000 | 4092.0000 | 0.0000 | 0.0000 |
| 12 | 0 | 4464.0000 | 4464.0000 | 0.0000 | 0.0000 |

TABLE 42

41 IN CASE OF CLOCK PERIOD RATIO (RAT) OF 384.00000
ADIR = 0, CNT = 191(00BFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 384.0000  | 384.0000  | 0.0000 | 0.0000 |
| 2  | 0 | 768.0000  | 768.0000  | 0.0000 | 0.0000 |
| 3  | 0 | 1152.0000 | 1152.0000 | 0.0000 | 0.0000 |
| 4  | 0 | 1536.0000 | 1536.0000 | 0.0000 | 0.0000 |
| 5  | 0 | 1920.0000 | 1920.0000 | 0.0000 | 0.0000 |
| 6  | 0 | 2304.0000 | 2304.0000 | 0.0000 | 0.0000 |
| 7  | 0 | 2688.0000 | 2688.0000 | 0.0000 | 0.0000 |
| 8  | 0 | 3072.0000 | 3072.0000 | 0.0000 | 0.0000 |
| 9  | 0 | 3456.0000 | 3456.0000 | 0.0000 | 0.0000 |
| 10 | 0 | 3840.0000 | 3840.0000 | 0.0000 | 0.0000 |
| 11 | 0 | 4224.0000 | 4224.0000 | 0.0000 | 0.0000 |
| 12 | 0 | 4608.0000 | 4608.0000 | 0.0000 | 0.0000 |

TABLE 43

42 IN CASE OF CLOCK PERIOD RATIO (RAT) OF 465.00000
ADIR = 1, CNT = 232(00E8h), ADJ = 111111111111b(FFFh)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 1 | 465.0000  | 465.0000  | 0.0000 | 0.0000 |
| 2  | 1 | 930.0000  | 930.0000  | 0.0000 | 0.0000 |
| 3  | 1 | 1395.0000 | 1395.0000 | 0.0000 | 0.0000 |
| 4  | 1 | 1860.0000 | 1860.0000 | 0.0000 | 0.0000 |
| 5  | 1 | 2325.0000 | 2325.0000 | 0.0000 | 0.0000 |
| 6  | 1 | 2790.0000 | 2790.0000 | 0.0000 | 0.0000 |
| 7  | 1 | 3255.0000 | 3255.0000 | 0.0000 | 0.0000 |
| 8  | 1 | 3720.0000 | 3720.0000 | 0.0000 | 0.0000 |
| 9  | 1 | 4185.0000 | 4185.0000 | 0.0000 | 0.0000 |
| 10 | 1 | 4650.0000 | 4650.0000 | 0.0000 | 0.0000 |
| 11 | 1 | 5115.0000 | 5115.0000 | 0.0000 | 0.0000 |
| 12 | 1 | 5580.0000 | 5580.0000 | 0.0000 | 0.0000 |

TABLE 44

43 IN CASE OF CLOCK PERIOD RATIO (RAT) OF 512.00000
ADIR = 0, CNT = 255(00FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 512.0000  | 512.0000  | 0.0000 | 0.0000 |
| 2  | 0 | 1024.0000 | 1024.0000 | 0.0000 | 0.0000 |
| 3  | 0 | 1536.0000 | 1536.0000 | 0.0000 | 0.0000 |
| 4  | 0 | 2048.0000 | 2048.0000 | 0.0000 | 0.0000 |
| 5  | 0 | 2560.0000 | 2560.0000 | 0.0000 | 0.0000 |
| 6  | 0 | 3072.0000 | 3072.0000 | 0.0000 | 0.0000 |
| 7  | 0 | 3584.0000 | 3584.0000 | 0.0000 | 0.0000 |
| 8  | 0 | 4096.0000 | 4096.0000 | 0.0000 | 0.0000 |
| 9  | 0 | 4608.0000 | 4608.0000 | 0.0000 | 0.0000 |
| 10 | 0 | 5120.0000 | 5120.0000 | 0.0000 | 0.0000 |
| 11 | 0 | 5632.0000 | 5632.0000 | 0.0000 | 0.0000 |
| 12 | 0 | 6144.0000 | 6144.0000 | 0.0000 | 0.0000 |

TABLE 45

44 IN CASE OF CLOCK PERIOD RATIO (RAT) OF 558.00000
ADIR = 0, CNT = 278(0116h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 558.0000  | 558.0000  | 0.0000 | 0.0000 |
| 2  | 0 | 1116.0000 | 1116.0000 | 0.0000 | 0.0000 |
| 3  | 0 | 1674.0000 | 1674.0000 | 0.0000 | 0.0000 |
| 4  | 0 | 2232.0000 | 2232.0000 | 0.0000 | 0.0000 |
| 5  | 0 | 2790.0000 | 2790.0000 | 0.0000 | 0.0000 |
| 6  | 0 | 3348.0000 | 3348.0000 | 0.0000 | 0.0000 |
| 7  | 0 | 3906.0000 | 3906.0000 | 0.0000 | 0.0000 |
| 8  | 0 | 4464.0000 | 4464.0000 | 0.0000 | 0.0000 |
| 9  | 0 | 5022.0000 | 5022.0000 | 0.0000 | 0.0000 |
| 10 | 0 | 5580.0000 | 5580.0000 | 0.0000 | 0.0000 |
| 11 | 0 | 6138.0000 | 6138.0000 | 0.0000 | 0.0000 |
| 12 | 0 | 6696.0000 | 6696.0000 | 0.0000 | 0.0000 |

TABLE 46

45 IN CASE OF CLOCK PERIOD RATIO (RAT) OF 744.00000
ADIR = 0, CNT = 371(0173h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 744.0000  | 744.0000  | 0.0000 | 0.0000 |
| 2  | 0 | 1488.0000 | 1488.0000 | 0.0000 | 0.0000 |
| 3  | 0 | 2232.0000 | 2232.0000 | 0.0000 | 0.0000 |
| 4  | 0 | 2976.0000 | 2976.0000 | 0.0000 | 0.0000 |
| 5  | 0 | 3720.0000 | 3720.0000 | 0.0000 | 0.0000 |
| 6  | 0 | 4464.0000 | 4464.0000 | 0.0000 | 0.0000 |
| 7  | 0 | 5208.0000 | 5208.0000 | 0.0000 | 0.0000 |
| 8  | 0 | 5952.0000 | 5952.0000 | 0.0000 | 0.0000 |
| 9  | 0 | 6696.0000 | 6696.0000 | 0.0000 | 0.0000 |
| 10 | 0 | 7440.0000 | 7440.0000 | 0.0000 | 0.0000 |
| 11 | 0 | 8184.0000 | 8184.0000 | 0.0000 | 0.0000 |
| 12 | 0 | 8928.0000 | 8928.0000 | 0.0000 | 0.0000 |

TABLE 47

46 IN CASE OF CLOCK PERIOD RATIO (RAT) OF 768.00000
ADIR = 0, CNT = 383(017Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 768.0000  | 768.0000  | 0.0000 | 0.0000 |
| 2  | 0 | 1536.0000 | 1536.0000 | 0.0000 | 0.0000 |
| 3  | 0 | 2304.0000 | 2304.0000 | 0.0000 | 0.0000 |
| 4  | 0 | 3072.0000 | 3072.0000 | 0.0000 | 0.0000 |
| 5  | 0 | 3840.0000 | 3840.0000 | 0.0000 | 0.0000 |
| 6  | 0 | 4608.0000 | 4608.0000 | 0.0000 | 0.0000 |
| 7  | 0 | 5376.0000 | 5376.0000 | 0.0000 | 0.0000 |
| 8  | 0 | 6144.0000 | 6144.0000 | 0.0000 | 0.0000 |
| 9  | 0 | 6912.0000 | 6912.0000 | 0.0000 | 0.0000 |
| 10 | 0 | 7680.0000 | 7680.0000 | 0.0000 | 0.0000 |
| 11 | 0 | 8448.0000 | 8448.0000 | 0.0000 | 0.0000 |
| 12 | 0 | 9216.0000 | 9216.0000 | 0.0000 | 0.0000 |

TABLE 48

47 IN CASE OF CLOCK PERIOD RATIO (RAT) OF 930.00000
ADIR = 0, CNT = 464(01D0h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 930.0000   | 930.0000   | 0.0000 | 0.0000 |
| 2  | 0 | 1860.0000  | 1860.0000  | 0.0000 | 0.0000 |
| 3  | 0 | 2790.0000  | 2790.0000  | 0.0000 | 0.0000 |
| 4  | 0 | 3720.0000  | 3720.0000  | 0.0000 | 0.0000 |
| 5  | 0 | 4650.0000  | 4650.0000  | 0.0000 | 0.0000 |
| 6  | 0 | 5580.0000  | 5580.0000  | 0.0000 | 0.0000 |
| 7  | 0 | 6510.0000  | 6510.0000  | 0.0000 | 0.0000 |
| 8  | 0 | 7440.0000  | 7440.0000  | 0.0000 | 0.0000 |
| 9  | 0 | 8370.0000  | 8370.0000  | 0.0000 | 0.0000 |
| 10 | 0 | 9300.0000  | 9300.0000  | 0.0000 | 0.0000 |
| 11 | 0 | 10230.0000 | 10230.0000 | 0.0000 | 0.0000 |
| 12 | 0 | 11160.0000 | 11160.0000 | 0.0000 | 0.0000 |

TABLE 49

48 IN CASE OF CLOCK PERIOD RATIO (RAT) OF 1024.00000
ADIR = 0, CNT = 511(01FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 1024.0000  | 1024.0000  | 0.0000 | 0.0000 |
| 2  | 0 | 2048.0000  | 2048.0000  | 0.0000 | 0.0000 |
| 3  | 0 | 3072.0000  | 3072.0000  | 0.0000 | 0.0000 |
| 4  | 0 | 4096.0000  | 4096.0000  | 0.0000 | 0.0000 |
| 5  | 0 | 5120.0000  | 5120.0000  | 0.0000 | 0.0000 |
| 6  | 0 | 6144.0000  | 6144.0000  | 0.0000 | 0.0000 |
| 7  | 0 | 7168.0000  | 7168.0000  | 0.0000 | 0.0000 |
| 8  | 0 | 8192.0000  | 8192.0000  | 0.0000 | 0.0000 |
| 9  | 0 | 9216.0000  | 9216.0000  | 0.0000 | 0.0000 |
| 10 | 0 | 10240.0000 | 10240.0000 | 0.0000 | 0.0000 |
| 11 | 0 | 11264.0000 | 11264.0000 | 0.0000 | 0.0000 |
| 12 | 0 | 12288.0000 | 12288.0000 | 0.0000 | 0.0000 |

TABLE 50

49 IN CASE OF CLOCK PERIOD RATIO (RAT) OF 1116.00000
ADIR = 0, CNT = 557(022Dh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 1116.0000  | 1116.0000  | 0.0000 | 0.0000 |
| 2  | 0 | 2232.0000  | 2232.0000  | 0.0000 | 0.0000 |
| 3  | 0 | 3348.0000  | 3348.0000  | 0.0000 | 0.0000 |
| 4  | 0 | 4464.0000  | 4464.0000  | 0.0000 | 0.0000 |
| 5  | 0 | 5580.0000  | 5580.0000  | 0.0000 | 0.0000 |
| 6  | 0 | 6696.0000  | 6696.0000  | 0.0000 | 0.0000 |
| 7  | 0 | 7812.0000  | 7812.0000  | 0.0000 | 0.0000 |
| 8  | 0 | 8928.0000  | 8928.0000  | 0.0000 | 0.0000 |
| 9  | 0 | 10044.0000 | 10044.0000 | 0.0000 | 0.0000 |
| 10 | 0 | 11160.0000 | 11160.0000 | 0.0000 | 0.0000 |
| 11 | 0 | 12276.0000 | 12276.0000 | 0.0000 | 0.0000 |
| 12 | 0 | 13392.0000 | 13392.0000 | 0.0000 | 0.0000 |

TABLE 51

50 IN CASE OF CLOCK PERIOD RATIO (RAT) OF 1488.00000
ADIR = 0, CNT = 743(02E7h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 1488.0000 | 1488.0000 | 0.0000 | 0.0000 |
| 2 | 0 | 2976.0000 | 2976.0000 | 0.0000 | 0.0000 |
| 3 | 0 | 4464.0000 | 4464.0000 | 0.0000 | 0.0000 |
| 4 | 0 | 5952.0000 | 5952.0000 | 0.0000 | 0.0000 |
| 5 | 0 | 7440.0000 | 7440.0000 | 0.0000 | 0.0000 |
| 6 | 0 | 8928.0000 | 8928.0000 | 0.0000 | 0.0000 |
| 7 | 0 | 10416.0000 | 10416.0000 | 0.0000 | 0.0000 |
| 8 | 0 | 11904.0000 | 11904.0000 | 0.0000 | 0.0000 |
| 9 | 0 | 13392.0000 | 13392.0000 | 0.0000 | 0.0000 |
| 10 | 0 | 14880.0000 | 14880.0000 | 0.0000 | 0.0000 |
| 11 | 0 | 16368.0000 | 16368.0000 | 0.0000 | 0.0000 |
| 12 | 0 | 17856.0000 | 17856.0000 | 0.0000 | 0.0000 |

TABLE 52

51 IN CASE OF CLOCK PERIOD RATIO (RAT) OF 1536.00000
ADIR = 0, CNT = 767(02FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 1536.0000 | 1536.0000 | 0.0000 | 0.0000 |
| 2 | 0 | 3072.0000 | 3072.0000 | 0.0000 | 0.0000 |
| 3 | 0 | 4608.0000 | 4608.0000 | 0.0000 | 0.0000 |
| 4 | 0 | 6144.0000 | 6144.0000 | 0.0000 | 0.0000 |
| 5 | 0 | 7680.0000 | 7680.0000 | 0.0000 | 0.0000 |
| 6 | 0 | 9216.0000 | 9216.0000 | 0.0000 | 0.0000 |
| 7 | 0 | 10752.0000 | 10752.0000 | 0.0000 | 0.0000 |
| 8 | 0 | 12288.0000 | 12288.0000 | 0.0000 | 0.0000 |
| 9 | 0 | 13824.0000 | 13824.0000 | 0.0000 | 0.0000 |
| 10 | 0 | 15360.0000 | 15360.0000 | 0.0000 | 0.0000 |
| 11 | 0 | 16896.0000 | 16896.0000 | 0.0000 | 0.0000 |
| 12 | 0 | 18432.0000 | 18432.0000 | 0.0000 | 0.0000 |

TABLE 53

52 IN CASE OF CLOCK PERIOD RATIO (RAT) OF 1860.00000
ADIR = 0, CNT = 929(03A1h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 1860.0000 | 1860.0000 | 0.0000 | 0.0000 |
| 2 | 0 | 3720.0000 | 3720.0000 | 0.0000 | 0.0000 |
| 3 | 0 | 5580.0000 | 5580.0000 | 0.0000 | 0.0000 |
| 4 | 0 | 7440.0000 | 7440.0000 | 0.0000 | 0.0000 |
| 5 | 0 | 9300.0000 | 9300.0000 | 0.0000 | 0.0000 |
| 6 | 0 | 11160.0000 | 11160.0000 | 0.0000 | 0.0000 |
| 7 | 0 | 13020.0000 | 13020.0000 | 0.0000 | 0.0000 |
| 8 | 0 | 14880.0000 | 14880.0000 | 0.0000 | 0.0000 |
| 9 | 0 | 16740.0000 | 16740.0000 | 0.0000 | 0.0000 |
| 10 | 0 | 18600.0000 | 18600.0000 | 0.0000 | 0.0000 |
| 11 | 0 | 20460.0000 | 20460.0000 | 0.0000 | 0.0000 |
| 12 | 0 | 22320.0000 | 22320.0000 | 0.0000 | 0.0000 |

TABLE 54

53 IN CASE OF CLOCK PERIOD RATIO (RAT) OF 2048.00000
ADIR = 0, CNT = 1023(03FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 2048.0000 | 2048.0000 | 0.0000 | 0.0000 |
| 2 | 0 | 4096.0000 | 4096.0000 | 0.0000 | 0.0000 |
| 3 | 0 | 6144.0000 | 6144.0000 | 0.0000 | 0.0000 |
| 4 | 0 | 8192.0000 | 8192.0000 | 0.0000 | 0.0000 |
| 5 | 0 | 10240.0000 | 10240.0000 | 0.0000 | 0.0000 |
| 6 | 0 | 12288.0000 | 12288.0000 | 0.0000 | 0.0000 |
| 7 | 0 | 14336.0000 | 14336.0000 | 0.0000 | 0.0000 |
| 8 | 0 | 16384.0000 | 16384.0000 | 0.0000 | 0.0000 |
| 9 | 0 | 18432.0000 | 18432.0000 | 0.0000 | 0.0000 |
| 10 | 0 | 20480.0000 | 20480.0000 | 0.0000 | 0.0000 |
| 11 | 0 | 22528.0000 | 22528.0000 | 0.0000 | 0.0000 |
| 12 | 0 | 24576.0000 | 24576.0000 | 0.0000 | 0.0000 |

TABLE 55

54 IN CASE OF CLOCK PERIOD RATIO (RAT) OF 2232.00000
ADIR = 0, CNT = 1115(045Bh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 2232.0000 | 2232.0000 | 0.0000 | 0.0000 |
| 2 | 0 | 4464.0000 | 4464.0000 | 0.0000 | 0.0000 |
| 3 | 0 | 6696.0000 | 6696.0000 | 0.0000 | 0.0000 |
| 4 | 0 | 8928.0000 | 8928.0000 | 0.0000 | 0.0000 |
| 5 | 0 | 11160.0000 | 11160.0000 | 0.0000 | 0.0000 |
| 6 | 0 | 13392.0000 | 13392.0000 | 0.0000 | 0.0000 |
| 7 | 0 | 15624.0000 | 15624.0000 | 0.0000 | 0.0000 |
| 8 | 0 | 17856.0000 | 17856.0000 | 0.0000 | 0.0000 |
| 9 | 0 | 20088.0000 | 20088.0000 | 0.0000 | 0.0000 |
| 10 | 0 | 22320.0000 | 22320.0000 | 0.0000 | 0.0000 |
| 11 | 0 | 24552.0000 | 24552.0000 | 0.0000 | 0.0000 |
| 12 | 0 | 26784.0000 | 26784.0000 | 0.0000 | 0.0000 |

TABLE 56

55 IN CASE OF CLOCK PERIOD RATIO (RAT) OF 2976.00000
ADIR = 0, CNT = 1487(05CFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 2976.0000 | 2976.0000 | 0.0000 | 0.0000 |
| 2 | 0 | 5952.0000 | 5952.0000 | 0.0000 | 0.0000 |
| 3 | 0 | 8928.0000 | 8928.0000 | 0.0000 | 0.0000 |
| 4 | 0 | 11904.0000 | 11904.0000 | 0.0000 | 0.0000 |
| 5 | 0 | 14880.0000 | 14880.0000 | 0.0000 | 0.0000 |
| 6 | 0 | 17856.0000 | 17856.0000 | 0.0000 | 0.0000 |
| 7 | 0 | 20832.0000 | 20832.0000 | 0.0000 | 0.0000 |
| 8 | 0 | 23808.0000 | 23808.0000 | 0.0000 | 0.0000 |
| 9 | 0 | 26784.0000 | 26784.0000 | 0.0000 | 0.0000 |
| 10 | 0 | 29760.0000 | 29760.0000 | 0.0000 | 0.0000 |
| 11 | 0 | 32736.0000 | 32736.0000 | 0.0000 | 0.0000 |
| 12 | 0 | 35712.0000 | 35712.0000 | 0.0000 | 0.0000 |

TABLE 57

56 IN CASE OF CLOCK PERIOD RATIO (RAT) OF 3072.00000
ADIR = 0, CNT = 1535(05FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 3072.0000  | 3072.0000  | 0.0000 | 0.0000 |
| 2  | 0 | 6144.0000  | 6144.0000  | 0.0000 | 0.0000 |
| 3  | 0 | 9216.0000  | 9216.0000  | 0.0000 | 0.0000 |
| 4  | 0 | 12288.0000 | 12288.0000 | 0.0000 | 0.0000 |
| 5  | 0 | 15360.0000 | 15360.0000 | 0.0000 | 0.0000 |
| 6  | 0 | 18432.0000 | 18432.0000 | 0.0000 | 0.0000 |
| 7  | 0 | 21504.0000 | 21504.0000 | 0.0000 | 0.0000 |
| 8  | 0 | 24576.0000 | 24576.0000 | 0.0000 | 0.0000 |
| 9  | 0 | 27648.0000 | 27648.0000 | 0.0000 | 0.0000 |
| 10 | 0 | 30720.0000 | 30720.0000 | 0.0000 | 0.0000 |
| 11 | 0 | 33792.0000 | 33792.0000 | 0.0000 | 0.0000 |
| 12 | 0 | 36864.0000 | 36864.0000 | 0.0000 | 0.0000 |

TABLE 58

57 IN CASE OF CLOCK PERIOD RATIO (RAT) OF 3720.00000
ADIR = 0, CNT = 1859(0743h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 3720.0000  | 3720.0000  | 0.0000 | 0.0000 |
| 2  | 0 | 7440.0000  | 7440.0000  | 0.0000 | 0.0000 |
| 3  | 0 | 11160.0000 | 11160.0000 | 0.0000 | 0.0000 |
| 4  | 0 | 14880.0000 | 14880.0000 | 0.0000 | 0.0000 |
| 5  | 0 | 18600.0000 | 18600.0000 | 0.0000 | 0.0000 |
| 6  | 0 | 22320.0000 | 22320.0000 | 0.0000 | 0.0000 |
| 7  | 0 | 26040.0000 | 26040.0000 | 0.0000 | 0.0000 |
| 8  | 0 | 29760.0000 | 29760.0000 | 0.0000 | 0.0000 |
| 9  | 0 | 33480.0000 | 33480.0000 | 0.0000 | 0.0000 |
| 10 | 0 | 37200.0000 | 37200.0000 | 0.0000 | 0.0000 |
| 11 | 0 | 40920.0000 | 40920.0000 | 0.0000 | 0.0000 |
| 12 | 0 | 44640.0000 | 44640.0000 | 0.0000 | 0.0000 |

TABLE 59

58 IN CASE OF CLOCK PERIOD RATIO (RAT) OF 4096.00000
ADIR = 0, CNT = 2047(07FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 4096.0000  | 4096.0000  | 0.0000 | 0.0000 |
| 2  | 0 | 8192.0000  | 8192.0000  | 0.0000 | 0.0000 |
| 3  | 0 | 12288.0000 | 12288.0000 | 0.0000 | 0.0000 |
| 4  | 0 | 16384.0000 | 16384.0000 | 0.0000 | 0.0000 |
| 5  | 0 | 20480.0000 | 20480.0000 | 0.0000 | 0.0000 |
| 6  | 0 | 24576.0000 | 24576.0000 | 0.0000 | 0.0000 |
| 7  | 0 | 28672.0000 | 28672.0000 | 0.0000 | 0.0000 |
| 8  | 0 | 32768.0000 | 32768.0000 | 0.0000 | 0.0000 |
| 9  | 0 | 36864.0000 | 36864.0000 | 0.0000 | 0.0000 |
| 10 | 0 | 40960.0000 | 40960.0000 | 0.0000 | 0.0000 |
| 11 | 0 | 45056.0000 | 45056.0000 | 0.0000 | 0.0000 |
| 12 | 0 | 49152.0000 | 49152.0000 | 0.0000 | 0.0000 |

TABLE 60

59 IN CASE OF CLOCK PERIOD RATIO (RAT) OF 4464.00000
ADIR = 0, CNT = 2231(08B7h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 4464.0000  | 4464.0000  | 0.0000 | 0.0000 |
| 2  | 0 | 8928.0000  | 8928.0000  | 0.0000 | 0.0000 |
| 3  | 0 | 13392.0000 | 13392.0000 | 0.0000 | 0.0000 |
| 4  | 0 | 17856.0000 | 17856.0000 | 0.0000 | 0.0000 |
| 5  | 0 | 22320.0000 | 22320.0000 | 0.0000 | 0.0000 |
| 6  | 0 | 26784.0000 | 26784.0000 | 0.0000 | 0.0000 |
| 7  | 0 | 31248.0000 | 31248.0000 | 0.0000 | 0.0000 |
| 8  | 0 | 35712.0000 | 35712.0000 | 0.0000 | 0.0000 |
| 9  | 0 | 40176.0000 | 40176.0000 | 0.0000 | 0.0000 |
| 10 | 0 | 44640.0000 | 44640.0000 | 0.0000 | 0.0000 |
| 11 | 0 | 49104.0000 | 49104.0000 | 0.0000 | 0.0000 |
| 12 | 0 | 53568.0000 | 53568.0000 | 0.0000 | 0.0000 |

TABLE 61

60 IN CASE OF CLOCK PERIOD RATIO (RAT) OF 5952.00000
ADIR = 0, CNT = 2975(0B9Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 5952.0000  | 5952.0000  | 0.0000 | 0.0000 |
| 2  | 0 | 11904.0000 | 11904.0000 | 0.0000 | 0.0000 |
| 3  | 0 | 17856.0000 | 17856.0000 | 0.0000 | 0.0000 |
| 4  | 0 | 23808.0000 | 23808.0000 | 0.0000 | 0.0000 |
| 5  | 0 | 29760.0000 | 29760.0000 | 0.0000 | 0.0000 |
| 6  | 0 | 35712.0000 | 35712.0000 | 0.0000 | 0.0000 |
| 7  | 0 | 41664.0000 | 41664.0000 | 0.0000 | 0.0000 |
| 8  | 0 | 47616.0000 | 47616.0000 | 0.0000 | 0.0000 |
| 9  | 0 | 53568.0000 | 53568.0000 | 0.0000 | 0.0000 |
| 10 | 0 | 59520.0000 | 59520.0000 | 0.0000 | 0.0000 |
| 11 | 0 | 65472.0000 | 65472.0000 | 0.0000 | 0.0000 |
| 12 | 0 | 71424.0000 | 71424.0000 | 0.0000 | 0.0000 |

TABLE 62

61 IN CASE OF CLOCK PERIOD RATIO (RAT) OF 6144.00000
ADIR = 0, CNT = 3071(0BFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 6144.0000  | 6144.0000  | 0.0000 | 0.0000 |
| 2  | 0 | 12288.0000 | 12288.0000 | 0.0000 | 0.0000 |
| 3  | 0 | 18432.0000 | 18432.0000 | 0.0000 | 0.0000 |
| 4  | 0 | 24576.0000 | 24576.0000 | 0.0000 | 0.0000 |
| 5  | 0 | 30720.0000 | 30720.0000 | 0.0000 | 0.0000 |
| 6  | 0 | 36864.0000 | 36864.0000 | 0.0000 | 0.0000 |
| 7  | 0 | 43008.0000 | 43008.0000 | 0.0000 | 0.0000 |
| 8  | 0 | 49152.0000 | 49152.0000 | 0.0000 | 0.0000 |
| 9  | 0 | 55296.0000 | 55296.0000 | 0.0000 | 0.0000 |
| 10 | 0 | 61440.0000 | 61440.0000 | 0.0000 | 0.0000 |
| 11 | 0 | 67584.0000 | 67584.0000 | 0.0000 | 0.0000 |
| 12 | 0 | 73728.0000 | 73728.0000 | 0.0000 | 0.0000 |

TABLE 63

62 IN CASE OF CLOCK PERIOD RATIO (RAT) OF 7440.00000
ADIR = 0, CNT = 3719(0E87h), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 7440.0000 | 7440.0000 | 0.0000 | 0.0000 |
| 2 | 0 | 14880.0000 | 14880.0000 | 0.0000 | 0.0000 |
| 3 | 0 | 22320.0000 | 22320.0000 | 0.0000 | 0.0000 |
| 4 | 0 | 29760.0000 | 29760.0000 | 0.0000 | 0.0000 |
| 5 | 0 | 37200.0000 | 37200.0000 | 0.0000 | 0.0000 |
| 6 | 0 | 44640.0000 | 44640.0000 | 0.0000 | 0.0000 |
| 7 | 0 | 52080.0000 | 52080.0000 | 0.0000 | 0.0000 |
| 8 | 0 | 59520.0000 | 59520.0000 | 0.0000 | 0.0000 |
| 9 | 0 | 66960.0000 | 66960.0000 | 0.0000 | 0.0000 |
| 10 | 0 | 74400.0000 | 74400.0000 | 0.0000 | 0.0000 |
| 11 | 0 | 81840.0000 | 81840.0000 | 0.0000 | 0.0000 |
| 12 | 0 | 89280.0000 | 89280.0000 | 0.0000 | 0.0000 |

TABLE 64

63 IN CASE OF CLOCK PERIOD RATIO (RAT) OF 8192.00000
ADIR = 0, CNT = 4095(0FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 8192.0000 | 8192.0000 | 0.0000 | 0.0000 |
| 2 | 0 | 16384.0000 | 16384.0000 | 0.0000 | 0.0000 |
| 3 | 0 | 24576.0000 | 24576.0000 | 0.0000 | 0.0000 |
| 4 | 0 | 32768.0000 | 32768.0000 | 0.0000 | 0.0000 |
| 5 | 0 | 40960.0000 | 40960.0000 | 0.0000 | 0.0000 |
| 6 | 0 | 49152.0000 | 49152.0000 | 0.0000 | 0.0000 |
| 7 | 0 | 57344.0000 | 57344.0000 | 0.0000 | 0.0000 |
| 8 | 0 | 65536.0000 | 65536.0000 | 0.0000 | 0.0000 |
| 9 | 0 | 73728.0000 | 73728.0000 | 0.0000 | 0.0000 |
| 10 | 0 | 81920.0000 | 81920.0000 | 0.0000 | 0.0000 |
| 11 | 0 | 90112.0000 | 90112.0000 | 0.0000 | 0.0000 |
| 12 | 0 | 98304.0000 | 98304.0000 | 0.0000 | 0.0000 |

TABLE 65

64 IN CASE OF CLOCK PERIOD RATIO (RAT) OF 8928.00000
ADIR = 0, CNT = 4463(116Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 8928.0000 | 8928.0000 | 0.0000 | 0.0000 |
| 2 | 0 | 17856.0000 | 17856.0000 | 0.0000 | 0.0000 |
| 3 | 0 | 26784.0000 | 26784.0000 | 0.0000 | 0.0000 |
| 4 | 0 | 35712.0000 | 35712.0000 | 0.0000 | 0.0000 |
| 5 | 0 | 44640.0000 | 44640.0000 | 0.0000 | 0.0000 |
| 6 | 0 | 53568.0000 | 53568.0000 | 0.0000 | 0.0000 |
| 7 | 0 | 62496.0000 | 62496.0000 | 0.0000 | 0.0000 |
| 8 | 0 | 71424.0000 | 71424.0000 | 0.0000 | 0.0000 |
| 9 | 0 | 80352.0000 | 80352.0000 | 0.0000 | 0.0000 |
| 10 | 0 | 89280.0000 | 89280.0000 | 0.0000 | 0.0000 |
| 11 | 0 | 98208.0000 | 98208.0000 | 0.0000 | 0.0000 |
| 12 | 0 | 107136.0000 | 107136.0000 | 0.0000 | 0.0000 |

TABLE 66

65 IN CASE OF CLOCK PERIOD RATIO (RAT) OF 11904.00000
ADIR = 0, CNT = 5951(173Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 11904.0000 | 11904.0000 | 0.0000 | 0.0000 |
| 2 | 0 | 23808.0000 | 23808.0000 | 0.0000 | 0.0000 |
| 3 | 0 | 35712.0000 | 35712.0000 | 0.0000 | 0.0000 |
| 4 | 0 | 47616.0000 | 47616.0000 | 0.0000 | 0.0000 |
| 5 | 0 | 59520.0000 | 59520.0000 | 0.0000 | 0.0000 |
| 6 | 0 | 71424.0000 | 71424.0000 | 0.0000 | 0.0000 |
| 7 | 0 | 83328.0000 | 83328.0000 | 0.0000 | 0.0000 |
| 8 | 0 | 95232.0000 | 95232.0000 | 0.0000 | 0.0000 |
| 9 | 0 | 107136.0000 | 107136.0000 | 0.0000 | 0.0000 |
| 10 | 0 | 119040.0000 | 119040.0000 | 0.0000 | 0.0000 |
| 11 | 0 | 130944.0000 | 130944.0000 | 0.0000 | 0.0000 |
| 12 | 0 | 142848.0000 | 142848.0000 | 0.0000 | 0.0000 |

TABLE 67

66 IN CASE OF CLOCK PERIOD RATIO (RAT) OF 12288.00000
ADIR = 0, CNT = 6143(17FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 12288.0000 | 12288.0000 | 0.0000 | 0.0000 |
| 2 | 0 | 24576.0000 | 24576.0000 | 0.0000 | 0.0000 |
| 3 | 0 | 36864.0000 | 36864.0000 | 0.0000 | 0.0000 |
| 4 | 0 | 49152.0000 | 49152.0000 | 0.0000 | 0.0000 |
| 5 | 0 | 61440.0000 | 61440.0000 | 0.0000 | 0.0000 |
| 6 | 0 | 73728.0000 | 73728.0000 | 0.0000 | 0.0000 |
| 7 | 0 | 86016.0000 | 86016.0000 | 0.0000 | 0.0000 |
| 8 | 0 | 98304.0000 | 98304.0000 | 0.0000 | 0.0000 |
| 9 | 0 | 110592.0000 | 110592.0000 | 0.0000 | 0.0000 |
| 10 | 0 | 122880.0000 | 122880.0000 | 0.0000 | 0.0000 |
| 11 | 0 | 135168.0000 | 135168.0000 | 0.0000 | 0.0000 |
| 12 | 0 | 147456.0000 | 147456.0000 | 0.0000 | 0.0000 |

TABLE 68

67 IN CASE OF CLOCK PERIOD RATIO (RAT) OF 14880.00000
ADIR = 0, CNT = 7439(1D0Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1 | 0 | 14880.0000 | 14880.0000 | 0.0000 | 0.0000 |
| 2 | 0 | 29760.0000 | 29760.0000 | 0.0000 | 0.0000 |
| 3 | 0 | 44640.0000 | 44640.0000 | 0.0000 | 0.0000 |
| 4 | 0 | 59520.0000 | 59520.0000 | 0.0000 | 0.0000 |
| 5 | 0 | 74400.0000 | 74400.0000 | 0.0000 | 0.0000 |
| 6 | 0 | 89280.0000 | 89280.0000 | 0.0000 | 0.0000 |
| 7 | 0 | 104160.0000 | 104160.0000 | 0.0000 | 0.0000 |
| 8 | 0 | 119040.0000 | 119040.0000 | 0.0000 | 0.0000 |
| 9 | 0 | 133920.0000 | 133920.0000 | 0.0000 | 0.0000 |
| 10 | 0 | 148800.0000 | 148800.0000 | 0.0000 | 0.0000 |
| 11 | 0 | 163680.0000 | 163680.0000 | 0.0000 | 0.0000 |
| 12 | 0 | 178560.0000 | 178560.0000 | 0.0000 | 0.0000 |

TABLE 69

68 IN CASE OF CLOCK PERIOD RATIO (RAT) OF 16384.00000
ADIR = 0, CNT = 8191(1FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 16384.0000  | 16384.0000  | 0.0000 | 0.0000 |
| 2  | 0 | 32768.0000  | 32768.0000  | 0.0000 | 0.0000 |
| 3  | 0 | 49152.0000  | 49152.0000  | 0.0000 | 0.0000 |
| 4  | 0 | 65536.0000  | 65536.0000  | 0.0000 | 0.0000 |
| 5  | 0 | 81920.0000  | 81920.0000  | 0.0000 | 0.0000 |
| 6  | 0 | 98304.0000  | 98304.0000  | 0.0000 | 0.0000 |
| 7  | 0 | 114688.0000 | 114688.0000 | 0.0000 | 0.0000 |
| 8  | 0 | 131072.0000 | 131072.0000 | 0.0000 | 0.0000 |
| 9  | 0 | 147456.0000 | 147456.0000 | 0.0000 | 0.0000 |
| 10 | 0 | 163840.0000 | 163840.0000 | 0.0000 | 0.0000 |
| 11 | 0 | 180224.0000 | 180224.0000 | 0.0000 | 0.0000 |
| 12 | 0 | 196608.0000 | 196608.0000 | 0.0000 | 0.0000 |

TABLE 70

69 IN CASE OF CLOCK PERIOD RATIO (RAT) OF 17856.00000
ADIR = 0, CNT = 8927(22DFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 17856.0000  | 17856.0000  | 0.0000 | 0.0000 |
| 2  | 0 | 35712.0000  | 35712.0000  | 0.0000 | 0.0000 |
| 3  | 0 | 53568.0000  | 53568.0000  | 0.0000 | 0.0000 |
| 4  | 0 | 71424.0000  | 71424.0000  | 0.0000 | 0.0000 |
| 5  | 0 | 89280.0000  | 89280.0000  | 0.0000 | 0.0000 |
| 6  | 0 | 107136.0000 | 107136.0000 | 0.0000 | 0.0000 |
| 7  | 0 | 124992.0000 | 124992.0000 | 0.0000 | 0.0000 |
| 8  | 0 | 142848.0000 | 142848.0000 | 0.0000 | 0.0000 |
| 9  | 0 | 160704.0000 | 160704.0000 | 0.0000 | 0.0000 |
| 10 | 0 | 178560.0000 | 178560.0000 | 0.0000 | 0.0000 |
| 11 | 0 | 196416.0000 | 196416.0000 | 0.0000 | 0.0000 |
| 12 | 0 | 214272.0000 | 214272.0000 | 0.0000 | 0.0000 |

TABLE 71

70 IN CASE OF CLOCK PERIOD RATIO (RAT) OF 23808.00000
ADIR = 0, CNT = 11903(2E7Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 23808.0000  | 23808.0000  | 0.0000 | 0.0000 |
| 2  | 0 | 47616.0000  | 47616.0000  | 0.0000 | 0.0000 |
| 3  | 0 | 71424.0000  | 71424.0000  | 0.0000 | 0.0000 |
| 4  | 0 | 95232.0000  | 95232.0000  | 0.0000 | 0.0000 |
| 5  | 0 | 119040.0000 | 119040.0000 | 0.0000 | 0.0000 |
| 6  | 0 | 142848.0000 | 142848.0000 | 0.0000 | 0.0000 |
| 7  | 0 | 166656.0000 | 166656.0000 | 0.0000 | 0.0000 |
| 8  | 0 | 190464.0000 | 190464.0000 | 0.0000 | 0.0000 |
| 9  | 0 | 214272.0000 | 214272.0000 | 0.0000 | 0.0000 |
| 10 | 0 | 238080.0000 | 238080.0000 | 0.0000 | 0.0000 |
| 11 | 0 | 261888.0000 | 261888.0000 | 0.0000 | 0.0000 |
| 12 | 0 | 285696.0000 | 285696.0000 | 0.0000 | 0.0000 |

TABLE 72

71 IN CASE OF CLOCK PERIOD RATIO (RAT) OF 24576.00000
ADIR = 0, CNT = 12287(2FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 24576.0000  | 24576.0000  | 0.0000 | 0.0000 |
| 2  | 0 | 49152.0000  | 49152.0000  | 0.0000 | 0.0000 |
| 3  | 0 | 73728.0000  | 73728.0000  | 0.0000 | 0.0000 |
| 4  | 0 | 98304.0000  | 98304.0000  | 0.0000 | 0.0000 |
| 5  | 0 | 122880.0000 | 122880.0000 | 0.0000 | 0.0000 |
| 6  | 0 | 147456.0000 | 147456.0000 | 0.0000 | 0.0000 |
| 7  | 0 | 172032.0000 | 172032.0000 | 0.0000 | 0.0000 |
| 8  | 0 | 196608.0000 | 196608.0000 | 0.0000 | 0.0000 |
| 9  | 0 | 221184.0000 | 221184.0000 | 0.0000 | 0.0000 |
| 10 | 0 | 245760.0000 | 245760.0000 | 0.0000 | 0.0000 |
| 11 | 0 | 270336.0000 | 270336.0000 | 0.0000 | 0.0000 |
| 12 | 0 | 294912.0000 | 294912.0000 | 0.0000 | 0.0000 |

TABLE 73

72 IN CASE OF CLOCK PERIOD RATIO (RAT) OF 29760.00000
ADIR = 0, CNT = 14879(3A1Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 29760.0000  | 29760.0000  | 0.0000 | 0.0000 |
| 2  | 0 | 59520.0000  | 59520.0000  | 0.0000 | 0.0000 |
| 3  | 0 | 89280.0000  | 89280.0000  | 0.0000 | 0.0000 |
| 4  | 0 | 119040.0000 | 119040.0000 | 0.0000 | 0.0000 |
| 5  | 0 | 148800.0000 | 148800.0000 | 0.0000 | 0.0000 |
| 6  | 0 | 178560.0000 | 178560.0000 | 0.0000 | 0.0000 |
| 7  | 0 | 208320.0000 | 208320.0000 | 0.0000 | 0.0000 |
| 8  | 0 | 238080.0000 | 238080.0000 | 0.0000 | 0.0000 |
| 9  | 0 | 267840.0000 | 267840.0000 | 0.0000 | 0.0000 |
| 10 | 0 | 297600.0000 | 297600.0000 | 0.0000 | 0.0000 |
| 11 | 0 | 327360.0000 | 327360.0000 | 0.0000 | 0.0000 |
| 12 | 0 | 357120.0000 | 357120.0000 | 0.0000 | 0.0000 |

TABLE 74

73 IN CASE OF CLOCK PERIOD RATIO (RAT) OF 32768.00000
ADIR = 0, CNT = 16383(3FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 32768.0000  | 32768.0000  | 0.0000 | 0.0000 |
| 2  | 0 | 65536.0000  | 65536.0000  | 0.0000 | 0.0000 |
| 3  | 0 | 98304.0000  | 98304.0000  | 0.0000 | 0.0000 |
| 4  | 0 | 131072.0000 | 131072.0000 | 0.0000 | 0.0000 |
| 5  | 0 | 163840.0000 | 163840.0000 | 0.0000 | 0.0000 |
| 6  | 0 | 196608.0000 | 196608.0000 | 0.0000 | 0.0000 |
| 7  | 0 | 229376.0000 | 229376.0000 | 0.0000 | 0.0000 |
| 8  | 0 | 262144.0000 | 262144.0000 | 0.0000 | 0.0000 |
| 9  | 0 | 294912.0000 | 294912.0000 | 0.0000 | 0.0000 |
| 10 | 0 | 327680.0000 | 327680.0000 | 0.0000 | 0.0000 |
| 11 | 0 | 360448.0000 | 360448.0000 | 0.0000 | 0.0000 |
| 12 | 0 | 393216.0000 | 393216.0000 | 0.0000 | 0.0000 |

TABLE 75

74 IN CASE OF CLOCK PERIOD RATIO (RAT) OF 35712.00000
ADIR = 0, CNT = 17855(45BFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 35712.0000  | 35712.0000  | 0.0000 | 0.0000 |
| 2  | 0 | 71424.0000  | 71424.0000  | 0.0000 | 0.0000 |
| 3  | 0 | 107136.0000 | 107136.0000 | 0.0000 | 0.0000 |
| 4  | 0 | 142848.0000 | 142848.0000 | 0.0000 | 0.0000 |
| 5  | 0 | 178560.0000 | 178560.0000 | 0.0000 | 0.0000 |
| 6  | 0 | 214272.0000 | 214272.0000 | 0.0000 | 0.0000 |
| 7  | 0 | 249984.0000 | 249984.0000 | 0.0000 | 0.0000 |
| 8  | 0 | 285696.0000 | 285696.0000 | 0.0000 | 0.0000 |
| 9  | 0 | 321408.0000 | 321408.0000 | 0.0000 | 0.0000 |
| 10 | 0 | 357120.0000 | 357120.0000 | 0.0000 | 0.0000 |
| 11 | 0 | 392832.0000 | 392832.0000 | 0.0000 | 0.0000 |
| 12 | 0 | 428544.0000 | 428544.0000 | 0.0000 | 0.0000 |

TABLE 76

75 IN CASE OF CLOCK PERIOD RATIO (RAT) OF 47616.00000
ADIR = 0, CNT = 23807(5CFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 47616.0000  | 47616.0000  | 0.0000 | 0.0000 |
| 2  | 0 | 95232.0000  | 95232.0000  | 0.0000 | 0.0000 |
| 3  | 0 | 142848.0000 | 142848.0000 | 0.0000 | 0.0000 |
| 4  | 0 | 190464.0000 | 190464.0000 | 0.0000 | 0.0000 |
| 5  | 0 | 238080.0000 | 238080.0000 | 0.0000 | 0.0000 |
| 6  | 0 | 285696.0000 | 285696.0000 | 0.0000 | 0.0000 |
| 7  | 0 | 333312.0000 | 333312.0000 | 0.0000 | 0.0000 |
| 8  | 0 | 380928.0000 | 380928.0000 | 0.0000 | 0.0000 |
| 9  | 0 | 428544.0000 | 428544.0000 | 0.0000 | 0.0000 |
| 10 | 0 | 476160.0000 | 476160.0000 | 0.0000 | 0.0000 |
| 11 | 0 | 523776.0000 | 523776.0000 | 0.0000 | 0.0000 |
| 12 | 0 | 571392.0000 | 571392.0000 | 0.0000 | 0.0000 |

TABLE 77

76 IN CASE OF CLOCK PERIOD RATIO (RAT) OF 49152.00000
ADIR = 0, CNT = 24575(5FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 49152.0000  | 49152.0000  | 0.0000 | 0.0000 |
| 2  | 0 | 98304.0000  | 98304.0000  | 0.0000 | 0.0000 |
| 3  | 0 | 147456.0000 | 147456.0000 | 0.0000 | 0.0000 |
| 4  | 0 | 196608.0000 | 196608.0000 | 0.0000 | 0.0000 |
| 5  | 0 | 245760.0000 | 245760.0000 | 0.0000 | 0.0000 |
| 6  | 0 | 294912.0000 | 294912.0000 | 0.0000 | 0.0000 |
| 7  | 0 | 344064.0000 | 344064.0000 | 0.0000 | 0.0000 |
| 8  | 0 | 393216.0000 | 393216.0000 | 0.0000 | 0.0000 |
| 9  | 0 | 442368.0000 | 442368.0000 | 0.0000 | 0.0000 |
| 10 | 0 | 491520.0000 | 491520.0000 | 0.0000 | 0.0000 |
| 11 | 0 | 540672.0000 | 540672.0000 | 0.0000 | 0.0000 |
| 12 | 0 | 589824.0000 | 589824.0000 | 0.0000 | 0.0000 |

TABLE 78

77 IN CASE OF CLOCK PERIOD RATIO (RAT) OF 59520.00000
ADIR = 0, CNT = 29759(743Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 59520.0000  | 59520.0000  | 0.0000 | 0.0000 |
| 2  | 0 | 119040.0000 | 119040.0000 | 0.0000 | 0.0000 |
| 3  | 0 | 178560.0000 | 178560.0000 | 0.0000 | 0.0000 |
| 4  | 0 | 238080.0000 | 238080.0000 | 0.0000 | 0.0000 |
| 5  | 0 | 297600.0000 | 297600.0000 | 0.0000 | 0.0000 |
| 6  | 0 | 357120.0000 | 357120.0000 | 0.0000 | 0.0000 |
| 7  | 0 | 416640.0000 | 416640.0000 | 0.0000 | 0.0000 |
| 8  | 0 | 476160.0000 | 476160.0000 | 0.0000 | 0.0000 |
| 9  | 0 | 535680.0000 | 535680.0000 | 0.0000 | 0.0000 |
| 10 | 0 | 595200.0000 | 595200.0000 | 0.0000 | 0.0000 |
| 11 | 0 | 654720.0000 | 654720.0000 | 0.0000 | 0.0000 |
| 12 | 0 | 714240.0000 | 714240.0000 | 0.0000 | 0.0000 |

TABLE 79

78 IN CASE OF CLOCK PERIOD RATIO (RAT) OF 65536.00000
ADIR = 0, CNT = 32767(7FFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 65536.0000  | 65536.0000  | 0.0000 | 0.0000 |
| 2  | 0 | 131072.0000 | 131072.0000 | 0.0000 | 0.0000 |
| 3  | 0 | 196608.0000 | 196608.0000 | 0.0000 | 0.0000 |
| 4  | 0 | 262144.0000 | 262144.0000 | 0.0000 | 0.0000 |
| 5  | 0 | 327680.0000 | 327680.0000 | 0.0000 | 0.0000 |
| 6  | 0 | 393216.0000 | 393216.0000 | 0.0000 | 0.0000 |
| 7  | 0 | 458752.0000 | 458752.0000 | 0.0000 | 0.0000 |
| 8  | 0 | 524288.0000 | 524288.0000 | 0.0000 | 0.0000 |
| 9  | 0 | 589824.0000 | 589824.0000 | 0.0000 | 0.0000 |
| 10 | 0 | 655360.0000 | 655360.0000 | 0.0000 | 0.0000 |
| 11 | 0 | 720896.0000 | 720896.0000 | 0.0000 | 0.0000 |
| 12 | 0 | 786432.0000 | 786432.0000 | 0.0000 | 0.0000 |

TABLE 80

79 IN CASE OF CLOCK PERIOD RATIO (RAT) OF 71424.00000
ADIR = 0, CNT = 35711(8B7Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/ etu |
|---|---|---|---|---|---|
| 1  | 0 | 71424.0000  | 71424.0000  | 0.0000 | 0.0000 |
| 2  | 0 | 142848.0000 | 142848.0000 | 0.0000 | 0.0000 |
| 3  | 0 | 214272.0000 | 214272.0000 | 0.0000 | 0.0000 |
| 4  | 0 | 285696.0000 | 285696.0000 | 0.0000 | 0.0000 |
| 5  | 0 | 357120.0000 | 357120.0000 | 0.0000 | 0.0000 |
| 6  | 0 | 428544.0000 | 428544.0000 | 0.0000 | 0.0000 |
| 7  | 0 | 499968.0000 | 499968.0000 | 0.0000 | 0.0000 |
| 8  | 0 | 571392.0000 | 571392.0000 | 0.0000 | 0.0000 |
| 9  | 0 | 642816.0000 | 642816.0000 | 0.0000 | 0.0000 |
| 10 | 0 | 714240.0000 | 714240.0000 | 0.0000 | 0.0000 |
| 11 | 0 | 785664.0000 | 785664.0000 | 0.0000 | 0.0000 |
| 12 | 0 | 857088.0000 | 857088.0000 | 0.0000 | 0.0000 |

TABLE 81

80 IN CASE OF CLOCK PERIOD RATIO (RAT) OF 95232.00000
ADIR = 0, CNT = 47615(B9FFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 95232.0000 | 95232.0000 | 0.0000 | 0.0000 |
| 2 | 0 | 190464.0000 | 190464.0000 | 0.0000 | 0.0000 |
| 3 | 0 | 285696.0000 | 285696.0000 | 0.0000 | 0.0000 |
| 4 | 0 | 380928.0000 | 380928.0000 | 0.0000 | 0.0000 |
| 5 | 0 | 476160.0000 | 476160.0000 | 0.0000 | 0.0000 |
| 6 | 0 | 571392.0000 | 571392.0000 | 0.0000 | 0.0000 |
| 7 | 0 | 666624.0000 | 666624.0000 | 0.0000 | 0.0000 |
| 8 | 0 | 761856.0000 | 761856.0000 | 0.0000 | 0.0000 |
| 9 | 0 | 857088.0000 | 857088.0000 | 0.0000 | 0.0000 |
| 10 | 0 | 952320.0000 | 952320.0000 | 0.0000 | 0.0000 |
| 11 | 0 | 1047552.0000 | 1047552.0000 | 0.0000 | 0.0000 |
| 12 | 0 | 1142784.0000 | 1142784.0000 | 0.0000 | 0.0000 |

TABLE 82

81 IN CASE OF CLOCK PERIOD RATIO (RAT) OF 98304.00000
ADIR = 0, CNT = 49151(BFFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 98304.0000 | 98304.0000 | 0.0000 | 0.0000 |
| 2 | 0 | 196608.0000 | 196608.0000 | 0.0000 | 0.0000 |
| 3 | 0 | 294912.0000 | 294912.0000 | 0.0000 | 0.0000 |
| 4 | 0 | 393216.0000 | 393216.0000 | 0.0000 | 0.0000 |
| 5 | 0 | 491520.0000 | 491520.0000 | 0.0000 | 0.0000 |
| 6 | 0 | 589824.0000 | 589824.0000 | 0.0000 | 0.0000 |
| 7 | 0 | 688128.0000 | 688128.0000 | 0.0000 | 0.0000 |
| 8 | 0 | 786432.0000 | 786432.0000 | 0.0000 | 0.0000 |
| 9 | 0 | 884736.0000 | 884736.0000 | 0.0000 | 0.0000 |
| 10 | 0 | 983040.0000 | 983040.0000 | 0.0000 | 0.0000 |
| 11 | 0 | 1081344.0000 | 1081344.0000 | 0.0000 | 0.0000 |
| 12 | 0 | 1179648.0000 | 1179648.0000 | 0.0000 | 0.0000 |

TABLE 83

82 IN CASE OF CLOCK PERIOD RATIO (RAT) OF 119040.00000
ADIR = 0, CNT = 59519(E87Fh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 119040.0000 | 119040.0000 | 0.0000 | 0.0000 |
| 2 | 0 | 238080.0000 | 238080.0000 | 0.0000 | 0.0000 |
| 3 | 0 | 357120.0000 | 357120.0000 | 0.0000 | 0.0000 |
| 4 | 0 | 476160.0000 | 476160.0000 | 0.0000 | 0.0000 |
| 5 | 0 | 595200.0000 | 595200.0000 | 0.0000 | 0.0000 |
| 6 | 0 | 714240.0000 | 714240.0000 | 0.0000 | 0.0000 |
| 7 | 0 | 833280.0000 | 833280.0000 | 0.0000 | 0.0000 |
| 8 | 0 | 952320.0000 | 952320.0000 | 0.0000 | 0.0000 |
| 9 | 0 | 1071360.0000 | 1071360.0000 | 0.0000 | 0.0000 |
| 10 | 0 | 1190400.0000 | 1190400.0000 | 0.0000 | 0.0000 |
| 11 | 0 | 1309440.0000 | 1309440.0000 | 0.0000 | 0.0000 |
| 12 | 0 | 1428480.0000 | 1428480.0000 | 0.0000 | 0.0000 |

TABLE 84

83 IN CASE OF CLOCK PERIOD RATIO (RAT) OF 131072.00000
ADIR = 0, CNT = 65535(FFFFh), ADJ = 000000000000b(000h)

| BIT NO. | ADJ | COUNT OF INTERNAL CLOCK ($\Sigma$CLK(i)) | SUMMATION OF TRANSFER RATE/etu ($\Sigma$RAT(i)) | DEVIATION ($\Sigma$CLK(i) − $\Sigma$RAT(i)) | ERROR/etu |
|---|---|---|---|---|---|
| 1 | 0 | 131072.0000 | 131072.0000 | 0.0000 | 0.0000 |
| 2 | 0 | 262144.0000 | 262144.0000 | 0.0000 | 0.0000 |
| 3 | 0 | 393216.0000 | 393216.0000 | 0.0000 | 0.0000 |
| 4 | 0 | 524288.0000 | 524288.0000 | 0.0000 | 0.0000 |
| 5 | 0 | 655360.0000 | 655360.0000 | 0.0000 | 0.0000 |
| 6 | 0 | 786432.0000 | 786432.0000 | 0.0000 | 0.0000 |
| 7 | 0 | 917504.0000 | 917504.0000 | 0.0000 | 0.0000 |
| 8 | 0 | 1048576.0000 | 1048576.0000 | 0.0000 | 0.0000 |
| 9 | 0 | 1179648.0000 | 1179648.0000 | 0.0000 | 0.0000 |
| 10 | 0 | 1310720.0000 | 1310720.0000 | 0.0000 | 0.0000 |
| 11 | 0 | 1441792.0000 | 1441792.0000 | 0.0000 | 0.0000 |
| 12 | 0 | 1572864.0000 | 1572864.0000 | 0.0000 | 0.0000 |

Next, the operation of the interface apparatus 51 employing the clock signal adjusting unit 1 according to the first embodiment of the present invention will be described below.

First, the control unit 52 sets a frequency division ratio for the internal clock signal ICLK in the register 20, a frequency division ratio for the card operation clock signal CCLK in the register 22. Also, the control unit 52 sets the adjusted period designating data APD in the register 24, and the 1-bit adjustment direction designating data ADIR in the register 35. Further, the control unit 52 sets the internal counter value CNT for the down counter 27 into the register 26. These values are determined based on an externally input designation or the ratio of data transfer clock signal period to card operation clock signal period, obtained in the initial response.

Assuming now such a combination that ADIR=0, ADJ=010001000100b, and CNT=5, the operation of the interface apparatus 51 when one character is transferred will be described with reference to FIG. 2 and FIGS. 7A to 7E.

In this example, if the internal clock signal ICLK is counted simply 5 periods by 5 periods to generate the data transfer clock signal TCLK, the errors are gradually accumulated proceeding to the last bit (T2) of the one character. As a result, there would be a case that transmission/reception of data fail. This is because the frequency of the generated data transfer clock signal TCLK is slightly larger than an expected frequency of the data transfer clock signal for the IC card 50. In a data transfer operation between the IC card 50 and the interface apparatus 51, a parity bit must be received within a time period of 9.5 etu±0.2 etu from a head of a start bit such that the parity check can be performed. When an error is detected based on the parity bit, "0" must be output to a data line between this IC card 50 and the interface apparatus 51 within a time period of 1 to 2 etu after 10.5 etu from the head of the start bit. As a consequence, accumulation of the errors must be prevented for the data transfer clock signal TCLK within a time period defined from the head of the start bit to 12 etu.

Figure 7:
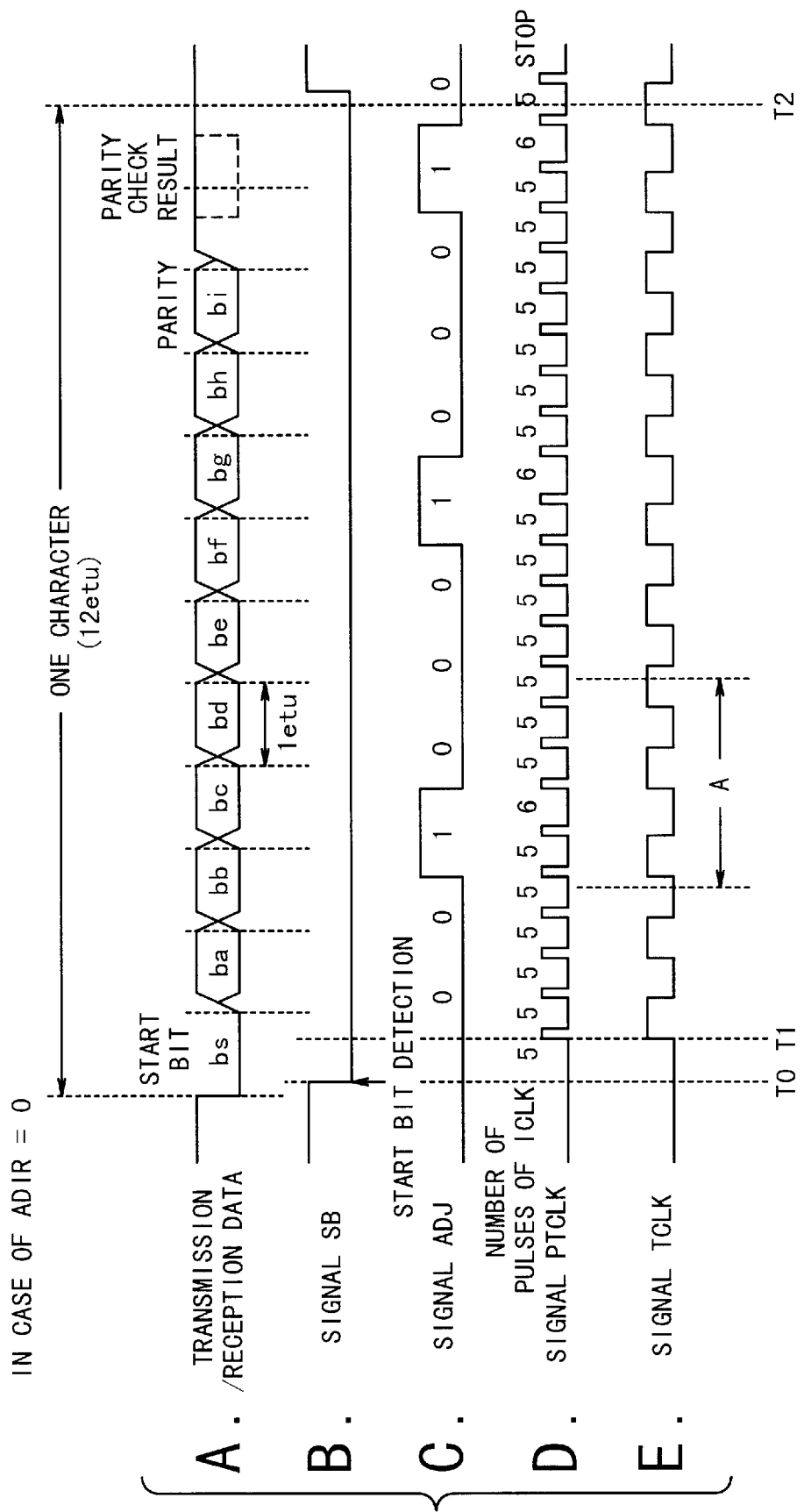
FIGS. 7A to 7E are signal waveform diagrams when data of one character (12 etu) is transferred in case of adjustment direction designating data ADIR=0.

In accordance with this embodiment, the period count value of the internal clock signal ICLK is increased by "1" to extend "etu" in proper periods, by which the error accumulation can be avoided. In the case that the adjusted period designating data APD of 12 bits is sequentially outputted as the adjusted period designating bit signal ADJ from the least significant bit as shown in FIG. 7C. When the adjusted period designating bit signal ADJ is "1" and further the data transfer clock signal TCLK is "0", the extra counting of the internal clock signal ICLK is carried out, as shown in FIG. 7E by a range A.

In other words, at the same time when the start bit of a reception data, or writing of a transmission data is detected, the stand-by signal SB is reset as shown in FIG. 7B. At this time (T0), the shift register 25 is set to the shift operation enable state. Also, the down counter 27 starts to count down the value, i.e., "5" set in the counter 27 from the register 26. The down counter 27 counts by −1 every time the falling edge of the internal clock signal ICLK, namely executes the count down operation. The output of the EOR gate 34 as the selection signal SEL is "0", unless the data transfer clock signal TCLK is "0" and also the adjusted period designating bit signal ADJ outputted from the shift register 25 is "1". In addition, one of the internal data bits of "0" and "1" entered from the comparator 28x is selected as the output from the multiplexer 29 in accordance with the selection signal SEL. Therefore, the previous stage data transfer clock signal PTCLK is outputted at the rising edge of the internal clock signal ICLK immediately after the output of the counter 27 becomes "1". As a result, the content of the counter 27 is initialized in response to the clock signal PTCLK. In other words, the value "5" set in the register 26 for the down counter 27 is loaded on the down counter 27, so that the subsequent count down operation is commenced (T1).

Figure 8:
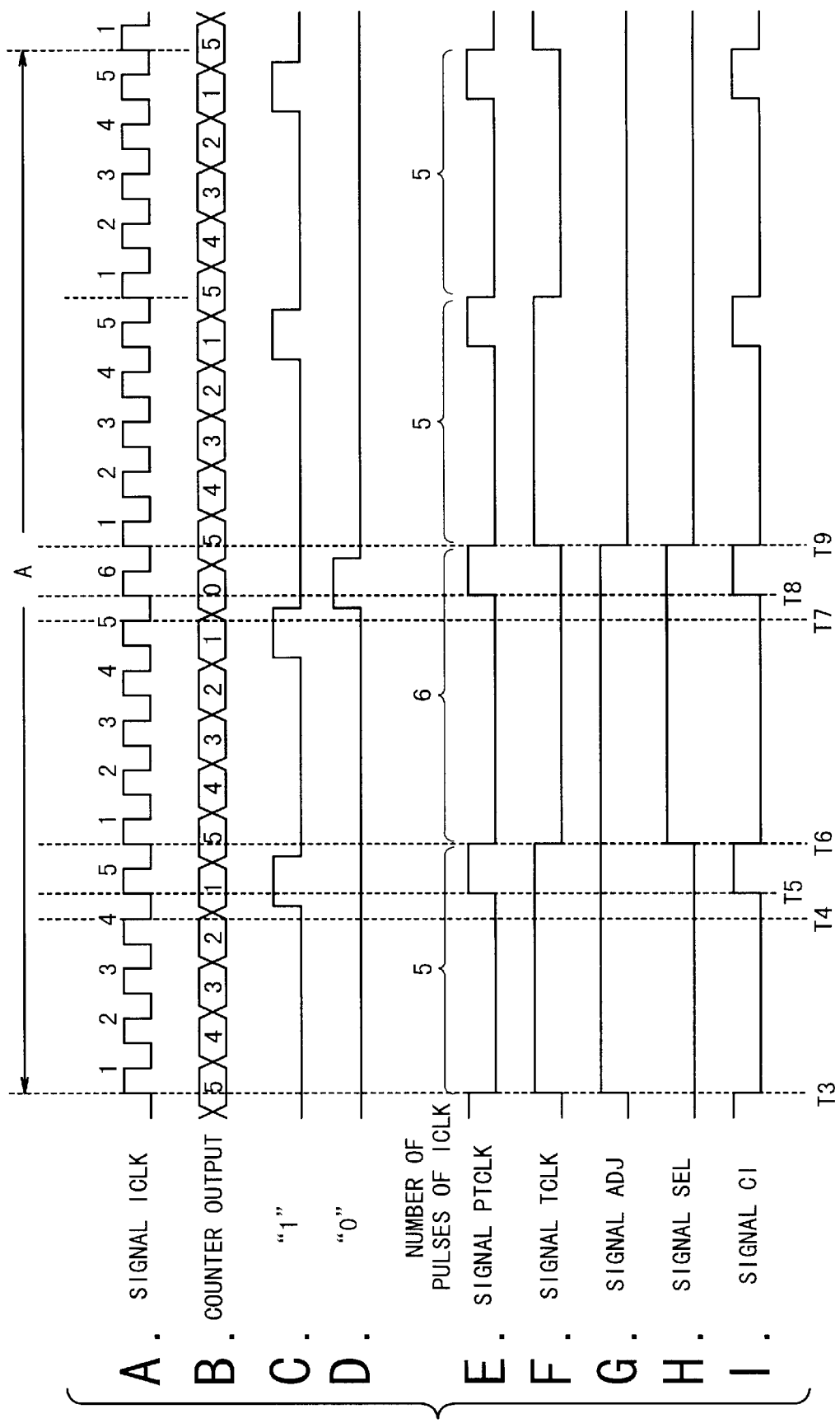
FIGS. 8A to 8I are expanded signal waveform diagrams in a part of the signal waveform diagrams shown in FIGS. 7A to 7E.

FIG. 8A to 8I are timing charts illustrating the period adjusting operation shown as the range "A" in FIG. 7E. The content of the shift register 25 is shifted by one bit at a rising edge (T3) of the data transfer clock signal TCLK shown in FIG. 8F so that the adjusted period designating signal ADJ becomes "1" as shown in FIG. 8G. Since the data transfer clock signal TCLK is "1", the adjusted period designating bit signal ADJ is masked by the AND gate 32. Accordingly, the counting-down operation of the down counter 27 is advanced to "1" (T4) as shown in FIG. 8B, and the previous stage data transfer clock signal PTCLK is raised at a rising edge (T5) of the next internal clock signal ICLK shown in FIG. 8A. As a result, the counter initialize signal CI is set to "1" and the down counter 27 is initialized in response to the clock signal PTCLK. In this manner, the initialization of the counter 27 is performed and then the counting-down operation of the down counter 27 is again commenced from "5".

As a subsequent rising edge (T6) of the internal clock signal ICLK shown in FIG. 8A, the previous stage data transfer clock signal TCLK falls down, as shown in FIG. 8F. Subsequently, the data transfer clock signal TCLK is toggled between "0" and "1". As a result, the output of the AND gate 32 becomes "1" when the data transfer clock signal TCLK is "1" because the adjusted period designation signal ADJ is also "1". Since the output ADIR from the adjustment direction designating data register 35 is equal to "0", the EOR gate 34 outputs "1" as the selection signal SEL, as shown in FIG. 8H. For this reason, the multiplexer 29 selects the input on the "1" side, namely, the output of "0" from the comparator 28 shown in FIG. 8D. As a result, the counting-down operation by the down counter 27 is advanced to "0" (T7), as shown in FIG. 8B. That is, the down counter 27 counts down more by 1 than in a case that the selection signal SEL is "0".

When the count output of the down counter 27 becomes "0", as shown in FIG. 8B, the previous stage data transfer clock signal TCLK is raised at the next rising edge (T8) of the internal clock signal ICLK. Therefore, the down counter 27 is initialized in response to the clock signal PTCLK in such a manner that the counting-down operation is again commenced from "5", as shown in FIG. 8A. At a subsequent rising edge (T9) of the internal clock signal ICLK shown in FIG. 8A, the previous stage data transfer clock signal PTCLK falls down as shown in FIG. 8E. As a result, the counter initialize signal CI, i.e., the output of the OR gate 33 becomes "0" as shown in FIG. 8I, so that the counting down operation by the down counter 27 is commenced. At the same time, the data transfer clock signal is toggled to become "1". As a result, the adjustment period designating data APD of the shift register 25 is shifted by one bit, and the adjusted period designating bit signal ADJ is returned to "0", as shown in FIG. 8G. Thus, the generating operation of the data transfer clock signal TCLK for one time period is accomplished in a case that the adjusted period designating bit signal ADJ becomes "1".

In this case, one time period of the data transfer clock signal TCLK becomes 11 (=5+6) time periods of the internal clock signal ICLK. In this case, the adjusted period designating bit signal ADJ becomes "0" and the counting-down operation of the down counter 27 is ended at the value of "1". Therefore, in the generating operation of the data transfer clock signal TCLK for the next time period, the next time period of the data transfer clock signal TCLK is equal to (5+5) time periods of the internal clock signal.

Next, the operation of the interface apparatus 51 when ADIR=1, ADJ=010001000100b, and CNT=5, will now be explained with reference to FIGS. 9A to 9E.

In this example, if the internal clock signal ICLK is simply counted every 6 periods such that the data transfer clock signal TCLK is generated, the errors are accumulated near the last (T2) of 1 character, because the data transfer clock signal TCLK is delayed. Thus, there are some possibilities that the data transmission/reception may fail. As a consequence, the counter value of the internal clock signal ICLK by the down counter 27 is shortened by one in proper periods in order to avoid the error accumulation. That is, while the adjusted period designating data APD of 12 bits is sequentially outputted from the least significant bit one bit by one bit as the adjusted period designating bit signal ADJ. When the adjusted period designating bit signal ADJ becomes "1" and also the data transfer clock signal TCLK becomes "0", the count value of internal clock signal periods is shortened.

Figure 9:
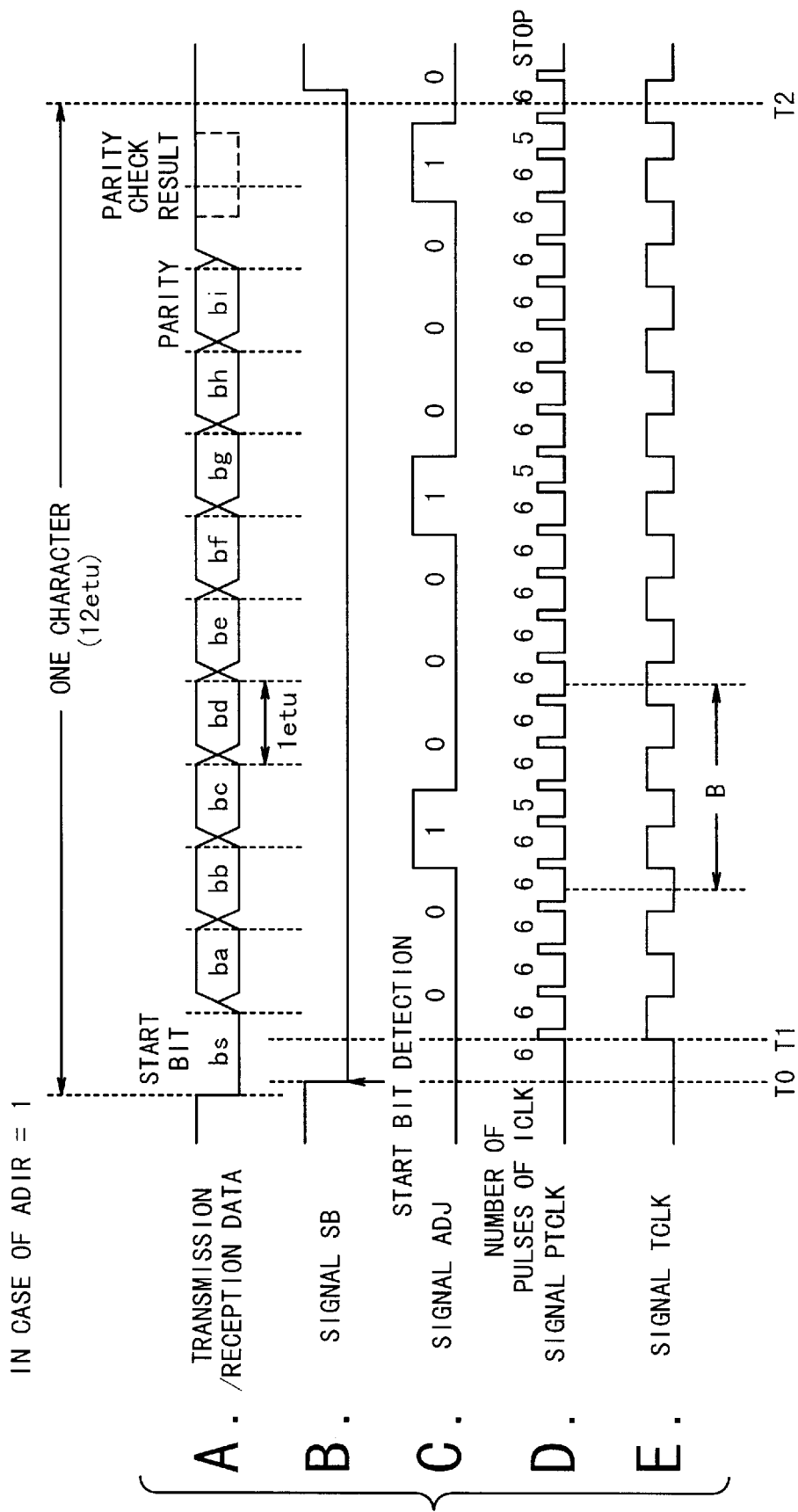
FIGS. 9A to 9E are signal waveform diagrams when data of one character (12 etu) is transferred in case of adjustment direction designating data ADIR=1.

The stand-by signal SB is reset as shown in FIG. 9B when the data transfer operation of one character is started. In response to the stand-by signal SB of the low level, the down counter 27 receives the internal counter value CNT of "5" from the register 26 and commences the counting-down operation from the internal counter value of "5" (T0). The down counter 27 is counted by +1 every time the falling edge of the internal clock signal appears. Unless the data transfer clock signal TCLK is "0" and also the adjusted period designating signal ADJ is "1", the selection signal SEL is "1". For this reason, the output of "0" from the comparator 28 is selected by the multiplexer 29. The previous stage data transfer clock signal PTCLK rises at the rising edge of the internal clock signal immediately after the output of the counter 27 becomes "0". Thus, the counter initialize signal CI becomes active so that the down counter 27 is initialized. In other words, the value "5" set in the register 26 for the counter 27 is loaded on the down counter 27, so that the subsequent counting-down operation is commenced (T1).

FIGS. 10A to 10I are timing charts illustrating the operation of the interface apparatus 51 in a range B shown in FIG. 9E.

Figure 10:
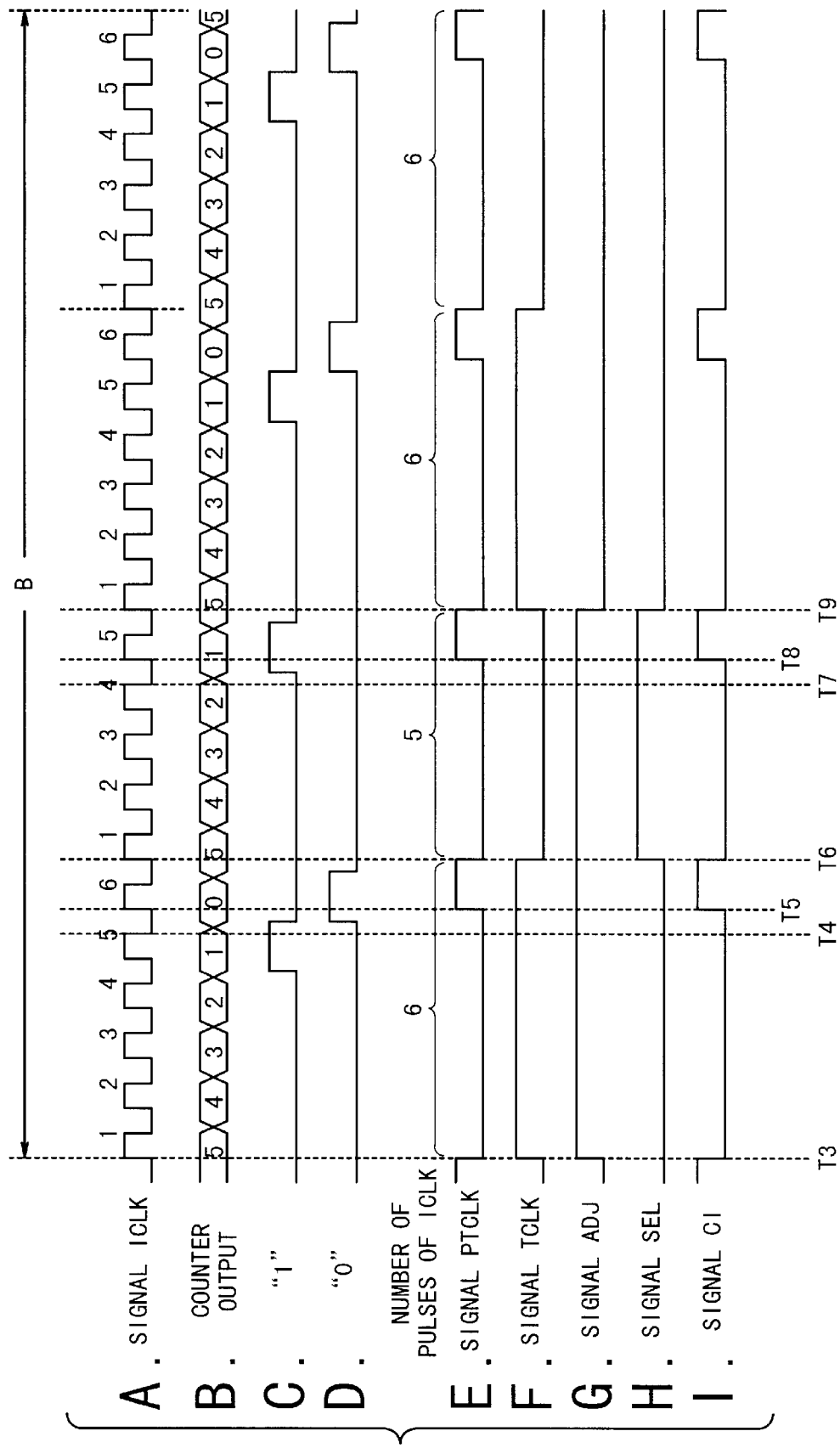
FIGS. 10A to 10I are expanded signal waveform diagrams of a part of the signal waveform diagrams shown in FIGS. 9A to 9E.

As shown in FIG. 10G, the adjusted period designating data APD of the shift register 25 is shifted by "1" bit at a rising edge (T3) of the internal clock signal ICLK shown in FIG. 10A. As a result, adjusted period designating bit signal ADJ becomes "1" in this example. When the data transfer clock signal TCLK becomes "1", the adjusted period designating bit signal ADJ is masked by the AND gate 32. Accordingly, the counting-down operation of the down counter 27 is advanced to "0" (T4). Then, the previous stage data transfer clock signal PTCLK is raised at a rising edge (T5) of the next internal clock signal ICLK, as shown in FIG. 10E, and the counter initialize signal CI becomes "1", as shown in FIG. 10I. As a consequence, the initialization of the down counter 27 is performed so that the counting-down operation of the down counter 27 is again commenced from 5. At a subsequent rising edge (T6) of the internal clock signal ICLK, the previous stage data transfer clock signal PTCLK falls down, as shown in FIG. 10E. In this way, the data transfer clock signal TCLK is changed from "1" to "0", as shown in FIG. 10F, so that the output of the AND gate 32 becomes "1". As a result, the output from the adjustment direction designating data register 35, namely the adjustment direction designating signal ADIR is equal to "1". Therefore, the EOR gate 34 outputs "0" as the selection signal SEL, as shown in FIG. 10H. Then, the multiplexer 29 selects the output of "1" on the "0" side in the comparator 28 in response to the selection signal SEL, as shown in FIG. 10C, so that the countdown operation by the down counter 27 is advanced to "1" (T7). At the next rising edge (T8) of the internal clock signal ICLK, the previous stage data transfer clock signal PTCLK is raised, as shown in FIG. 10E. Thus, the counter initialize signal CI becomes "1". Accordingly, the content of the down counter 27 is initialized in response to the counter initialize signal CI in such a manner that the counting-down operation is again commenced from "5", as shown in FIG. 10B. In other words, the counting-down operation of the down counter 27 is accomplished to have a count value smaller by "1" than in a case that the selection signal SEL becomes "1". At a subsequent rising edge (T9) of the internal clock signal ICLK shown in FIG. 10A, the previous stage data transfer clock signal PTCLK falls down as shown in FIG. 10E, and the counter initialize signal CI also becomes "0" as shown in FIG. 10I. As a result, the counting-down operation by the down counter 27 is commenced, and at the same time, the data transfer clock signal is changed to "1" as shown in FIG. 10F. The content of the shift register 25 is shifted by 1 bit, and the adjusted period designating signal is returned to "0" as shown in FIG. 10G. Thus, the generating operation of the data transfer clock signal TCLK for 1 time period in a case that the adjusted period designating signal becomes "1" is accomplished. In this case, one time period of the data transfer clock signal TCLK becomes 11 (=6+5) periods of the internal clock signal ICLK. In the generating operation of the data transfer clock signal TCLK for the next 1 time period, the adjusted period designating bit signal ADJ becomes "0" as shown in FIG. 10G. Also, the counting-down operation of the down counter 27 is advanced to 0, as shown in FIG. 10B. Therefore, 1 time period for the data transfer clock signal TCLK is equal to 12 (=6+6) period of the internal clock signal in this case.

Figure 11:
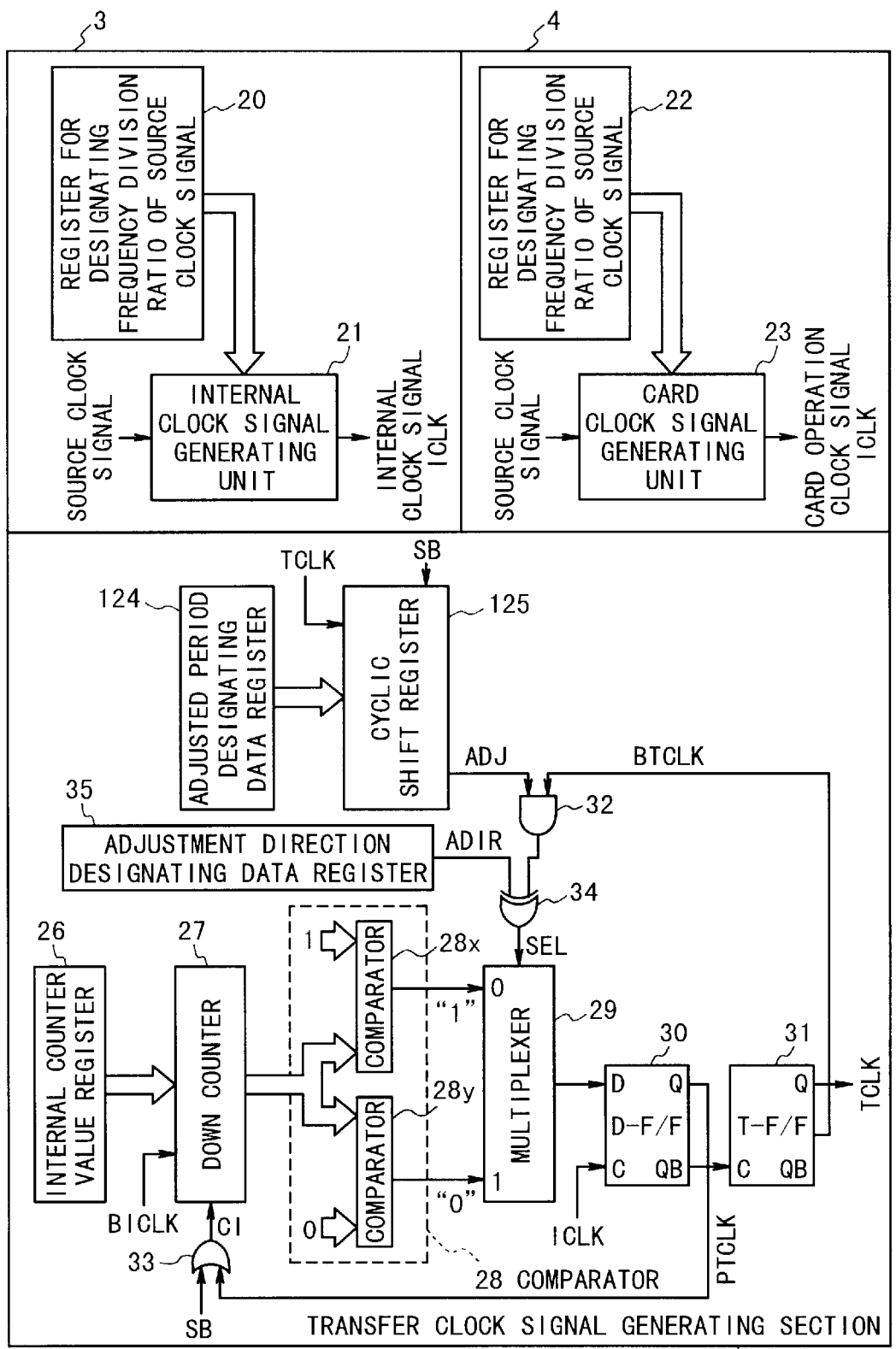
FIG. 11 is a schematic block diagram illustrating the structure of the clock signal adjusting unit in the interface apparatus according to a second embodiment of the present invention.

FIG. 11 is a block diagram illustrating the clock signal adjusting unit according to the second embodiment of the present invention. Referring now to FIG. 11, the clock signal adjusting unit will be described.

In accordance with the second embodiment, the adjusted period designating bit signal ADJ is outputted by an n-bit cyclic shift register 125. When the stand-by signal SB is "1", an n-bit adjusted period designating data is set from the cyclic shift register 124 and functions an initial value of the cyclic shift register 125.

Figure 12:
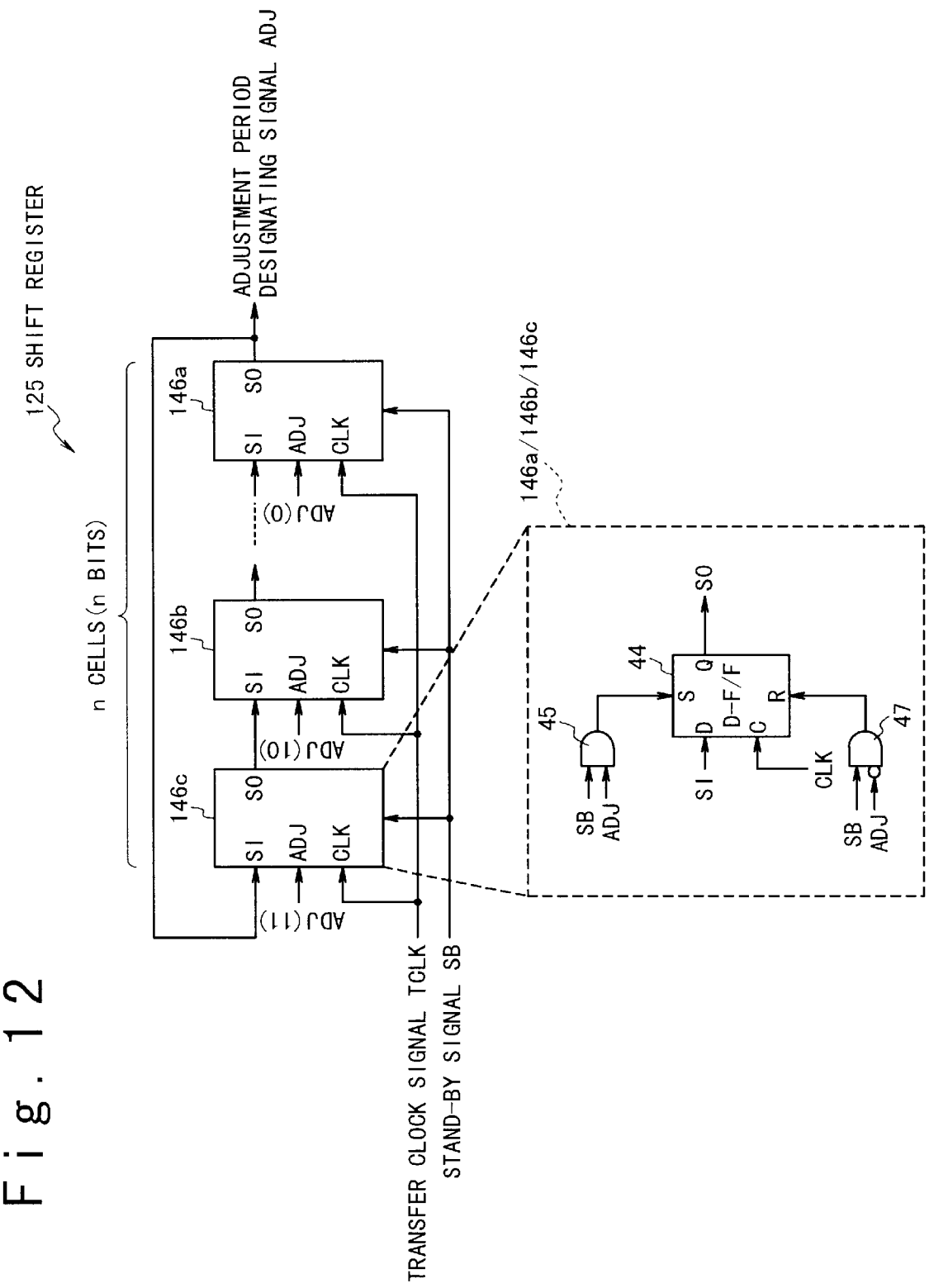
FIG. 12 is a circuit arrangement illustrating the structure of a 12-bit shift register 125 in the clock signal adjusting unit of the interface apparatus in the first embodiment shown in FIG. 11.

FIG. 12 shows an embodiment of the n-bit cyclic shift register 125. Referring to FIG. 12, this n-bit cyclic shift register 125 has the structural different point from the above-explained 12-bit shift register 25 in the first embodiment. That is, the adjusted period designating signal is fed back to an input of the most significant bit (MSB) register. In a case that "n" is selected to be smaller than, or equal to 11, when one character, namely data of 12 etu is transferred, the same value is used more than two times as the value of the adjusted period designating data. For example, in the case that "n" is equal to "4", the 4-bit adjusted period designating bit data ADJ in the register 125 is repeatedly used three times while one character, namely data of 12 etu is transferred.

2 to 12 may be selected for possible values of "n". The larger this "n" value becomes, the more precisely the communication time period can be controlled. To the contrary, the more precisely the communication time period is controlled, the larger the circuit scale becomes. For example, it is supposed that this "n" value is larger than "8" in a case that the connection to the control unit 52 such as the CPU is realized by a data bus having an 8-bit width. In this case, the data access operation to the control unit 52 must be carried out at least two times in order to set the adjusted period designating data in the cyclic shift register 125. As a consequence, if this "n" value is selected to be smaller than 8, then there is an effect that the access time to the control unit 52 such as the CPU can be reduced.

Also, when this "n" value is equal to 12, the same effect as that of the first embodiment can be achieved. Therefore, this second embodiment may be considered as the generic mode of the first embodiment.

It should also be noted that the adjusted period designating data set to the n-bit register 124 can be conducted by repeatedly performing the processing shown in FIG. 6 in a similar case that n=12, namely the first embodiment "m (=12/n)" times.

Next, a clock signal adjusting unit according to a third embodiment of the present invention will now be explained with reference to FIG. 13.

Figure 13:
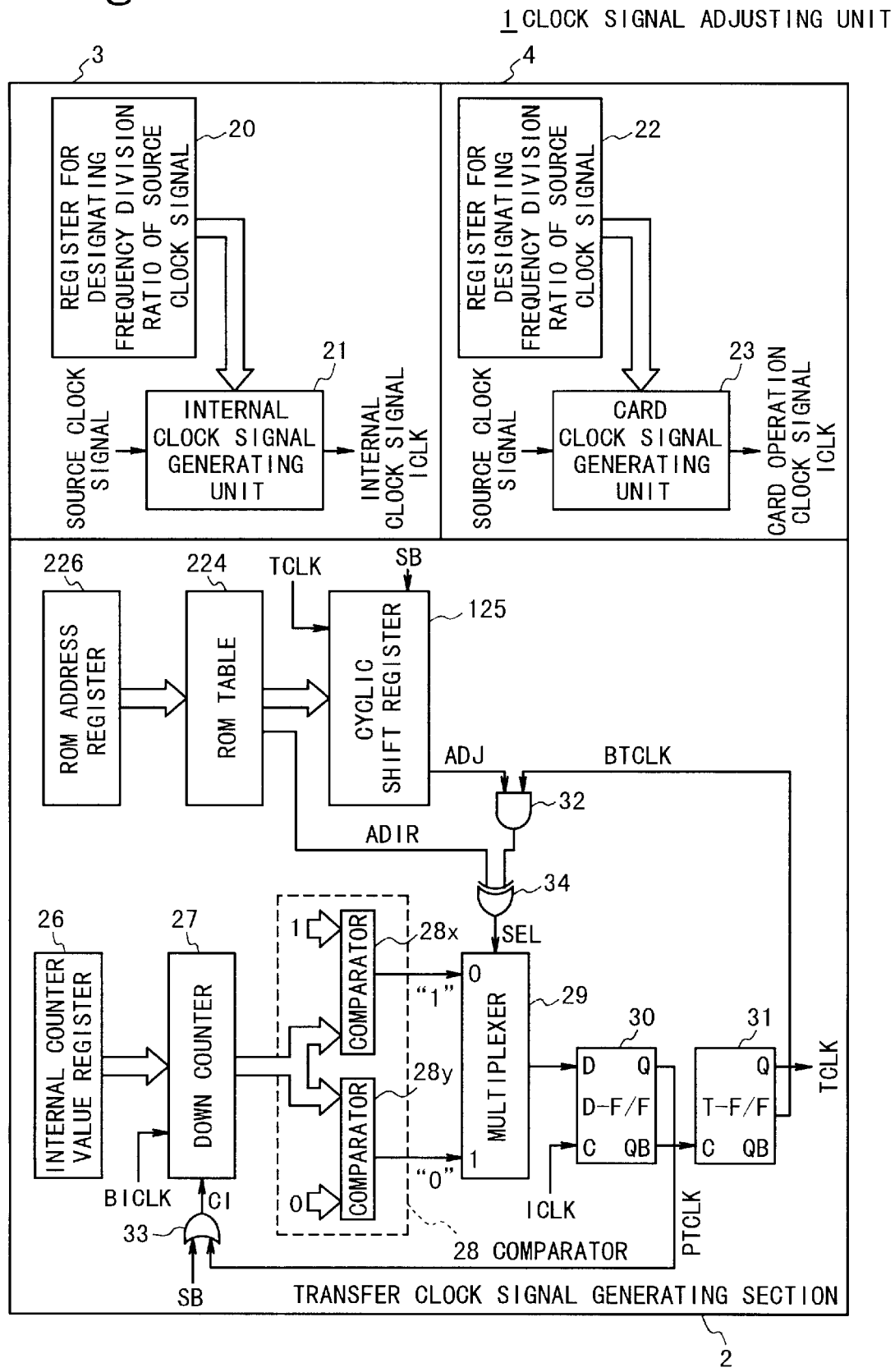
FIG. 13 is a schematic block diagram illustrating the structure of the clock signal adjusting unit in an interface apparatus according to a third embodiment of the present invention.

In FIG. 13, an address is designated by a ROM address designating register 226 and an output from a ROM table 224, namely the data output of the ROM table 224 from the designated address may determine the adjusted period designating data APD for the n-bit cyclic shift register 125 and the adjustment direction designating data ADIR. In this example, the control unit 52 does not calculate any value for the cyclic shift register 125, but simply enters the ratio of data transfer clock signal period to card operation clock signal period, which is obtained in the initial response, into the ROM address register 226. As a consequence, there is a merit that the calculation workload by the control unit 52 can be reduced.

Also, in the third embodiment of the present invention, the present invention is not limited to the case of the interface apparatus for the IC card equipped with external terminals, but may be modified. For instance, the adjustment period designating data is previously set to all bits of the character of the transfer data, so that a clock signal having the bit length other then 12-bit length can be generated from the internal clock signal, and may be controlled in a similar manner to that of the above-described embodiment.

As described above, according to the present invention, each of period s of the data transfer clock signal period is controlled based upon the ratio of data transfer clock signal period to card operation clock signal period. Accordingly, it is possible to prevent the data from being erroneously transferred due to the accumulated errors in the data transfer clock signal TCLK. As a result, it is possible to use the clock signal source having a low frequency which is not equal to a frequency integer times higher than the data transfer rate. Therefore, there are advantages that the selectable range of the clock signal source can be enlarged, and also the electromagnetic interference to external appliances can be reduced.

Also, since each of the periods of the clock signal periods of the data transfer are controlled, the circuit arrangement can be digitalized. As a consequence, there are further merits that the power consumption can be reduced, and the interface apparatus can be made compact and also can be highly integrated.

What is claimed is:

1. A clock signal generating apparatus comprising:
    a first clock signal generating circuit for generating a first clock signal;
    adjustment data storing means for storing an adjusted period designating data and an adjustment content designating data, wherein said adjusted period designating data indicates ones of N periods (N is an integer larger than 1) of a desired clock signal for adjustment to be performed to obtain said desired clock signal, and said adjustment content designating data indicates a content of the adjustment, wherein one period of said desired clock signal is composed of a plurality of periods of said first clock signal;
    adjustment requesting means connected to said adjustment data storing means for selectively issuing an adjustment request based on said adjusted period designating data and said adjustment content designating data in response to input of said desired clock signal; and
    desired clock signal generating means connected to said adjustment requesting means and to said first clock signal generating circuit for performing the adjustment in response to said adjustment request while counting pulses of said first clock signal, such that each of specific periods of said N periods designated by said adjusted period designating data is extended or shortened by at least one period of said first clock signal based on said adjustment content designating data, and for generating said desired clock signal based on the adjustment result.

2. A clock signal generating apparatus according to claim 1, wherein said adjustment data storing means comprises:
    an address register in which an address is externally set; and
    a table for storing a plurality of sets of said adjusted period designating data and said adjustment content designating data, and for outputting one of the plurality of sets in response to the address.

3. A clock signal generating apparatus according to claim 1, wherein said adjusted period designating data is composed of N bits corresponding to the N periods of said desired clock signal, and each of the N bits indicates whether the adjustment should be performed in the corresponding period.

4. A clock signal generating apparatus according to claim 3, wherein said adjustment requesting means comprises:
    a shift register for shifting said adjusted period designating data in units of bits in response to each period of said desired clock signal to generate an adjustment position signal; and
    means for issuing said adjustment request to said desired clock signal generating means based on said adjustment content designating data in response to the adjustment position signal.

5. A clock signal generating apparatus according to claim 1, wherein said desired clock signal generating means comprises:
    a half period counter for counting periods of said first clock signal for a half of each period of said desired clock signal;
    a reset section for omitting the last one of the periods of said first clock signal for a half of each period of said desired clock signal when the adjustment request is received, and for resetting said half period counter to produce a pre-stage clock signal, and for counting the last one of the periods of said first clock signal for a half of each period of said desired clock signal when the adjustment request is not received, and for resetting said half period counter to produce said pre-stage clock signal; and
    a desired signal counter for counting said pre-stage clock signal to generate said desired clock signal.

6. A clock signal generating apparatus according to claim 1, wherein said desired clock signal generating means comprises:
    a half period counter for counting periods of said first clock signal for a half of each period of said desired clock signal;
    a reset section for counting a further one period of said first clock signal after counting the periods of said first clock signal for a half of each period of said desired clock signal when the adjustment request is received, and for resetting said half period counter to produce a pre-stage clock signal, and for counting the periods of said first clock signal for a half of each period of said desired clock signal when the adjustment request is not received, and for resetting said half period counter to produce said pre-stage clock signal; and
    a desired signal counter for counting said pre-stage clock signal to generate said desired clock signal.

7. A clock signal generating apparatus according to claim 1, wherein said desired clock signal generating means performs the adjustment in response to said adjustment request such that the extension or shortening is performed in a first half of each of specific periods of said N periods designated by said adjusted period designating data.

8. A clock signal generating apparatus according to claim 1, wherein said adjusted period designating data is determined based on a difference between a target clock signal and said desired clock signal.

9. A clock signal generating apparatus according to claim 1, wherein said desired clock signal generating means includes a half period counter for counting a predetermined number of periods of said first clock signal for a half of each of the N periods of said desired clock signal, and
    wherein said adjustment content designating data is determined based on the predetermined number of periods of said first clock signal.

10. A method for adjusting a period of a transfer clock signal used for communication with an external unit, comprising the steps of:
    generating an internal clock;

generating a transfer clock signal by counting periods of said internal clock signal, wherein one period of said transfer clock signal is composed of a plurality of periods of said internal clock signal;

selectively issuing an adjustment request based on an adjusted period designating data and an adjustment content designating data in response to input of said transfer clock signal, wherein said adjusted period designating data indicates to which periods of a transfer clock signal of N periods (N is an integer larger than 1) adjustment should be performed, and said adjustment content designating data indicates a content of the adjustment; and performing the adjustment in response to said adjustment request such that each of specific periods of said N periods designated by said adjusted period designating data is extended or shortened by at least one period of said internal clock signal based on said adjustment content designating data.

11. A method according to claim 10, wherein said adjusted period designating data and said adjustment content designating data are predetermined for said external unit to be used.

12. A method according to claim 10, wherein said adjusted period designating data and said adjustment content designating data are determined when said external unit is connected.

13. A method according to claim 10, wherein said step of selectively issuing an adjustment request includes:

shifting said adjusted period designating data in units of bits in response to each period of said transfer clock signal to selectively generate a position coincidence signal, wherein said adjusted period designating data is composed of N bits corresponding to the N periods of said transfer clock signal, and indicates in units of bits whether the adjustment should be performed to N periods of said transfer clock signal corresponding to the N bits; and issuing said adjustment request based on said adjustment content designating data in response to the position coincidence signal.

14. A method according to claim 10, wherein said step of performing the adjustment includes:

counting, by a half period counter, periods of said internal clock signal for a half of each period of said transfer clock signal;

when the adjustment request is received, performing one of:

omitting the last one of the periods of said internal clock signal for a half of each period of said transfer clock signal, and counting a further one period of said internal clock signal after counting the periods of said internal clock signal for a half of each period of said transfer clock signal;

resetting said half period counter to produce a pre-stage clock signal; and generating said transfer clock signal by counting said pre-stage clock signal.

15. An interface apparatus between a control unit and an external unit, comprising:

a first clock signal generating circuit for generating a first clock;

adjustment data storing means for storing an adjusted period designating data which indicates to which periods of a transfer clock signal adjustment should be performed, and an adjustment content designating data which indicates a content of the adjustment, wherein said transfer clock signal is used for communication between said control unit and said external unit, is composed of N periods including a start bit period, one period of said transfer clock signal is composed of M periods (M is an integer larger than N) of said first clock signal;

adjustment requesting means connected to said adjustment data storing means for selectively issuing an adjustment request based on said adjusted period designating data and said adjustment content designating data in response to input of said transfer clock signal;

transfer clock signal generating means connected to said adjustment requesting means and to said first clock signal generating circuit for generating said transfer clock signal by counting pulses of said first clock signal, wherein said transfer clock signal generating means performs the adjustment in response to said adjustment request such that each of specific periods of said N periods designated by said adjusted period designating data is extended or shortened by at least one period of said first clock signal based on said adjustment content designating data; and a serial/parallel converter connected to said transfer clock signal generating means and for being connected to the control unit and the external unit, for converting a parallel communication data from said control unit into a serial form to output to said external unit using said transfer clock signal, and for converting a serial communication data from said external unit into a parallel form to output to said control unit using said transfer clock signal.

16. An interface apparatus according to claim 15, wherein said transfer clock signal generating means includes a half period counter for counting a predetermined count value corresponding to a half of the M periods of said first clock signal, and wherein said adjustment content designating data is determined based on the predetermined count value corresponding to a half of the M periods of said first clock signal.

17. An interface apparatus according to claim 16, wherein said adjusted period designating data is determined based on a difference between a target clock signal and said transfer clock signal.

18. An interface apparatus according to claim 17, wherein said adjusted period designating data, said adjustment content designating data, and said predetermined count value are predetermined for said external unit to be used, and are set by said control unit.

19. An interface apparatus according to claim 17, wherein said adjusted period designating data, said adjustment content designating data, and said predetermined count value are determined when said external unit is connected to said interface apparatus, and are set by said control unit.

20. An interface apparatus according to claim 17, wherein said adjustment data storing means comprises:

an address register for being set with an address; and a table for storing a plurality of sets of said adjusted period designating data and said adjustment content designating data, and for outputting one of the plurality of sets in response to the address.

21. An interface apparatus according to claim 17, wherein said adjustment requesting means comprises:

a shift register for storing said adjusted period designating data from said adjustment data storing means, said adjusted period designating data being composed of N bits corresponding to the N periods of said transfer clock signal, and for cyclically shifting said adjusted period designating data in units of bits in response to each period of said transfer clock signal to selectively generate a position coincidence signal;

a section for issuing said adjustment request to said transfer clock signal generating means based on said adjustment content designating data in response to the position coincidence signal.

22. An interface apparatus according to claim 17, wherein said transfer clock signal generating means comprises:

a half period counter for counting periods of said first clock signal for a half of each period of said transfer clock signal;

a reset section for omitting the last one of the periods of said first clock signal for a half of each period of said transfer clock signal when the adjustment request is received, and for resetting said half period counter to produce a pre-stage clock signal, and for counting the last one of the periods of said first clock signal for a half of each period of said transfer clock signal when the adjustment request is not received, and for resetting said half period counter to produce said pre-stage clock signal; and a transfer signal counter for counting said pre-stage clock signal to generate said transfer clock signal.

23. An interface apparatus according to claim 17, wherein said transfer clock signal generating means comprises:

a half period counter for counting periods of said first clock signal for a half of each period of said transfer clock signal;

a reset section for counting a further one period of said first clock signal after counting the periods of said first clock signal for a half of each period of said transfer clock signal when the adjustment request is received, and for resetting said half period counter to produce a pre-stage clock signal, and for counting the periods of said first clock signal for a half of each period of said transfer clock signal when the adjustment request is not received, and for resetting said half period counter to produce said pre-stage clock signal; and a transfer signal counter for counting said pre-stage clock signal to generate said transfer clock signal.

24. An interface apparatus according to claim 17, wherein said transfer clock signal generating means performs the adjustment in response to said adjustment request such that the extension or shortening is performed in a first half of each of specific periods of said N periods designated by said adjusted period designating data.

* * * * *

UNITED STATES PATENT AND TRADEMARK OFFICE
CERTIFICATE OF CORRECTION

PATENT NO. : 5,875,321
DATED : February 23, 1999
INVENTOR(S) : Shoichiro SENGOKU It is certified that error appears in the above-indentified patent and that said Letters Patent is hereby corrected as shown below:

On the title page, in item [22], change the filing date as printed on the patent, from "Aug. 18, 1997" to --Aug. 19, 1997--.

Signed and Sealed this

Seventh Day of September, 1999

Attest:

Q. TODD DICKINSON

Attesting Officer

Acting Commissioner of Patents and Trademarks